United States Patent
Von Hagen

(10) Patent No.: US 12,321,574 B2
(45) Date of Patent: Jun. 3, 2025

(54) CONTENT OUTPUT DEVICES AND USER INTERFACES

(71) Applicant: Apple Inc., Cupertino, CA (US)

(72) Inventor: Eliza J. Von Hagen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/230,107

(22) Filed: Aug. 3, 2023

(65) Prior Publication Data

US 2024/0077991 A1    Mar. 7, 2024

Related U.S. Application Data

(60) Provisional application No. 63/403,495, filed on Sep. 2, 2022.

(51) Int. Cl.
  *G06F 3/0486* (2013.01)
  *G06F 3/0484* (2022.01)
  (Continued)

(52) U.S. Cl.
  CPC .......... *G06F 3/0484* (2013.01); *G06F 3/0486* (2013.01); *H04L 41/12* (2013.01); *H04M 1/72415* (2021.01); *H04N 21/4131* (2013.01); *H04W 4/80* (2018.02); *H04W 76/15* (2018.02); *G06F 3/04817* (2013.01); *G06F 3/04847* (2013.01); *G06F 3/165* (2013.01); *G06F 2203/04803* (2013.01); *H04N 21/43637* (2013.01); *H05B 47/175* (2020.01)

(58) Field of Classification Search
  CPC ......... G06F 3/0484; G06F 2203/04803; G06F 3/03547; G06F 3/04817; G06F 3/0486; G06F 3/165; G06F 3/04847; H04N 21/4131; H04N 21/43637; H04N 21/4436; H05B 47/165; H05B 47/175; H04L 41/12; H04M 1/72415; H04W 4/80; H04W 76/15
  See application file for complete search history.

(56) References Cited

U.S. PATENT DOCUMENTS 6,504,934 B1    1/2003    Kasai et al.
6,611,297 B1    8/2003    Akashi et al.
(Continued)

FOREIGN PATENT DOCUMENTS

CN    1863281 A    11/2006
CN    102281294 A    12/2011
(Continued)

OTHER PUBLICATIONS

Advisory Action received for U.S. Appl. No. 17/031,877, mailed on Nov. 3, 2022, 3 pages.
(Continued)

*Primary Examiner* — Irete F Ehichioya
*Assistant Examiner* — Jianmei F Duckworth
(74) *Attorney, Agent, or Firm* — DLA Piper LLP (US)

(57) ABSTRACT

The present disclosure generally relates to outputting light and managing controllable devices. In some examples, an electronic device determines whether to associate a remotely controllable external device with a context based on a set of one or more criteria and in response to receiving a request to associate the remotely controllable external device with the context.

42 Claims, 43 Drawing Sheets

(51) Int. Cl.
*H04L 41/12* (2022.01)
*H04M 1/72415* (2021.01)
*H04N 21/41* (2011.01)
*H04W 4/80* (2018.01)
*H04W 76/15* (2018.01)
*G06F 3/04817* (2022.01)
*G06F 3/04847* (2022.01)
*G06F 3/16* (2006.01)
*H04N 21/4363* (2011.01)
*H05B 47/175* (2020.01)

(56) References Cited

U.S. PATENT DOCUMENTS

| | | |
|---|---|---|
| 7,571,014 B1 | 8/2009 | Lambourne et al. |
| 8,028,323 B2 | 9/2011 | Weel |
| 8,290,603 B1 | 10/2012 | Lambourne |
| 8,458,780 B1 | 6/2013 | Takkallapally et al. |
| 9,042,556 B2 | 5/2015 | Kallai et al. |
| 9,084,003 B1 | 7/2015 | Sanio et al. |
| 9,112,849 B1 | 8/2015 | Werkelin Ahlin et al. |
| 9,202,509 B2 | 12/2015 | Kallai et al. |
| 9,247,363 B2 | 1/2016 | Triplett et al. |
| 9,251,787 B1 | 2/2016 | Hart et al. |
| 9,319,782 B1 | 4/2016 | Crump et al. |
| 9,374,607 B2 | 6/2016 | Bates et al. |
| 9,431,021 B1 | 8/2016 | Scalise et al. |
| 9,450,812 B2 | 9/2016 | Lee et al. |
| 9,454,336 B1 | 9/2016 | Rudradevan et al. |
| 9,504,134 B2 | 11/2016 | Aliakseyeu et al. |
| 9,519,413 B2 | 12/2016 | Bates |
| 9,628,414 B1 | 4/2017 | Umapathy et al. |
| 9,699,858 B2 | 7/2017 | Laherty et al. |
| 9,784,417 B1 | 10/2017 | Springer |
| 9,794,720 B1 | 10/2017 | Kadri |
| 9,898,250 B1 | 2/2018 | Williams et al. |
| 9,936,556 B2 | 4/2018 | Chraibi et al. |
| 10,027,775 B1 | 7/2018 | Mierau et al. |
| 10,284,980 B1 | 5/2019 | Woo et al. |
| 10,296,128 B1 | 5/2019 | Nold et al. |
| 10,303,422 B1 | 5/2019 | Woo et al. |
| 10,420,185 B2 | 9/2019 | Biery et al. |
| 10,459,416 B1 | 10/2019 | Fernandez |
| 10,713,699 B1 | 7/2020 | Lien et al. |
| 10,779,085 B1* | 9/2020 | Carrigan ............... G06F 3/165 |
| 2002/0002039 A1 | 1/2002 | Qureshey et al. |
| 2002/0168938 A1 | 11/2002 | Chang |
| 2004/0032955 A1 | 2/2004 | Hashimoto et al. |
| 2004/0239692 A1 | 12/2004 | Balle et al. |
| 2006/0161621 A1 | 7/2006 | Rosenberg |
| 2006/0258289 A1 | 11/2006 | Dua |
| 2007/0027682 A1 | 2/2007 | Bennett |
| 2007/0113294 A1 | 5/2007 | Field et al. |
| 2008/0081558 A1 | 4/2008 | Dunko et al. |
| 2008/0091717 A1 | 4/2008 | Garbow et al. |
| 2008/0122796 A1 | 5/2008 | Jobs et al. |
| 2008/0273712 A1 | 11/2008 | Eichfeld et al. |
| 2008/0273713 A1 | 11/2008 | Hartung et al. |
| 2008/0285772 A1 | 11/2008 | Haulick et al. |
| 2009/0055377 A1 | 2/2009 | Hedge et al. |
| 2009/0243507 A1 | 10/2009 | Lucero-Vera et al. |
| 2009/0304205 A1 | 12/2009 | Hardacker et al. |
| 2010/0004031 A1 | 1/2010 | Kim |
| 2010/0070490 A1 | 3/2010 | Amidon et al. |
| 2010/0106647 A1 | 4/2010 | Raman |
| 2010/0138794 A1* | 6/2010 | Ganey ............... G06F 3/04817 715/853 |
| 2010/0284389 A1 | 11/2010 | Ramsay et al. |
| 2010/0293598 A1 | 11/2010 | Collart et al. |
| 2010/0296678 A1 | 11/2010 | Kuhn-rahloff et al. |
| 2010/0299639 A1 | 11/2010 | Ramsay et al. |
| 2010/0321201 A1 | 12/2010 | Huang et al. |
| 2011/0291971 A1 | 12/2011 | Masaki et al. |
| 2012/0004920 A1 | 1/2012 | Kelly et al. |
| 2012/0178431 A1 | 7/2012 | Gold |
| 2012/0210226 A1 | 8/2012 | Mccoy et al. |
| 2012/0222092 A1 | 8/2012 | Rabii |
| 2012/0260169 A1 | 10/2012 | Schwartz et al. |
| 2012/0294118 A1 | 11/2012 | Haulick et al. |
| 2013/0022221 A1 | 1/2013 | Kallai et al. |
| 2013/0027289 A1 | 1/2013 | Choi et al. |
| 2013/0047084 A1 | 2/2013 | Sanders et al. |
| 2013/0051755 A1 | 2/2013 | Brown et al. |
| 2013/0073584 A1 | 3/2013 | Kuper et al. |
| 2013/0080516 A1 | 3/2013 | Bologh |
| 2013/0080955 A1 | 3/2013 | Reimann et al. |
| 2013/0148020 A1 | 6/2013 | Cook |
| 2013/0159858 A1 | 6/2013 | Joffray et al. |
| 2013/0173794 A1 | 7/2013 | Agerbak et al. |
| 2013/0191454 A1 | 7/2013 | Oliver et al. |
| 2013/0194476 A1 | 8/2013 | Shimosato |
| 2013/0205375 A1 | 8/2013 | Woxblom et al. |
| 2013/0246522 A1 | 9/2013 | Bilinski et al. |
| 2013/0246916 A1 | 9/2013 | Reimann et al. |
| 2013/0257284 A1 | 10/2013 | Vanwagoner et al. |
| 2013/0268593 A1 | 10/2013 | Parekh |
| 2013/0275881 A1 | 10/2013 | Hahm et al. |
| 2013/0285576 A1 | 10/2013 | Van Der Zande et al. |
| 2013/0322634 A1 | 12/2013 | Bennett et al. |
| 2013/0324081 A1 | 12/2013 | Gargi et al. |
| 2013/0346859 A1 | 12/2013 | Bates et al. |
| 2013/0347022 A1 | 12/2013 | Bates et al. |
| 2014/0037107 A1 | 2/2014 | Marino et al. |
| 2014/0046464 A1 | 2/2014 | Reimann |
| 2014/0049447 A1 | 2/2014 | Choi |
| 2014/0053281 A1 | 2/2014 | Benoit et al. |
| 2014/0062309 A1 | 3/2014 | Kim |
| 2014/0114966 A1 | 4/2014 | Bilinski et al. |
| 2014/0181202 A1 | 6/2014 | Gossain |
| 2014/0181654 A1 | 6/2014 | Kumar et al. |
| 2014/0181658 A1 | 6/2014 | Kumar et al. |
| 2014/0207707 A1 | 7/2014 | Na et al. |
| 2014/0237361 A1 | 8/2014 | Martin et al. |
| 2014/0267911 A1 | 9/2014 | Grant et al. |
| 2014/0270183 A1 | 9/2014 | Luna |
| 2014/0335789 A1 | 11/2014 | Cohen et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0380234 A1 | 12/2014 | Shim et al. |
| 2015/0032812 A1 | 1/2015 | Dudley |
| 2015/0052222 A1 | 2/2015 | Farrell et al. |
| 2015/0067803 A1 | 3/2015 | Alduaiji |
| 2015/0090189 A1 | 4/2015 | Sills et al. |
| 2015/0100623 A1 | 4/2015 | Gudell et al. |
| 2015/0138101 A1 | 5/2015 | Park et al. |
| 2015/0149599 A1 | 5/2015 | Caunter et al. |
| 2015/0193127 A1 | 7/2015 | Chai et al. |
| 2015/0205971 A1 | 7/2015 | Sanio et al. |
| 2015/0215382 A1 | 7/2015 | Arora et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0243163 A1 | 8/2015 | Shoemake |
| 2015/0248268 A1 | 9/2015 | Kumar et al. |
| 2015/0253960 A1 | 9/2015 | Lin et al. |
| 2015/0261493 A1 | 9/2015 | Lemmon et al. |
| 2015/0309768 A1 | 10/2015 | Van Der Heide |
| 2015/0312299 A1 | 10/2015 | Chen |
| 2015/0319006 A1 | 11/2015 | Plummer et al. |
| 2015/0324552 A1 | 11/2015 | Beckhardt |
| 2015/0350031 A1 | 12/2015 | Burks et al. |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358304 A1 | 12/2015 | Beckhardt et al. |
| 2015/0378522 A1 | 12/2015 | Butts |
| 2016/0007423 A1 | 1/2016 | Aliakseyeu et al. |
| 2016/0011850 A1 | 1/2016 | Sheen et al. |
| 2016/0026429 A1 | 1/2016 | Triplett |

(56) References Cited

U.S. PATENT DOCUMENTS

| | | | |
|---|---|---|---|
| 2016/0050476 A1* | 2/2016 | Patil | H04R 27/00 |
| | | | 715/728 |
| 2016/0062567 A1 | 3/2016 | Yang et al. | |
| 2016/0088039 A1 | 3/2016 | Millington et al. | |
| 2016/0092072 A1* | 3/2016 | So | G06F 3/165 |
| | | | 345/173 |
| 2016/0127799 A1 | 5/2016 | Alsina et al. | |
| 2016/0134942 A1 | 5/2016 | Lo | |
| 2016/0150624 A1 | 5/2016 | Meerbeek et al. | |
| 2016/0155443 A1 | 6/2016 | Khan et al. | |
| 2016/0156687 A1 | 6/2016 | Leung | |
| 2016/0162252 A1 | 6/2016 | Di Censo et al. | |
| 2016/0187995 A1 | 6/2016 | Rosewall | |
| 2016/0196106 A1 | 7/2016 | Hammer et al. | |
| 2016/0210983 A1 | 7/2016 | Amada et al. | |
| 2016/0239167 A1 | 8/2016 | Reimann et al. | |
| 2016/0246566 A1 | 8/2016 | Fullerton et al. | |
| 2016/0253145 A1 | 9/2016 | Lee et al. | |
| 2016/0291924 A1 | 10/2016 | Bierbower et al. | |
| 2016/0295340 A1 | 10/2016 | Baker et al. | |
| 2016/0299669 A1 | 10/2016 | Bates | |
| 2016/0299736 A1 | 10/2016 | Bates et al. | |
| 2016/0336531 A1 | 11/2016 | Yokoyama | |
| 2016/0342386 A1 | 11/2016 | Kallai et al. | |
| 2016/0345039 A1 | 11/2016 | Billmeyer | |
| 2016/0351191 A1 | 12/2016 | Vilermo et al. | |
| 2016/0365986 A1* | 12/2016 | Song | H04L 67/12 |
| 2016/0366531 A1 | 12/2016 | Popova | |
| 2016/0372113 A1 | 12/2016 | David et al. | |
| 2016/0381476 A1 | 12/2016 | Gossain et al. | |
| 2017/0003931 A1 | 1/2017 | Dvortsov et al. | |
| 2017/0025124 A1 | 1/2017 | Mixter et al. | |
| 2017/0026686 A1 | 1/2017 | Glazier et al. | |
| 2017/0031552 A1 | 2/2017 | Lin | |
| 2017/0041727 A1 | 2/2017 | Reimann | |
| 2017/0068402 A1 | 3/2017 | Lochhead et al. | |
| 2017/0070346 A1 | 3/2017 | Lombardi et al. | |
| 2017/0078294 A1 | 3/2017 | Medvinsky | |
| 2017/0083285 A1 | 3/2017 | Meyers et al. | |
| 2017/0083494 A1 | 3/2017 | Kim et al. | |
| 2017/0092270 A1 | 3/2017 | Newendorp et al. | |
| 2017/0097621 A1 | 4/2017 | Ackmann et al. | |
| 2017/0099270 A1 | 4/2017 | Anson | |
| 2017/0127145 A1 | 5/2017 | Rajapakse | |
| 2017/0142087 A1 | 5/2017 | Maninder et al. | |
| 2017/0235545 A1 | 8/2017 | Millington et al. | |
| 2017/0242653 A1 | 8/2017 | Lang et al. | |
| 2017/0311368 A1* | 10/2017 | Kandur Raja | H04L 41/22 |
| 2017/0315715 A1* | 11/2017 | Fujita | H04M 1/72442 |
| 2017/0357434 A1* | 12/2017 | Coffman | H05B 47/1965 |
| 2017/0359189 A1 | 12/2017 | Smith et al. | |
| 2017/0359555 A1 | 12/2017 | Irani et al. | |
| 2018/0007838 A1 | 1/2018 | Mccord | |
| 2018/0019889 A1 | 1/2018 | Burns et al. | |
| 2018/0039916 A1 | 2/2018 | Ravindra | |
| 2018/0040324 A1 | 2/2018 | Wilberding | |
| 2018/0070187 A1 | 3/2018 | Drinkwater et al. | |
| 2018/0091381 A1 | 3/2018 | Mclaughlin et al. | |
| 2018/0096064 A1 | 4/2018 | Lennon et al. | |
| 2018/0139292 A1 | 5/2018 | Koren et al. | |
| 2018/0190279 A1 | 7/2018 | Anderson et al. | |
| 2018/0246639 A1 | 8/2018 | Han et al. | |
| 2018/0335903 A1 | 11/2018 | Coffman et al. | |
| 2018/0337924 A1 | 11/2018 | Graham et al. | |
| 2018/0364665 A1 | 12/2018 | Clymer et al. | |
| 2019/0004678 A1 | 1/2019 | Zhang et al. | |
| 2019/0012069 A1 | 1/2019 | Bates | |
| 2019/0012073 A1 | 1/2019 | Hwang | |
| 2019/0058777 A1 | 2/2019 | Chen | |
| 2019/0124745 A1 | 4/2019 | Mason et al. | |
| 2019/0273664 A1 | 9/2019 | Fujita et al. | |
| 2019/0289703 A1 | 9/2019 | Lang et al. | |
| 2019/0294406 A1 | 9/2019 | Bierbower et al. | |
| 2019/0342622 A1 | 11/2019 | Carrigan et al. | |
| 2020/0041079 A1 | 2/2020 | Mellor et al. | |
| 2020/0104018 A1 | 4/2020 | Coffman et al. | |
| 2020/0120772 A1 | 4/2020 | Boring et al. | |
| 2020/0201491 A1 | 6/2020 | Coffman et al. | |
| 2020/0201495 A1 | 6/2020 | Coffman et al. | |
| 2020/0220914 A1 | 7/2020 | Carrigan et al. | |
| 2020/0225817 A1* | 7/2020 | Coffman | G06F 3/0488 |
| 2020/0374996 A1 | 11/2020 | Barnes et al. | |
| 2021/0011588 A1 | 1/2021 | Coffman et al. | |
| 2021/0152685 A1 | 5/2021 | Li | |
| 2021/0243084 A1* | 8/2021 | Lou | G06F 3/0482 |
| 2021/0389869 A1 | 12/2021 | Deets et al. | |
| 2021/0392223 A1 | 12/2021 | Coffman et al. | |
| 2022/0279063 A1 | 9/2022 | Coffman et al. | |
| 2022/0286549 A1 | 9/2022 | Coffman et al. | |
| 2022/0303383 A1 | 9/2022 | Coffman et al. | |
| 2022/0365667 A1 | 11/2022 | Carrigan et al. | |
| 2023/0073844 A1 | 3/2023 | Coffman et al. | |
| 2023/0084551 A1 | 3/2023 | Coffman et al. | |
| 2023/0104819 A1 | 4/2023 | Coffman et al. | |
| 2023/0106600 A1 | 4/2023 | Coffman et al. | |
| 2023/0106761 A1 | 4/2023 | Coffman et al. | |
| 2023/0266866 A1 | 8/2023 | Bates et al. | |
| 2023/0393714 A1 | 12/2023 | Giuliani | |
| 2024/0069711 A1 | 2/2024 | Carrigan et al. | |
| 2024/0220095 A1* | 7/2024 | Ye | H04N 21/485 |

FOREIGN PATENT DOCUMENTS

| | | |
|---|---|---|
| CN | 102301323 A | 12/2011 |
| CN | 102740146 A | 10/2012 |
| CN | 103260079 A | 8/2013 |
| CN | 103593154 A | 2/2014 |
| CN | 104106036 A | 10/2014 |
| CN | 105549947 A | 5/2016 |
| CN | 105745863 A | 7/2016 |
| CN | 105794231 A | 7/2016 |
| CN | 105940678 A | 9/2016 |
| CN | 106030700 A | 10/2016 |
| CN | 106062810 A | 10/2016 |
| CN | 106134209 A | 11/2016 |
| CN | 106383645 A | 2/2017 |
| EP | 1133119 A2 | 9/2001 |
| EP | 2018032 A1 | 1/2009 |
| EP | 2536259 A2 | 12/2012 |
| EP | 2750062 A2 | 7/2014 |
| EP | 2770673 A1 | 8/2014 |
| EP | 2993909 A1 | 3/2016 |
| EP | 3099143 A1 | 11/2016 |
| EP | 3138300 A1 | 3/2017 |
| EP | 3751405 A1 | 12/2020 |
| WO | 2008/027924 A2 | 3/2008 |
| WO | 2009/067670 A1 | 5/2009 |
| WO | 2009/086599 A1 | 7/2009 |
| WO | 2010/087988 A1 | 8/2010 |
| WO | 2012/004288 A1 | 1/2012 |
| WO | 2012/104288 A1 | 8/2012 |
| WO | 2013/049346 A1 | 4/2013 |
| WO | 2013/153405 A2 | 10/2013 |
| WO | 2014/030320 A1 | 2/2014 |
| WO | 2014/107469 A2 | 7/2014 |
| WO | 2015/076930 A1 | 5/2015 |
| WO | 2015/102572 A1 | 7/2015 |
| WO | 2015/124831 A1 | 8/2015 |
| WO | 2015/134692 A1 | 9/2015 |
| WO | 2016/033400 A1 | 3/2016 |
| WO | 2016/057117 A1 | 4/2016 |
| WO | 2017/058442 A1 | 4/2017 |
| WO | 2018/052572 A1 | 3/2018 |
| WO | 2018/200685 A2 | 11/2018 |
| WO | 2019/217341 A1 | 11/2019 |
| WO | 2021/231412 A1 | 11/2021 |

OTHER PUBLICATIONS

Advisory Action received for U.S. Appl. No. 17/747,804, mailed on Jun. 23, 2023, 6 pages.

Applicant Initiated Interview Summary received for U.S. Appl. No. 16/702,968, mailed on Jul. 1, 2020, 5 pages.

(56) References Cited

OTHER PUBLICATIONS

Applicant-Initiated Interview Summary received for U.S. Appl. No. 15/910,263, mailed on Nov. 18, 2020, 6 pages.
Applicant-Initiated Interview Summary received for U.S. Appl. No. 16/702,968, mailed on Sep. 28, 2020, 6 pages.
Applicant-Initiated Interview Summary received for U.S. Appl. No. 16/803,849, mailed on Aug. 21, 2020, 5 pages.
Applicant-Initiated Interview Summary received for U.S. Appl. No. 16/803,849, mailed on Dec. 21, 2020, 5 pages.
Applicant-Initiated Interview Summary received for U.S. Appl. No. 16/803,849, mailed on Feb. 28, 2022, 9 pages.
Applicant-Initiated Interview Summary received for U.S. Appl. No. 16/803,849, mailed on Oct. 12, 2021, 6 pages.
Applicant-Initiated Interview Summary received for U.S. Appl. No. 16/807,604, mailed on Dec. 21, 2020, 7 pages.
Applicant-Initiated Interview Summary received for U.S. Appl. No. 16/807,604, mailed on Jul. 24, 2020, 5 pages.
Applicant-Initiated Interview Summary received for U.S. Appl. No. 16/836,571, mailed on Jul. 7, 2021, 6 pages.
Applicant-Initiated Interview Summary received for U.S. Appl. No. 17/031,833, mailed on Dec. 21, 2020, 5 pages.
Applicant-Initiated Interview Summary received for U.S. Appl. No. 17/031,833, mailed on May 24, 2021, 6 pages.
Applicant-Initiated Interview Summary received for U.S. Appl. No. 17/031,877, mailed on Dec. 22, 2021, 4 pages.
Applicant-Initiated Interview Summary received for U.S. Appl. No. 17/031,877, mailed on Oct. 6, 2022, 5 pages.
Applicant-Initiated Interview Summary received for U.S. Appl. No. 17/461,103, mailed on Jan. 26, 2022, 6 pages.
Applicant-Initiated Interview Summary received for U.S. Appl. No. 17/742,273, mailed on Jan. 18, 2023, 4 pages.
Applicant-Initiated Interview Summary received for U.S. Appl. No. 17/742,273, mailed on Mar. 30, 2023, 5 pages.
Applicant-Initiated Interview Summary received for U.S. Appl. No. 17/747,804, mailed on Mar. 17, 2023, 4 pages.
Applicant-Initiated Interview Summary received for U.S. Appl. No. 17/752,582, mailed on May 31, 2023, 4 pages.
Applicant-Initiated Interview Summary received for U.S. Appl. No. 17/752,582, mailed on Apr. 17, 2023, 3 pages.
Brief Communication Regarding Oral Proceedings received for European Patent Application No. 18197583.0, mailed on Feb. 18, 2021, 2 pages.
Brief Communication Regarding Oral Proceedings received for European Patent Application No. 18728002.9, mailed on Dec. 7, 2022, 1 page.
Brief Communication Regarding Oral Proceedings received for European Patent Application No. 18728002.9, mailed on Nov. 28, 2022, 7 pages.
Brief Communication Regarding Oral Proceedings received for European Patent Application No. 20158824.1, mailed on May 30, 2022, 1 page.
Corrected Notice of Allowance received for U.S. Appl. No. 15/910,263, mailed on Feb. 10, 2021, 3 pages.
Corrected Notice of Allowance received for U.S. Appl. No. 15/910,263, mailed on Mar. 17, 2021, 3 pages.
Corrected Notice of Allowance received for U.S. Appl. No. 15/910,263, mailed on Mar. 18, 2021, 3 pages.
Corrected Notice of Allowance received for U.S. Appl. No. 16/702,968, mailed on Jun. 8, 2021, 3 pages.
Corrected Notice of Allowance received for U.S. Appl. No. 16/702,968, mailed on Jun. 16, 2021, 3 pages.
Corrected Notice of Allowance received for U.S. Appl. No. 16/702,968, mailed on Jun. 28, 2021, 3 pages.
Corrected Notice of Allowance received for U.S. Appl. No. 16/702,968, mailed on May 26, 2021, 3 pages.
Corrected Notice of Allowance received for U.S. Appl. No. 16/702,968, mailed on May 28, 2021, 3 pages.
Corrected Notice of Allowance received for U.S. Appl. No. 16/803,849, mailed on Jul. 7, 2022, 3 pages.
Corrected Notice of Allowance received for U.S. Appl. No. 16/803,849, mailed on Jun. 8, 2022, 3 pages.
Corrected Notice of Allowance received for U.S. Appl. No. 16/807,604, mailed on Jul. 26, 2021, 3 pages.
Corrected Notice of Allowance received for U.S. Appl. No. 16/807,604, mailed on Jun. 28, 2021, 3 pages.
Corrected Notice of Allowance received for U.S. Appl. No. 16/807,604, mailed on May 28, 2021, 3 pages.
Corrected Notice of Allowance received for U.S. Appl. No. 16/807,604, mailed on Oct. 4, 2021, 3 pages.
Corrected Notice of Allowance received for U.S. Appl. No. 16/807,604, mailed on Oct. 14, 2021, 3 pages.
Corrected Notice of Allowance received for U.S. Appl. No. 16/807,604, mailed on Oct. 22, 2021, 3 pages.
Corrected Notice of Allowance received for U.S. Appl. No. 16/836,571, mailed on Dec. 6, 2021, 3 pages.
Corrected Notice of Allowance received for U.S. Appl. No. 16/836,571, mailed on Mar. 25, 2022, 3 pages.
Corrected Notice of Allowance received for U.S. Appl. No. 16/836,571, mailed on Nov. 4, 2021, 3 pages.
Corrected Notice of Allowance received for U.S. Appl. No. 16/836,571, mailed on Nov. 18, 2021, 3 pages.
Corrected Notice of Allowance received for U.S. Appl. No. 16/836,571, mailed on Oct. 12, 2021, 3 pages.
Corrected Notice of Allowance received for U.S. Appl. No. 17/031,833, mailed on Aug. 2, 2021, 3 pages.
Corrected Notice of Allowance received for U.S. Appl. No. 17/461,103, mailed on Apr. 14, 2022, 3 pages.
Corrected Notice of Allowance received for U.S. Appl. No. 17/461,103, mailed on Aug. 3, 2022, 3 pages.
Corrected Notice of Allowance received for U.S. Appl. No. 17/461,103, mailed on May 10, 2022, 3 pages.
Corrected Notice of Allowance received for U.S. Appl. No. 17/752,582, mailed on Jul. 17, 2023, 3 pages.
Corrected Notice of Allowance received for U.S. Appl. No. 18/077,905, mailed on Apr. 10, 2023, 3 pages.
Corrected Notice of Allowance received for U.S. Appl. No. 18/077,905, mailed on Apr. 19, 2023, 3 pages.
Corrected Notice of Allowance received for U.S. Appl. No. 18/077,905, mailed on Apr. 26, 2023, 3 pages.
Corrected Notice of Allowance received for U.S. Appl. No. 18/077,905, mailed on May 4, 2023, 2 pages.
Decision to Grant received for Danish Patent Application No. PA201770392, mailed on Oct. 24, 2018, 2 pages.
Decision to Grant received for Danish Patent Application No. PA201770401, mailed on Oct. 24, 2018, 2 pages.
Decision to Grant received for Danish Patent Application No. PA201770403, mailed on Oct. 24, 2018, 2 pages.
Decision to Grant received for Danish Patent Application No. PA201770404, mailed on Nov. 11, 2019, 3 pages.
Decision to Grant received for Danish Patent Application No. PA201770406, mailed on May 15, 2020, 2 pages.
Decision to Grant received for Danish Patent Application No. PA202070560, mailed on Oct. 21, 2021, 2 pages.
Decision to Grant received for Danish Patent Application No. PA202170320, mailed on Nov. 10, 2022, 2 pages.
Decision to Grant received for Danish Patent Application No. PA202270464, mailed on May 9, 2023, 1 page.
Decision to Grant received for European Patent Application No. 18197583.0, mailed on Feb. 3, 2022, 3 pages.
Decision to Grant received for European Patent Application No. 18197589.7, mailed on Jun. 10, 2021, 2 pages.
Decision to Grant received for European Patent Application No. 19207753.5, mailed on Jun. 2, 2022, 3 pages.
Decision to Grant received for European Patent Application No. 20158824.1, mailed on Dec. 15, 2022, 3 pages.
Examiner's Answer to Appeal Brief received for U.S. Appl. No. 17/031,877, mailed on Jun. 29, 2023, 12 pages.
Extended European Search Report received for European Patent Application No. 18197583.0, mailed on Jun. 4, 2019, 20 pages.
Extended European Search Report received for European Patent Application No. 18197589.7, mailed on Jan. 7, 2019, 9 pages.

(56) References Cited

OTHER PUBLICATIONS

Extended European Search Report received for European Patent Application No. 19207753.5, mailed on Dec. 18, 2019, 9 pages.
Extended European Search Report received for European Patent Application No. 20158824.1, mailed on Aug. 10, 2020, 13 pages.
Extended European Search Report received for European Patent Application No. 21197457.1, mailed on Nov. 15, 2021, 8 pages.
Extended European Search Report received for European Patent Application No. 22201007.6, mailed on Jan. 12, 2023, 7 pages.
Final Office Action received for U.S. Appl. No. 15/910,263, mailed on Aug. 28, 2019, 32 pages.
Final Office Action received for U.S. Appl. No. 16/702,968, mailed on Jul. 27, 2020, 21 pages.
Final Office Action received for U.S. Appl. No. 16/803,849, mailed on Nov. 2, 2021, 37 pages.
Final Office Action received for U.S. Appl. No. 16/803,849, mailed on Sep. 24, 2020, 29 pages.
Final Office Action received for U.S. Appl. No. 16/807,604, mailed on Aug. 19, 2020, 35 pages.
Final Office Action received for U.S. Appl. No. 17/031,833, mailed on Jan. 26, 2021, 17 pages.
Final Office Action received for U.S. Appl. No. 17/031,877, mailed on Aug. 4, 2022, 35 pages.
Final Office Action received for U.S. Appl. No. 17/031,877, mailed on Oct. 27, 2021, 24 pages.
Final Office Action received for U.S. Appl. No. 17/742,273, mailed on Feb. 15, 2023, 56 pages.
Final Office Action received for U.S. Appl. No. 17/747,804, mailed on Apr. 28, 2023, 17 pages.
Intention to Grant received for Danish Patent Application No. PA201770392, mailed on Aug. 31, 2018, 2 pages.
Intention to Grant received for Danish Patent Application No. PA201770392, mailed on Jul. 2, 2018, 2 pages.
Intention to Grant received for Danish Patent Application No. PA201770401, mailed on Jun. 14, 2018, 2 Pages.
Intention to Grant received for Danish Patent Application No. PA201770401, mailed on Sep. 17, 2018, 2 pages.
Intention to Grant received for Danish Patent Application No. PA201770403, mailed on May 7, 2018, 2 pages.
Intention to Grant received for Danish Patent Application No. PA201770403, mailed on Oct. 3, 2018, 2 pages.
Intention to Grant received for Danish Patent Application No. PA201770404, mailed on Sep. 23, 2019, 3 pages.
Intention to Grant received for Danish Patent Application No. PA201770406, mailed on Feb. 6, 2020, 3 pages.
Intention to Grant received for Danish Patent Application No. PA201770408, mailed on Nov. 30, 2018, 3 pages.
Intention to Grant received for Danish Patent Application No. PA202070560, mailed on Apr. 26, 2021, 2 pages.
Intention to Grant received for Danish Patent Application No. PA202170320, mailed on Jul. 27, 2022, 2 pages.
Intention to Grant received for Danish Patent Application No. PA202270464, mailed on Feb. 20, 2023, 2 pages.
Intention to Grant received for European Patent Application No. 18197583.0, mailed on Jan. 17, 2022, 9 pages.
Intention to Grant received for European Patent Application No. 18197583.0, mailed on Jul. 23, 2021, 9 pages.
Intention to Grant received for European Patent Application No. 18197589.7, mailed on Jan. 21, 2021, 8 pages.
Intention to Grant received for European Patent Application No. 18728002.9, mailed on Apr. 12, 2023, 9 pages.
Intention to Grant received for European Patent Application No. 19207753.5, mailed on Jan. 28, 2022, 8 pages.
Intention to Grant received for European Patent Application No. 19207753.5, mailed on Sep. 3, 2021, 8 pages.
Intention to Grant received for European Patent Application No. 20158824.1, mailed on Aug. 11, 2022, 10 pages.
International Preliminary Report on Patentability received for PCT Patent Application No. PCT/US2018/032904, mailed on Nov. 28, 2019, 14 pages.
International Search Report and Written Opinion received for PCT Patent Application No. PCT/US2018/032904, mailed on Oct. 1, 2018, 21 pages.
International Search Report and Written Opinion received for PCT Patent Application No. PCT/US2022/029282, mailed on Nov. 9, 2022, 22 pages.
Invitation to Pay Addition Fees and Partial International Search Report received for PCT Patent Application No. PCT/US2018/032904, mailed on Jul. 31, 2018, 18 pages.
Invitation to Pay Additional Fees and Partial International Search Report received for PCT Patent Application No. PCT/US2022/029282, mailed on Sep. 15, 2022, 15 pages.
Invitation to Pay Search Fees received for European Patent Application No. 18728002.9, mailed on Sep. 2, 2020, 8 pages.
Minutes of Oral Proceedings received for European Patent Application No. 18728002.9, mailed on Dec. 22, 2022, 7 pages.
Minutes of the Oral Proceedings received for European Patent Application No. 18197583.0, mailed on Mar. 9, 2021, 6 pages.
Non-Final Office Action received for U.S. Appl. No. 15/910,263, mailed on Jun. 15, 2020, 38 pages.
Non-Final Office Action received for U.S. Appl. No. 15/910,263, mailed on Mar. 4, 2019, 26 pages.
Non-Final Office Action received for U.S. Appl. No. 16/702,968, mailed on Apr. 8, 2020, 20 pages.
Non-Final Office Action received for U.S. Appl. No. 16/803,849, mailed on Jul. 13, 2020, 23 pages.
Non-Final Office Action received for U.S. Appl. No. 16/803,849, mailed on May 14, 2021, 34 pages.
Non-Final Office Action received for U.S. Appl. No. 16/807,604, mailed on Jun. 2, 2020, 28 pages.
Non-Final Office Action received for U.S. Appl. No. 16/836,571, mailed on Mar. 25, 2021, 28 pages.
Non-Final Office Action received for U.S. Appl. No. 17/031,833, mailed on Dec. 7, 2020, 13 pages.
Non-Final Office Action received for U.S. Appl. No. 17/031,877, mailed on Mar. 2, 2022, 33 pages.
Non-Final Office Action received for U.S. Appl. No. 17/031,877, mailed on Mar. 19, 2021, 20 pages.
Non-Final Office Action received for U.S. Appl. No. 17/461,103, mailed on Nov. 22, 2021, 15 pages.
Non-Final Office Action received for U.S. Appl. No. 17/742,273, mailed on Dec. 7, 2022, 47 pages.
Non-Final Office Action received for U.S. Appl. No. 17/747,804, mailed on Mar. 1, 2023, 14 pages.
Non-Final Office Action received for U.S. Appl. No. 17/752,582, mailed on Mar. 6, 2023, 17 pages.
Non-Final Office Action received for U.S. Appl. No. 17/835,110, mailed on Apr. 3, 2023, 28 pages.
Non-Final Office Action received for U.S. Appl. No. 18/077,971, mailed on Apr. 3, 2023, 24 pages.
Notice of Acceptance received for Australian Patent Application No. 2018223051, mailed on Oct. 30, 2018, 3 Pages.
Notice of Acceptance received for Australian Patent Application No. 2018236872, mailed on Jul. 9, 2019, 3 pages.
Notice of Acceptance received for Australian Patent Application No. 2019268111, mailed on Feb. 18, 2021, 3 pages.
Notice of Acceptance received for Australian Patent Application No. 2021203669, mailed on May 25, 2022, 3 pages.
Notice of Acceptance received for Australian Patent Application No. 2021204454, mailed on Feb. 25, 2022, 3 pages.
Notice of Acceptance received for Australian Patent Application No. 2022200515, mailed on Dec. 21, 2022, 3 pages.
Notice of Acceptance received for Australian Patent Application No. 2022200901, mailed on Mar. 9, 2023, 3 pages.
Notice of Allowance received for Chinese Patent Application No. 201811539260.0, mailed on Mar. 15, 2021, 2 pages (1 page of English Translation and 1 page of Official Copy).
Notice of Allowance received for Chinese Patent Application No. 201880001436.9, mailed on May 8, 2020, 3 pages (2 pages of English Translation and 1 page of Official Copy).
Notice of Allowance received for Chinese Patent Application No. 202010125114.4, mailed on Nov. 24, 2021, 2 pages (1 page of English Translation and 1 page of Official Copy).

(56) References Cited

OTHER PUBLICATIONS

Notice of Allowance received for Danish Patent Application No. PA201770408, mailed on Feb. 8, 2019, 2 pages.
Notice of Allowance received for U.S. Appl. No. 16/702,968, mailed on Apr. 21, 2021, 20 pages.
Notice of Allowance received for U.S. Appl. No. 15/910,263, mailed on Feb. 18, 2021, 3 pages.
Notice of Allowance received for U.S. Appl. No. 15/910,263, mailed on Jan. 22, 2021, 33 pages.
Notice of Allowance received for U.S. Appl. No. 16/803,849, mailed on May 17, 2022, 12 pages.
Notice of Allowance received for U.S. Appl. No. 16/807,604, mailed on Apr. 30, 2021, 25 pages.
Notice of Allowance received for U.S. Appl. No. 16/836,571, mailed on Feb. 14, 2022, 31 pages.
Notice of Allowance received for U.S. Appl. No. 16/836,571, mailed on Sep. 8, 2021, 25 pages.
Notice of Allowance received for U.S. Appl. No. 17/031,833, mailed on Jun. 25, 2021, 15 pages.
Notice of Allowance received for U.S. Appl. No. 17/031,833, mailed on Sep. 20, 2021, 6 pages.
Notice of Allowance received for U.S. Appl. No. 17/461,103, mailed on Jun. 20, 2022, 6 pages.
Notice of Allowance received for U.S. Appl. No. 17/461,103, mailed on Mar. 17, 2022, 10 pages.
Notice of Allowance received for U.S. Appl. No. 17/752,582, mailed on Jun. 13, 2023, 18 pages.
Notice of Allowance received for U.S. Appl. No. 18/077,905, mailed on Mar. 24, 2023, 18 pages.
Office Action received for Australian Patent Application No. 2018236870, mailed on Jul. 29, 2019, 7 pages.
Notice Action received for Australian Patent Application No. 2018236870, mailed on Nov. 21, 2018, 10 pages.
Office Action received for Australian Patent Application No. 2018236870, mailed on Oct. 31, 2019, 8 pages.
Office Action received for Australian Patent Application No. 2018236872, mailed on Nov. 23, 2018, 4 pages.
Office Action received for Australian Patent Application No. 2019268111, mailed on Oct. 27, 2020, 7 pages.
Office Action received for Australian Patent Application No. 2021203669, mailed on Apr. 5, 2022, 3 pages.
Office Action received for Australian Patent Application No. 2021204454, mailed on Aug. 9, 2021, 7 pages.
Office Action received for Australian Patent Application No. 2022200515, mailed on Nov. 2, 2022, 2 pages.
Office Action received for Australian Patent Application No. 2022200901, mailed on Dec. 19, 2022, 4 pages.
Office Action received for Australian Patent Application No. 2022241590, mailed on Jun. 7, 2023, 7 pages.
Office Action received for Australian Patent Application No. 2022241590, mailed on Mar. 17, 2023, 5 pages.
Office Action received for Australian Patent Application No. 2022241590, mailed on Nov. 18, 2022, 8 pages.
Office Action received for Chinese Patent Application No. 201811539259.8, mailed on Apr. 3, 2020, 10 pages (6 pages of English Translation and 4 pages of Official Copy).
Office Action received for Chinese Patent Application No. 201811539259.8, mailed on Mar. 13, 2023, 16 pages (8 pages of English Translation and 8 pages of Official Copy).
Office Action received for Chinese Patent Application No. 201811539259.8, mailed on May 24, 2023, 25 pages (5 pages of English Translation and 20 pages of Official Copy).
Office Action received for Chinese Patent Application No. 201811539259.8, mailed on Sep. 3, 2020, 10 pages (6 pages of English Translation and 4 pages of Official Copy).
Office Action received for Chinese Patent Application No. 201811539259.8, mailed on Sep. 18, 2019, 12 pages (6 pages of English Translation and 6 pages of Official Copy).
Office Action received for Chinese Patent Application No. 201811539260.0, mailed on Jun. 3, 2020, 8 pages (5 pages of English Translation and 3 pages of Official Copy).
Office Action received for Chinese Patent Application No. 201811539260.0, mailed on Nov. 4, 2020, 9 pages (5 pages of English Translation and 4 pages of Official Copy).
Office Action received for Chinese Patent Application No. 201811539260.0, mailed on Oct. 8, 2019, 14 pages (7 pages of English Translation and 7 pages of Official Copy).
Office Action received for Chinese Patent Application No. 201880001436.9, mailed on Apr. 28, 2019, 19 pages (11 pages of English Translation and 8 pages of Official copy).
Office Action received for Chinese Patent Application No. 201880001436.9, mailed on Nov. 6, 2019, 24 pages (15 pages of English Translation and 9 pages of Official Copy).
Office Action received for Chinese Patent Application No. 201911128105.4, mailed on Apr. 8, 2021, 10 pages (5 pages of English Translation and 5 pages of Official Copy).
Office Action received for Chinese Patent Application No. 201911128105.4, mailed on Jan. 4, 2021, 14 pages (7 pages of English Translation and 7 pages of Official Copy).
Office Action received for Chinese Patent Application No. 201911128105.4, mailed on Jul. 3, 2020, 18 pages (9 pages of English Translation and 9 pages of Official Copy).
Office Action received for Chinese Patent Application No. 202010125114.4, mailed on Aug. 21, 2020, 16 pages (8 pages of English Translation and 8 pages of Official Copy).
Office Action received for Chinese Patent Application No. 202010125114.4, mailed on Jun. 7, 2021, 7 pages (4 pages of English Translation and 3 pages of Official Copy).
Office Action received for Chinese Patent Application No. 202010125114.4, mailed on Mar. 1, 2021, 15 pages (9 pages of English Translation and 6 pages of Official Copy).
Office Action received for Danish Patent Application No. PA201770392, mailed on Apr. 17, 2018, 2 pages.
Office Action received for Danish Patent Application No. PA201770392, mailed on Dec. 8, 2017, 4 pages.
Office Action received for Danish Patent Application No. PA201770392, mailed on Jun. 20, 2017, 11 pages.
Office Action received for Danish Patent Application No. PA201770401, mailed on Jan. 31, 2018, 3 pages.
Office Action received for Danish Patent Application No. PA201770401, mailed on May 17, 2018, 3 Pages.
Office Action received for Danish Patent Application No. PA201770402, mailed on Apr. 16, 2018, 5 pages.
Office Action received for Danish Patent Application No. PA201770402, mailed on Dec. 18, 2017, 6 pages.
Office Action received for Danish Patent Application No. PA201770402, mailed on Jun. 19, 2017, 11 pages.
Office Action received for Danish Patent Application No. PA201770403, mailed on Dec. 12, 2017, 3 pages.
Office Action received for Danish Patent Application No. PA201770403, mailed on Jun. 16, 2017, 8 pages.
Office Action received for Danish Patent Application No. PA201770404, mailed on Aug. 8, 2018, 4 pages.
Office Action received for Danish Patent Application No. PA201770404, mailed on Dec. 1, 2017, 5 pages.
Office Action received for Danish Patent Application No. PA201770404, mailed on Feb. 21, 2019, 2 pages.
Office Action received for Danish Patent Application No. PA201770404, mailed on May 1, 2019, 2 pages.
Office Action received for Danish Patent Application No. PA201770406, mailed on Feb. 27, 2018, 7 pages.
Office Action received for Danish Patent Application No. PA201770406, mailed on Jan. 25, 2019, 8 pages.
Office Action received for Danish Patent Application No. PA201770406, mailed on Jun. 22, 2017, 11 pages.
Office Action received for Danish Patent Application No. PA201770406, mailed on Mar. 26, 2019, 3 pages.
Office Action received for Danish Patent Application No. PA201770406, mailed on Nov. 11, 2019, 4 pages.
Office Action received for Danish Patent Application No. PA201770408, mailed on Dec. 21, 2017, 6 pages.

(56) References Cited

OTHER PUBLICATIONS

Office Action received for Danish Patent Application No. PA201770408, mailed on Jun. 20, 2017, 9 pages.
Office Action received for Danish Patent Application No. PA201770408, mailed on May 3, 2018, 7 pages.
Office Action received for Danish Patent Application No. PA201770410, mailed on Apr. 9, 2018, 5 pages.
Office Action received for Danish Patent Application No. PA201770410, mailed on Jun. 23, 2017, 9 pages.
Office Action received for Danish Patent Application No. PA201770410, mailed on Nov. 22, 2018, 5 pages.
Office Action received for Danish Patent Application No. PA201870060, mailed on Jan. 15, 2019, 4 pages.
Office Action received for Danish Patent Application No. PA201870060, mailed on Jul. 25, 2019, 2 pages.
Office Action received for Danish Patent Application No. PA201870419, mailed on Feb. 27, 2020, 8 pages.
Office Action received for Danish Patent Application No. PA201870419, mailed on Sep. 30, 2019, 4 pages.
Office Action received for Danish Patent Application No. PA201870598, mailed on May 1, 2019, 3 pages.
Office Action received for Danish Patent Application No. PA201870598, mailed on Nov. 8, 2019, 4 pages.
Office Action received for Danish Patent Application No. PA202070560, mailed on Dec. 11, 2020, 7 pages.
Office Action received for Danish Patent Application No. PA202070560, mailed on Mar. 10, 2021, 7 pages.
Office Action received for Danish Patent Application No. PA202070618, mailed on Oct. 15, 2021, 4 pages.
Office Action received for Danish Patent Application No. PA202170320, mailed on May 3, 2022, 3 pages.
Office Action received for Danish Patent Application No. PA202270464, mailed on Dec. 20, 2022, 3 pages.
Office Action received for Danish Patent Application No. PA202270464, mailed on Oct. 25, 2022, 9 pages.
Office Action received for European Patent Application No. 18197583.0, mailed on Feb. 28, 2020, 8 pages.
Office Action received for European Patent Application No. 18197589.7, mailed on Oct. 1, 2019, 5 pages.
Office Action received for European Patent Application No. 18728002.9, mailed on Dec. 14, 2020, 15 pages.
Office Action received for European Patent Application No. 19207753.5, mailed on May 10, 2021, 4 pages.
Office Action received for European Patent Application No. 19207753.5, mailed on Nov. 12, 2020, 5 pages.
Office Action received for European Patent Application No. 20158824.1, mailed on Jun. 13, 2022, 5 pages.
Office Action received for European Patent Application No. 20158824.1, mailed on May 18, 2021, 10 pages.
Office Action received for European Patent Application No. 21197457.1, mailed on May 30, 2023, 8 pages.
Office Action received for European Patent Application No. 21197457.1, mailed on Sep. 2, 2022, 8 pages.
Partial European Search Report received for European Patent Application No. 20158824.1, mailed on May 8, 2020, 14 pages.
Partial European Search Report received for European Patent Application No. 18197583.0, mailed on Jan. 14, 2019, 18 pages.
Result of Consultation received for European Patent Application No. 18197583.0, mailed on Feb. 24, 2021, 3 pages.
Result of Consultation received for European Patent Application No. 18197589.7, mailed on Dec. 1, 2020, 9 pages.
Result of Consultation received for European Patent Application No. 18197589.7, mailed on Dec. 17, 2020, 6 pages.
Result of Consultation received for European Patent Application No. 20158824.1, mailed on May 17, 2022, 7 pages.
Search Report and Opinion received for Danish Patent Application No. PA201770401, mailed on Jun. 19, 2017, 6 pages.
Search Report and Opinion received for Danish Patent Application No. PA201870060 mailed on Apr. 30, 2018, 7 pages.
Search Report and Opinion received for Danish Patent Application No. PA201870419, mailed on Aug. 27, 2018, 7 pages.
Search Report and Opinion received for Danish Patent Application No. PA201870419, mailed on Sep. 10, 2018, 9 pages.
Search Report and Opinion received for Danish Patent Application No. PA201870598, mailed on Dec. 5, 2018, 8 pages.
Search Report and Opinion received for Danish Patent Application No. PA202070618, mailed on Dec. 7, 2020, 9 pages.
Search Report and Opinion received for Danish Patent Application No. PA202170320, mailed on Oct. 6, 2021, 9 pages.
Search Report received for Danish Patent Application No. PA201770404, mailed on Jun. 20, 2017, 8 Pages.
Search Report received for Danish Patent Application No. PA201770409, mailed on Jun. 20, 2017, 9 Pages.
Summons to Attend Oral Proceedings received for European Patent Application 20158824.1, mailed on Dec. 7, 2021, 6 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Summons to Attend Oral Proceedings received for European Patent Application No. 18728002.9, mailed on Jun. 3, 2022, 15 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Call Me, "Samsung R3 speaker gives you a delicious 360-degree sound experience—with Wi-Fi and Bluetooth | Call me", 0:24 / 3:22, Available Online at: <https://www.youtube.com/watch?v=4Uv_sOhrlro>, Sep. 22, 2016, 3 pages.
Computeradv, "Sonos App Navigation & Menu on iPhone", Available online at: https://www.youtube.com/watch?v=Jhz9XvWQ204, Aug. 4, 2015, 1 page.
Crutnacker, "Amazon Echo Tips and Tricks: Playing Music Demonstration", Available Online at: https://www.youtube.com/watch?v=W_bqq2ynUll, Nov. 4, 2015, 1 page.
Review: Samsung Radiant R3 Wireless Speakers, Available Online at: <https://www.youtube.com/watch?v=ZBICVE1WdKE>, Jan. 19, 2016, 3 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Jarvie, "Alexa plays me music", Available online at: https://www.youtube.com/watch?v=bR2ZC8Sy8YQ, Feb. 23, 2015, 1 page.
NBC News, "NBC News—YouTube Democratic Debate (full)", Online available at:—https://www.youtube.com/watch?v=ti2Nokoq1J4, Jan. 17, 2016, 1 page.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.

(56) References Cited

OTHER PUBLICATIONS

PartyShare—turn your Xperia into a jukebox, Available at: https://forum.xda-developers.com/crossdevice-dev/sony/app-partyshare-xperia-jukebox-t2877807, Sep. 15, 2014, 5 pages.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Smarttricks, "Top 3 Music Player for Android", Available online at: <https://www.youtube.com/watch?v=He7RTn4CL34>, Feb. 22, 2017, 4 pages.
Sonos, "Sonos Controller App for iPad Product Guide", Available online at:—https://www.sonos.com/documents/productguides/en/iPadGuide_EN.pdf, Nov. 2014, 47 pages.
Woolsey Amanda, "Apple Watch Tips—How to Add and Play Music", Available online at: <https://www.youtube.com/watch?v=EOQEuqMaoi8>, Apr. 26, 2015, 3 pages.
Applicant-Initiated Interview Summary received for U.S. Appl. No. 17/742,273, mailed on Sep. 27, 2023, 4 pages.
Applicant-Initiated Interview Summary received for U.S. Appl. No. 17/978,930. mailed on Apr. 26, 2024, 4 pages.
Applicant-Initiated Interview Summary received for U.S. Appl. No. 17/978,930. mailed on Mar. 13, 2024, 3 pages.
Applicant-Initiated Interview Summary received for U.S. Appl. No. 18/204,888, mailed on Aug. 5, 2024, 4 pages.
Brief Communication Regarding Oral Proceedings received for European Patent Application No. 21197457.1, mailed on Jun. 19, 2024, 1 page.
Brief Communication Regarding Oral Proceedings received for European Patent Application No. 21197457.1, mailed on May 23, 2024, 5 pages.
Decision on Appeal received for U.S. Appl. No. 17/031,877, mailed on Mar. 27, 2024, 24 pages.
Decision to Grant received for European Patent Appiicatian No. 1872800.2.9, mailed an Aug. 31, 2023. 4 pages.
Extended Eurepean Search Report received for European patent Application No. 23191379.9, mailed on Sep. 18, 2023, 8 pages.
Final Office Action received far U.S. Appl. No. 17/742,273, mailed on Oct. 12, 2023, 58 pages.
Final Office Action received for U.S. Appl. No. 17/978,930, mailed on Apr. 5, 2024, 28 pages.
Intention to Grant received for European Patent Application No. 21197457.1, mailed on Jul. 9, 2024, 12 pages.
International Preliminary Report on Patentability received for PCT Patent Application No. PCT/US2022/029282, mailed on Nov. 30, 2023, 17 pages.
International Search Report and Written Opinion received for PCT Patent Application No. PCT/US2023/024279, mailed on Nov. 17, 2023, 20 pages.
International Search Report and Written Opinion received for PCT Patent Application No. PCT/US2023/031749, mailed on Dec. 6, 2023, 23 pages.
Invitation to Pay Additionai Fees and Partial International Search Report received for PCT Patent Application No. PCT/US2023/024279, mailed on Sep. 26, 2023, 12 pages.
Minutes of the Oral Proceedings received for European Patent Application No. 21197457.1. mailed on Jul. 3, 2024, 9 pages.
Non-Final Office Action received for U.S. Appl. No. 17/031,877, mailed on Jun. 20, 2024, 47 pages.
Non-Final Office Action received for U.S. Appl. No. 17/742,273, mailed on Sep. 13, 2023, 58 pages.
Non-Final Office Action received for U.S. Appl. No. 17/747,804, mailed on Jun. 4, 2024, 20 pages.
Non-Final Office Action received for U.S. Appl. No. 17/978,930, mailed on Feb. 12, 2024, 25 pages.
Non-Final Office Action received for U.S. Appl. No. 18/204,888, mailed on Jul. 18, 2024, 21 pages.
Notice of Acceptance received for Australian Patent Application No. 2022241590, mailed on Nov. 14, 2023, 3 pages.
Notice of Acceptance received for Chinese Patent Application No. 201911128105.4, mailed on May 24, 2024, 2 pages (1 page of English Translation and 1 page of Official Copy).
Notice of Acceptance received for Chinese Patent Application No. 202010728711.6, mailed on Jul. 1, 2024, 2 pages (1 page of English Translation and 1 page of Official Copy).
Notice of Allowance received for U.S. Appl. No. 17/978,930, mailed on Aug. 19, 2024, 9 pages.
Notice of Allowance received for U.S. Appl. No. 18/077,891, mailed on Oct. 19, 2023, 18 pages.
Office Action received for Australian Patent Application No. 2022241590, mailed on Aug. 15, 2023, 6 pages.
Office Action received for Chinese Patent Application No. 201911128105.4, mailed on Mar. 16, 2024, 7 pages (4 pages of English Translation and 3 pages of Official Copy).
Office Action received for Chinese Patent Application No. 201911128105.4, mailed on Mar. 19, 2024, 16 pages (8 pages of English Translation and 8 pages of Official Copy).
Office Action received for Chinese Patent Application No. 202010728711.6, mailed on Feb. 1, 2024, 30 pages (18 pages of English Translation and 12 pages of Official Copy).
Office Action received for Chinese Patent Application No. 202010728844.3, mailed on Jan. 27, 2024, 16 pages (8 pages of English Translation and 8 pages of Official Copy).
Office Action received for European Patent Application No. 22201007.6, mailed on Jul. 18, 2024, 4 pages.
Office Action received for European Patent Application No. 22201007.6, mailed on Mar. 13, 2024, 4 pages.
Office Action received for European Patent Application No. 22201007.6, mailed on Oct. 9, 2023, 5 pages.
Record of Oral Hearing received for U.S. Appl. No. 17/031,877, mailed on Feb. 4, 2024, 14 pages.
Summons to Attend Oral Preoceedings received for European Patent Application No. 21197457.1, mailed on Nov. 23, 2023, 12 pages.
Result of Consultation received for European Patent Application No. 22201007.6, mailed on Aug. 20, 2024, 3 pages.
Advisory Action received for U.S. Appl. No. 18/204,888, mailed on Dec. 13, 2024, 3 pages.
Applicant-Initiated Interview Summary received for U.S. Appl. No. 17/991,708, mailed on Dec. 16, 2024, 5 pages.
Applicant-Initiated Interview Summary received for U.S. Appl. No. 18/204,888, mailed on Nov. 27, 2024, 4 pages.
Applicant-Initiated Interview Summary received for U.S. Appl. No. 18/504,001, mailed on Oct. 29, 2024, 4 pages.
Decision to Grant received for European Patent Application No. 21197457.1, mailed on Jan. 7, 2025, 4 pages.
Final Office Action received for U.S. Appl. No. 17/031,877, mailed on Oct. 30, 2024, 49 pages.
Final Office Action received for U.S. Appl. No. 17/991,708, mailed on Dec. 30, 2024, 22 pages.
Final Office Action received for U.S. Appl. No. 18/204,888, mailed on Nov. 18, 2024, 21 pages.
Intention to Grant received for European Patent Application No. 21197457.1, mailed on Nov. 21, 2024, 12 pages.
Intention to Grant received for European Patent Application No. 21197457.1, mailed on Oct. 24, 2024, 12 pages.
International Preliminary Report on Patentability received for PCT Patent Application No. PCT/US2023/024279, mailed on Dec. 12, 2024, 15 pages.
Non-Final Office Action received for U.S. Appl. No. 17/991,708, mailed on Oct. 22, 2024, 20 pages.
Non-Final Office Action received for U.S. Appl. No. 18/504,001, mailed on Oct. 9, 2024, 28 pages.
Notice of Acceptance received for Australian Patent Application No. 2024200283, mailed on Nov. 13, 2024, 3 pages.
Notice of Allowance received for Chinese Patent Application No. 202010728844.3, mailed on Sep. 29, 2024, 2 pages (1 page of English Translation and 1 page of Official Copy).
Notice of Allowance received for U.S. Appl. No. 18/077,891, mailed on Dec. 10, 2024, 9 pages.
Office Action received for Australian Patent Application No. 2024200283, mailed on Oct. 8, 2024, 2 pages.

(56) References Cited

OTHER PUBLICATIONS

Prabeesh RK., "Android Studio Tutorial—17—Highlight selected item in a List View", Available Online at: https://www.youtube.com/watch?v=W6bBYmXP0HY, Feb. 24, 2015, 5 pages.

International Preliminary Report on Patentability received for PCT Patent Application No. PCT/US2023/031749, mailed on Mar. 13, 2025, 19 pages.

* cited by examiner

700 ⟶

702
While the computer system is configured to provide output associated with content displayed on a display generation component, receive information associated with the content displayed on the display generation component.

704
In response to receiving the information associated with the content displayed on the display generation component, output, via the one or more light sources, light in accordance with the received information associated with the content displayed on the display generation component.

706
While displaying the trailer page, the trailer page including a playback user interface object:

708
In accordance with a determination that user input corresponding to the playback user interface object has been received, output, via the one or more light sources, the light as dynamic light.

710
In accordance with a determination that user input corresponding to the playback user interface object has not been received, output, via the one or more light sources, the light as static light.

712
Prior to receiving an indication of user input corresponding to the playback user interface object, output, via the one or more light sources, the light having a first brightness.

714
In response to receiving the indication of user input corresponding to the playback user interface object, output, via the one or more light sources, the light having a second brightness, greater than the first brightness.

FIG. 7A

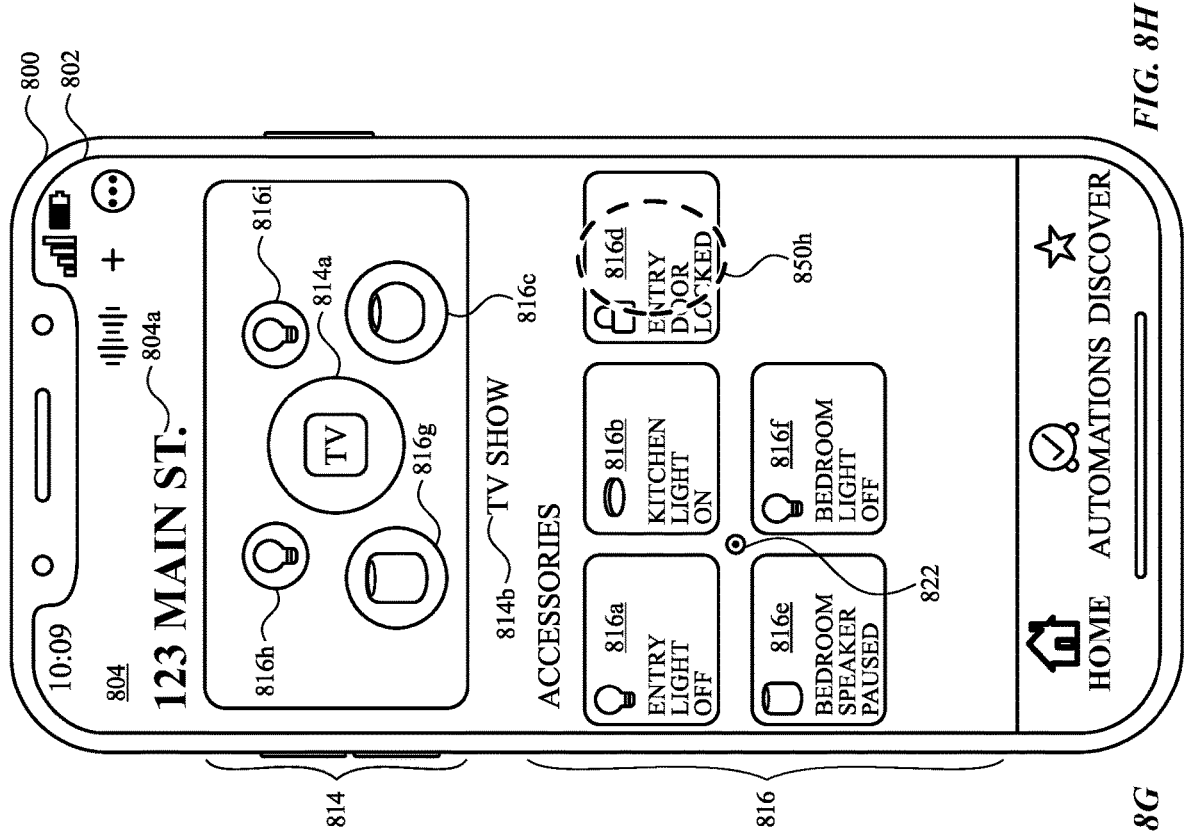
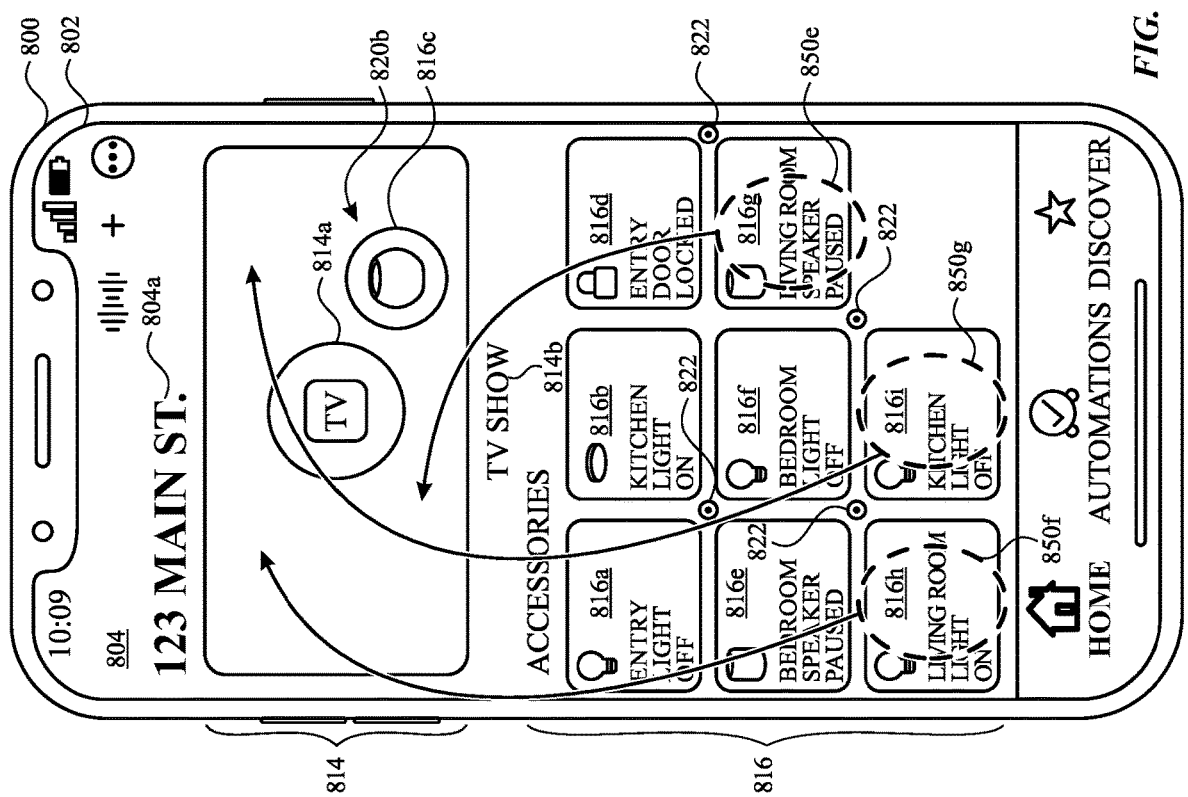

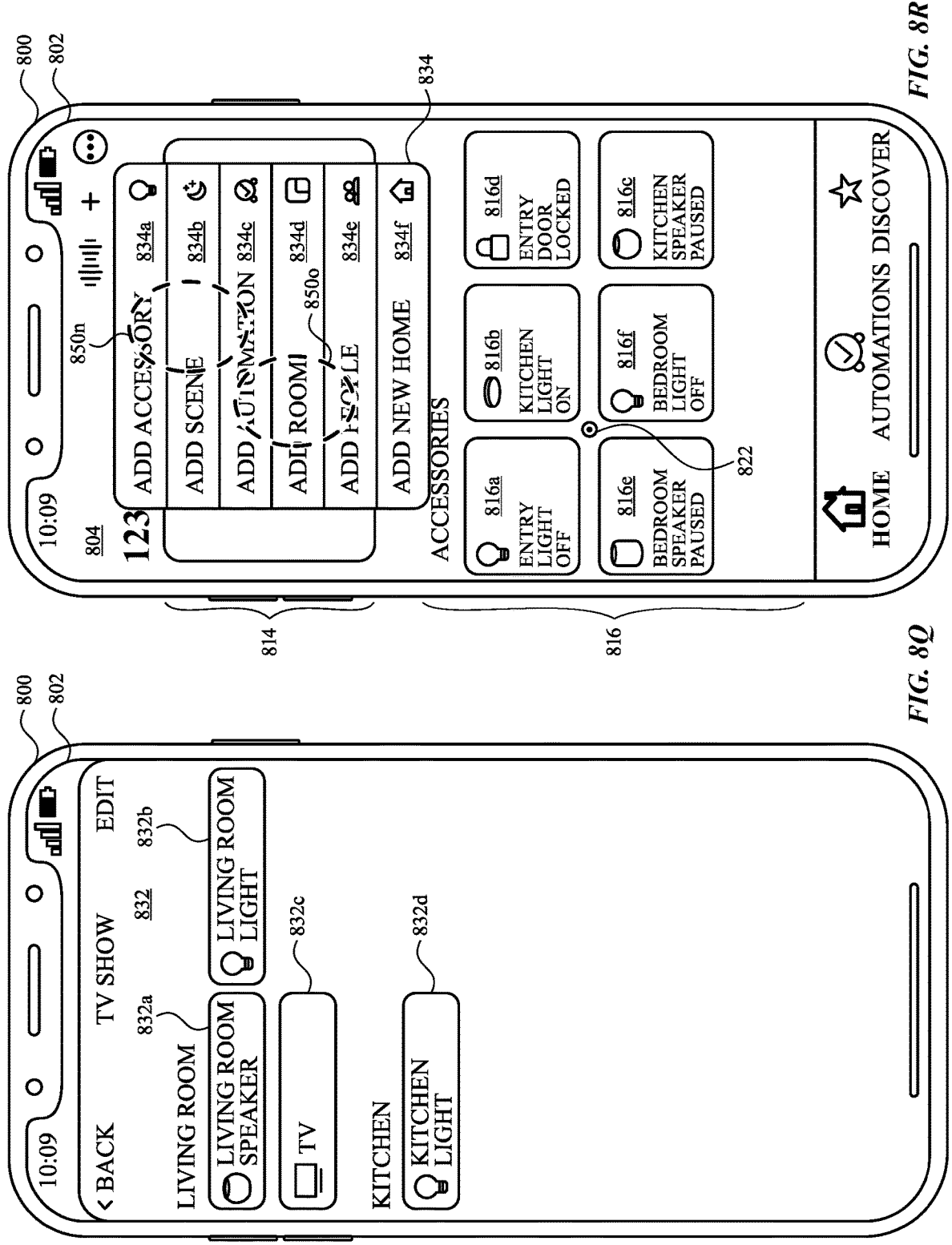

900 ⤵

902
While displaying, via the display generation component, a user interface that includes a user interface object that, when selected, provides options for controlling a first remotely controllable external device, where the first remotely controllable external device is associated with a context, detect, via the one or more input devices, a request to associate a second remotely controllable external device with the context.

↓

904
In response to detecting the request to associate the second remotely controllable external device with the context:

906
In accordance with a determination that the second remotely controllable external device satisfies a set of one or more criteria, associate the second remotely controllable external device with the context.

908
In accordance with a determination that the second remotely controllable external device does not satisfy the set of one or more criteria, where the set of one or more criteria are not met when the second remotely controllable external device includes a first function that does not correspond to a second function of the first remotely controllable external device, forgo associating the second remotely controllable external device with the context.

↓

910
In response to detecting a request to associate the third remotely controllable external device with the context:

912
In accordance with a determination that the third remotely controllable external device satisfies the set of one or more criteria, associate the third remotely controllable external device with the context.

914
In accordance with the determination that the second remotely controllable external device satisfies the set of one or more criteria, display, via the display generation component, an animation of the third device user interface object moving from the device region toward a designated region of the user interface that includes the user interface object.

916
In accordance with the determination that the second remotely controllable external device satisfies the set of one or more criteria:

918
Forgo display of the third device user interface object in the device region.

920
Display, via the display generation component, a second user interface object in a second designated region of the user interface that includes the user interface object, where the second user interface object corresponds to the second remotely controllable external device.

922
In accordance with the determination that the second remotely controllable external device does not satisfy the set of one or more criteria, display, via the display generation component, an animation of the third device user interface object indicating that the second remotely controllable external device does not satisfy the set of one or more criteria.

FIG. 9B

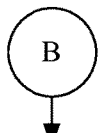

924
In accordance with the determination that the second remotely controllable external device satisfies the set of one or more criteria, display, via the display generation component, a third user interface object corresponding to the second remotely controllable external device in a third designated region, where:

926
The third designated region includes the user interface object.

928
The first remotely controllable external device is a primary device associated with the context.

930
The user interface object corresponding to the first remotely controllable external device is displayed at a first size that is greater than a second size of the third user interface object corresponding to the second remotely controllable external device.

932
In accordance with a determination that the first remotely controllable external device and the second remotely controllable external device include a first configuration, display the third user interface object at a first location within the third designated region relative to the user interface object.

934
In accordance with a determination that the first remotely controllable external device and the second remotely controllable external device include a second configuration, different from the first configuration, display the third user interface object at a second location, different from the first location, within the third designated region relative to the user interface object.

FIG. 9C

CONTENT OUTPUT DEVICES AND USER INTERFACES

CROSS-REFERENCE TO RELATED APPLICATIONS

This application claims priority to U.S. Provisional Patent Application Ser. No. 63/403,495, entitled "CONTENT OUTPUT DEVICES AND USER INTERFACES," filed on Sep. 2, 2022, the content of which is hereby incorporated by reference in its entirety.

FIELD

The present disclosure relates generally to computer user interfaces, and more specifically to techniques for outputting light and managing controllable devices.

BACKGROUND

Electronic devices are configured to display visual content on a display, such as images and/or videos corresponding to a media file. Light sources are configured to generate light having different colors, brightness, and/or other properties. In addition, some electronic devices can be used to group accessory devices so that the accessory devices can output content in conjunction with one another.

BRIEF SUMMARY

Some techniques for outputting light and managing controllable devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for outputting light and managing controllable devices. Such methods and interfaces optionally complement or replace other methods for outputting light and managing controllable devices. Such methods and interfaces reduce the cognitive burden on a user and produce a more efficient human-machine interface. Such methods and interfaces also reduce the number of unnecessary, extraneous, and/or repetitive user inputs. For battery-operated computing devices, such methods and interfaces conserve power and increase the time between battery charges.

In accordance with some embodiments, a method is described. The method is performed at a computer system that is in communication with one or more light sources. The method comprises: while the computer system is configured to provide output associated with content displayed on a display generation component, receiving information associated with the content displayed on the display generation component; and in response to receiving the information associated with the content displayed on the display generation component, outputting, via the one or more light sources, light in accordance with the received information associated with the content displayed on the display generation component.

In accordance with some embodiments, a non-transitory computer-readable storage medium is described. The non-transitory computer-readable storage medium stores one or more programs configured to be executed by one or more processors of a computer system that is in communication with one or more light sources, the one or more programs including instructions for: while the computer system is configured to provide output associated with content displayed on a display generation component, receiving information associated with the content displayed on the display generation component; and in response to receiving the information associated with the content displayed on the display generation component, outputting, via the one or more light sources, light in accordance with the received information associated with the content displayed on the display generation component.

In accordance with some embodiments, a transitory computer-readable storage medium is described. The transitory computer-readable storage medium stores one or more programs configured to be executed by one or more processors of a computer system that is in communication with one or more light sources, the one or more programs including instructions for: while the computer system is configured to provide output associated with content displayed on a display generation component, receiving information associated with the content displayed on the display generation component; and in response to receiving the information associated with the content displayed on the display generation component, outputting, via the one or more light sources, light in accordance with the received information associated with the content displayed on the display generation component.

In accordance with some embodiments, a computer system is described. The computer system is in communication with one or more light sources. The computer system comprises: one or more processors; and memory storing one or more programs configured to be executed by the one or more processors, the one or more programs including instructions for: while the computer system is configured to provide output associated with content displayed on a display generation component, receiving information associated with the content displayed on the display generation component; and in response to receiving the information associated with the content displayed on the display generation component, outputting, via the one or more light sources, light in accordance with the received information associated with the content displayed on the display generation component.

In accordance with some embodiments, a computer system is described. The computer system is in communication with one or more light sources. The computer system comprises: means for, while the computer system is configured to provide output associated with content displayed on a display generation component, receiving information associated with the content displayed on the display generation component; and means for, in response to receiving the information associated with the content displayed on the display generation component, outputting, via the one or more light sources, light in accordance with the received information associated with the content displayed on the display generation component.

In accordance with some embodiments, a computer program product is described. The computer program product comprises one or more programs configured to be executed by one or more processors of a computer system that is in communication with one or more light sources, the one or more programs including instructions for: while the computer system is configured to provide output associated with content displayed on a display generation component, receiving information associated with the content displayed on the display generation component; and in response to receiving the information associated with the content displayed on the display generation component, outputting, via the one or more light sources, light in accordance with the received information associated with the content displayed on the display generation component.

In accordance with some embodiments, a method is described. The method is performed at a computer system that is in communication with one or more input devices and a display generation component. The method comprises: while displaying, via the display generation component, a user interface that includes a user interface object that, when selected, provides options for controlling a first remotely controllable external device, where the first remotely controllable external device is associated with a context, detecting, via the one or more input devices, a request to associate a second remotely controllable external device with the context; and in response to detecting the request to associate the second remotely controllable external device with the context: in accordance with a determination that the second remotely controllable external device satisfies a set of one or more criteria, associating the second remotely controllable external device with the context; and in accordance with a determination that the second remotely controllable external device does not satisfy the set of one or more criteria, where the set of one or more criteria are not met when the second remotely controllable external device includes a first function that does not correspond to a second function of the first remotely controllable external device, forgoing associating the second remotely controllable external device with the context.

In accordance with some embodiments, a non-transitory computer-readable storage medium is described. The non-transitory computer-readable storage medium stores one or more programs configured to be executed by one or more processors of a computer system that is in communication with one or more input devices and a display generation component, the one or more programs including instructions for: while displaying, via the display generation component, a user interface that includes a user interface object that, when selected, provides options for controlling a first remotely controllable external device, where the first remotely controllable external device is associated with a context, detecting, via the one or more input devices, a request to associate a second remotely controllable external device with the context; and in response to detecting the request to associate the second remotely controllable external device with the context: in accordance with a determination that the second remotely controllable external device satisfies a set of one or more criteria, associating the second remotely controllable external device with the context; and in accordance with a determination that the second remotely controllable external device does not satisfy the set of one or more criteria, where the set of one or more criteria are not met when the second remotely controllable external device includes a first function that does not correspond to a second function of the first remotely controllable external device, forgoing associating the second remotely controllable external device with the context.

In accordance with some embodiments, a transitory computer-readable storage medium is described. The transitory computer-readable storage medium stores one or more programs configured to be executed by one or more processors of a computer system that is in communication with one or more input devices and a display generation component, the one or more programs including instructions for: while displaying, via the display generation component, a user interface that includes a user interface object that, when selected, provides options for controlling a first remotely controllable external device, where the first remotely controllable external device is associated with a context, detecting, via the one or more input devices, a request to associate a second remotely controllable external device with the context; and in response to detecting the request to associate the second remotely controllable external device with the context: in accordance with a determination that the second remotely controllable external device satisfies a set of one or more criteria, associating the second remotely controllable external device with the context; and in accordance with a determination that the second remotely controllable external device does not satisfy the set of one or more criteria, where the set of one or more criteria are not met when the second remotely controllable external device includes a first function that does not correspond to a second function of the first remotely controllable external device, forgoing associating the second remotely controllable external device with the context.

In accordance with some embodiments, a computer system is described. The computer system is in communication with one or more input devices and a display generation component. The computer system comprises: one or more processors; and memory storing one or more programs configured to be executed by the one or more processors, the one or more programs including instructions for: while displaying, via the display generation component, a user interface that includes a user interface object that, when selected, provides options for controlling a first remotely controllable external device, where the first remotely controllable external device is associated with a context, detecting, via the one or more input devices, a request to associate a second remotely controllable external device with the context; and in response to detecting the request to associate the second remotely controllable external device with the context: in accordance with a determination that the second remotely controllable external device satisfies a set of one or more criteria, associating the second remotely controllable external device with the context; and in accordance with a determination that the second remotely controllable external device does not satisfy the set of one or more criteria, where the set of one or more criteria are not met when the second remotely controllable external device includes a first function that does not correspond to a second function of the first remotely controllable external device, forgoing associating the second remotely controllable external device with the context.

In accordance with some embodiments, a computer system is described. The computer system is in communication with one or more input devices and a display generation component. The computer system comprises: means for, while displaying, via the display generation component, a user interface that includes a user interface object that, when selected, provides options for controlling a first remotely controllable external device, where the first remotely controllable external device is associated with a context, detecting, via the one or more input devices, a request to associate a second remotely controllable external device with the context; and means for, in response to detecting the request to associate the second remotely controllable external device with the context: in accordance with a determination that the second remotely controllable external device satisfies a set of one or more criteria, associating the second remotely controllable external device with the context; and in accordance with a determination that the second remotely controllable external device does not satisfy the set of one or more criteria, where the set of one or more criteria are not met when the second remotely controllable external device includes a first function that does not correspond to a second function of the first remotely controllable external device, forgoing associating the second remotely controllable external device with the context.

In accordance with some embodiments, a computer program product is described. The computer program product comprises one or more programs configured to be executed by one or more processors of a computer system that is in communication with one or more input devices and a display generation component, the one or more programs including instructions for: while displaying, via the display generation component, a user interface that includes a user interface object that, when selected, provides options for controlling a first remotely controllable external device, where the first remotely controllable external device is associated with a context, detecting, via the one or more input devices, a request to associate a second remotely controllable external device with the context; and in response to detecting the request to associate the second remotely controllable external device with the context: in accordance with a determination that the second remotely controllable external device satisfies a set of one or more criteria, associating the second remotely controllable external device with the context; and in accordance with a determination that the second remotely controllable external device does not satisfy the set of one or more criteria, where the set of one or more criteria are not met when the second remotely controllable external device includes a first function that does not correspond to a second function of the first remotely controllable external device, forgoing associating the second remotely controllable external device with the context.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for outputting light and managing controllable devices, thereby increasing the effectiveness, efficiency, and user satisfaction with such devices. Such methods and interfaces may complement or replace other methods for outputting light and managing controllable devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7C are a flow diagram of methods for outputting light, in accordance with some embodiments.

FIGS. 9A-9D are a flow diagram of methods for managing controllable devices, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for outputting light and managing controllable devices. For example, there is a need for electronic devices that can provide output, such as audio output, and also cause light to be output based on content displayed on a display device. As another example, there is a need for electronic devices that can easily associate a first accessory device with a second accessory device that is currently outputting content so that the first accessory device and the second accessory device can operate in conjunction with one another. Such techniques can reduce the cognitive burden on a user who causes light to be output and/or manages controllable devices, thereby enhancing productivity. Further, such techniques can reduce processor and battery power otherwise wasted on redundant user inputs.

Figure 6A:
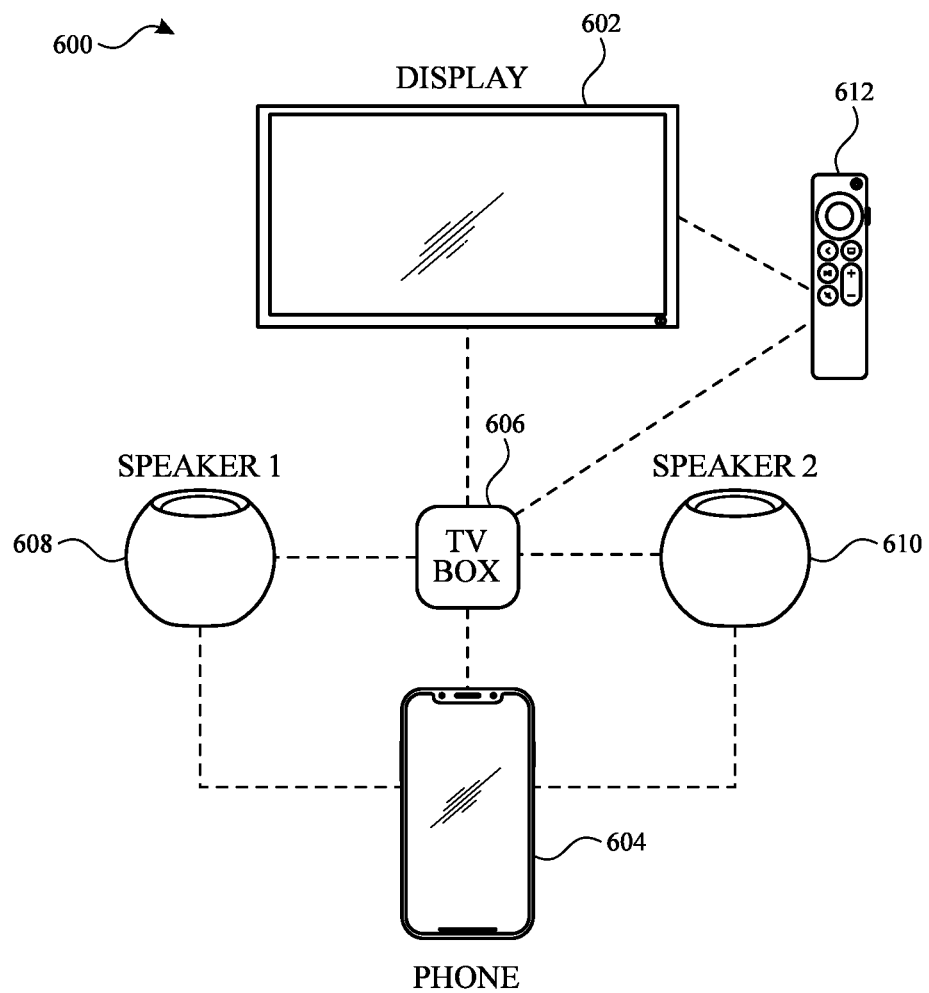
FIGS. 6A-6O illustrate example techniques for outputting light, in accordance with some embodiments.
Figure 6O:
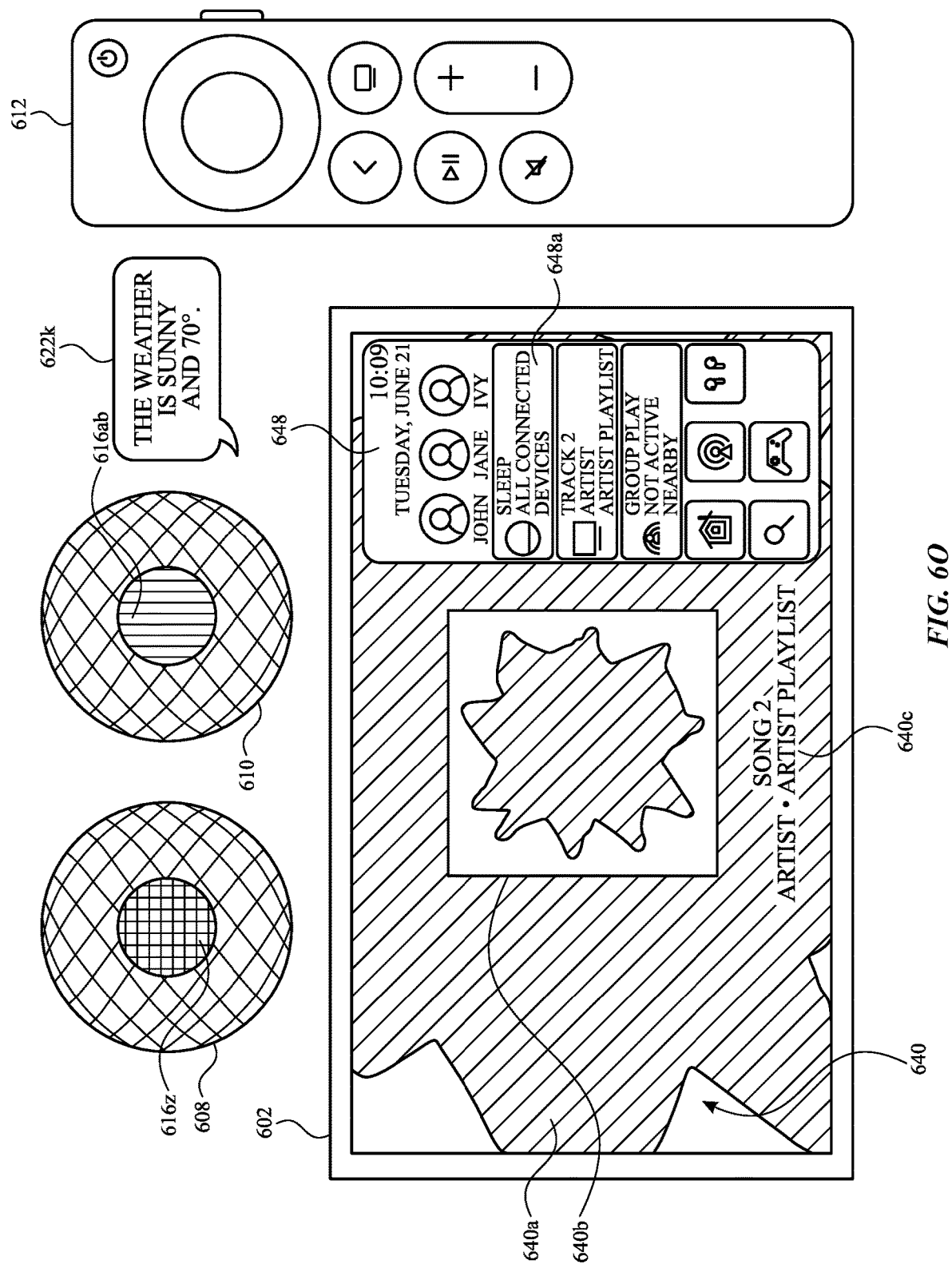
Figure 7B:
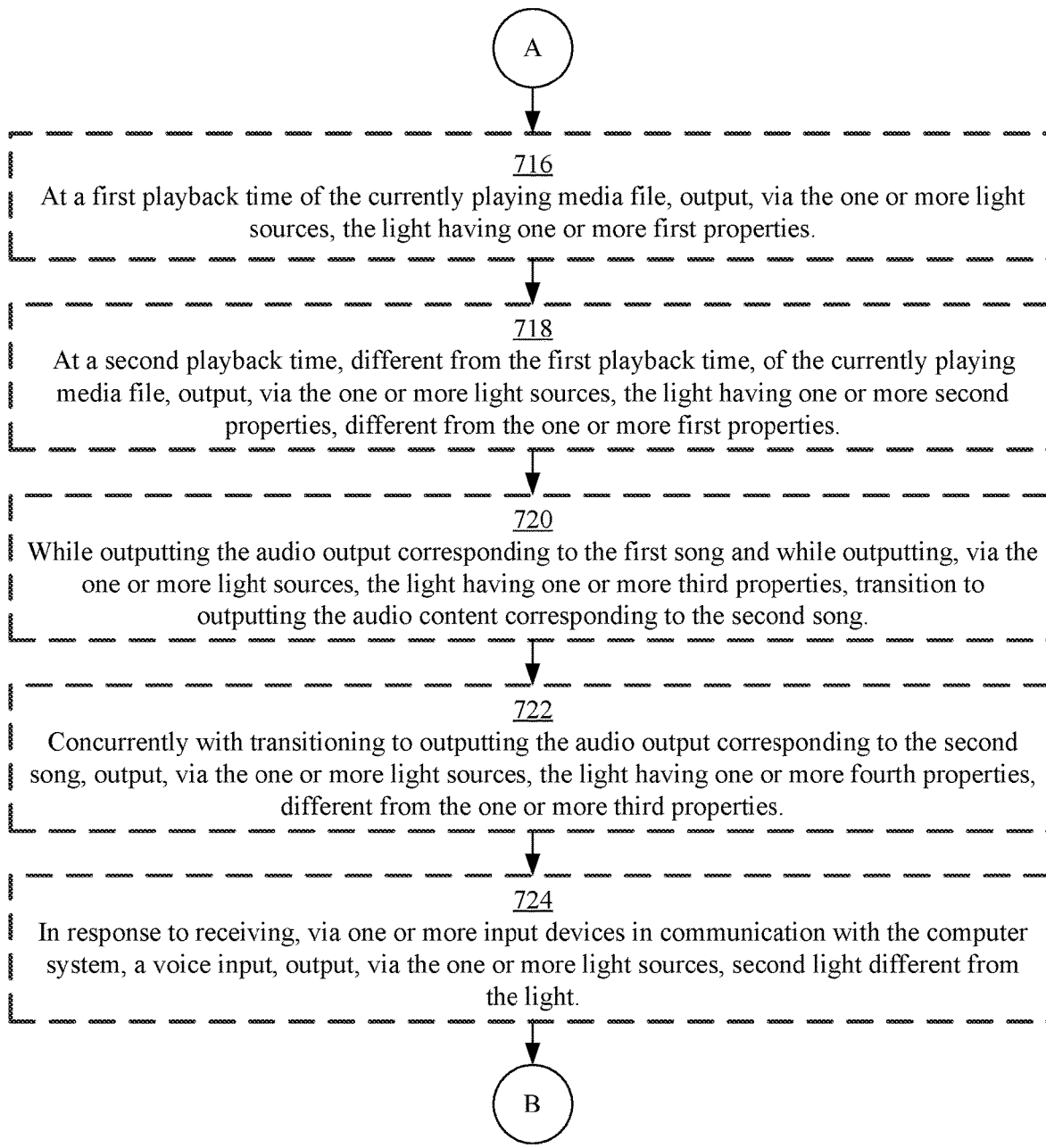
Figure 7C:
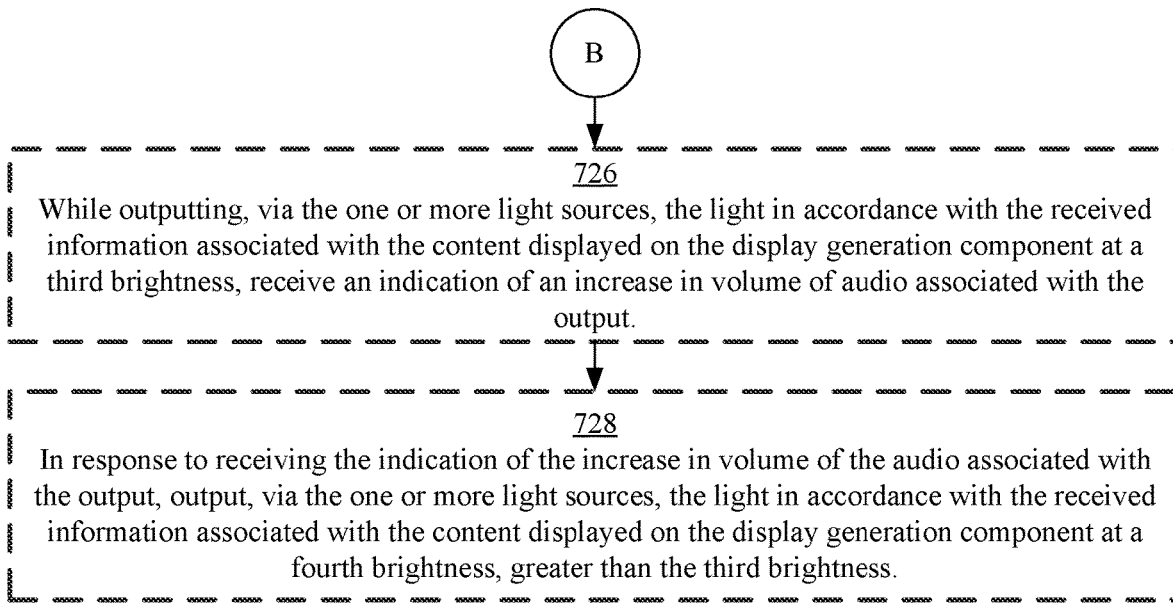

Below, FIGS. 1A-1B, 2, 3, 4A-4B, and 5A-5D provide a description of exemplary devices for performing the techniques for outputting light and managing controllable devices. FIGS. 6A-6O illustrate exemplary user interfaces for outputting light. FIGS. 7A-7C are a flow diagram illustrating methods of outputting light in accordance with some embodiments. The user interfaces in FIGS. 6A-6O are used to illustrate the processes described below, including the processes in FIGS. 7A-7C. FIGS. 8A-8V illustrate exemplary user interfaces for managing controllable devices. FIGS. 9A-9D are a flow diagram illustrating methods of managing controllable devices in accordance with some embodiments. The user interfaces in FIGS. 8A-8V are used to illustrate the processes described below, including the processes in FIGS. 9A-9D.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
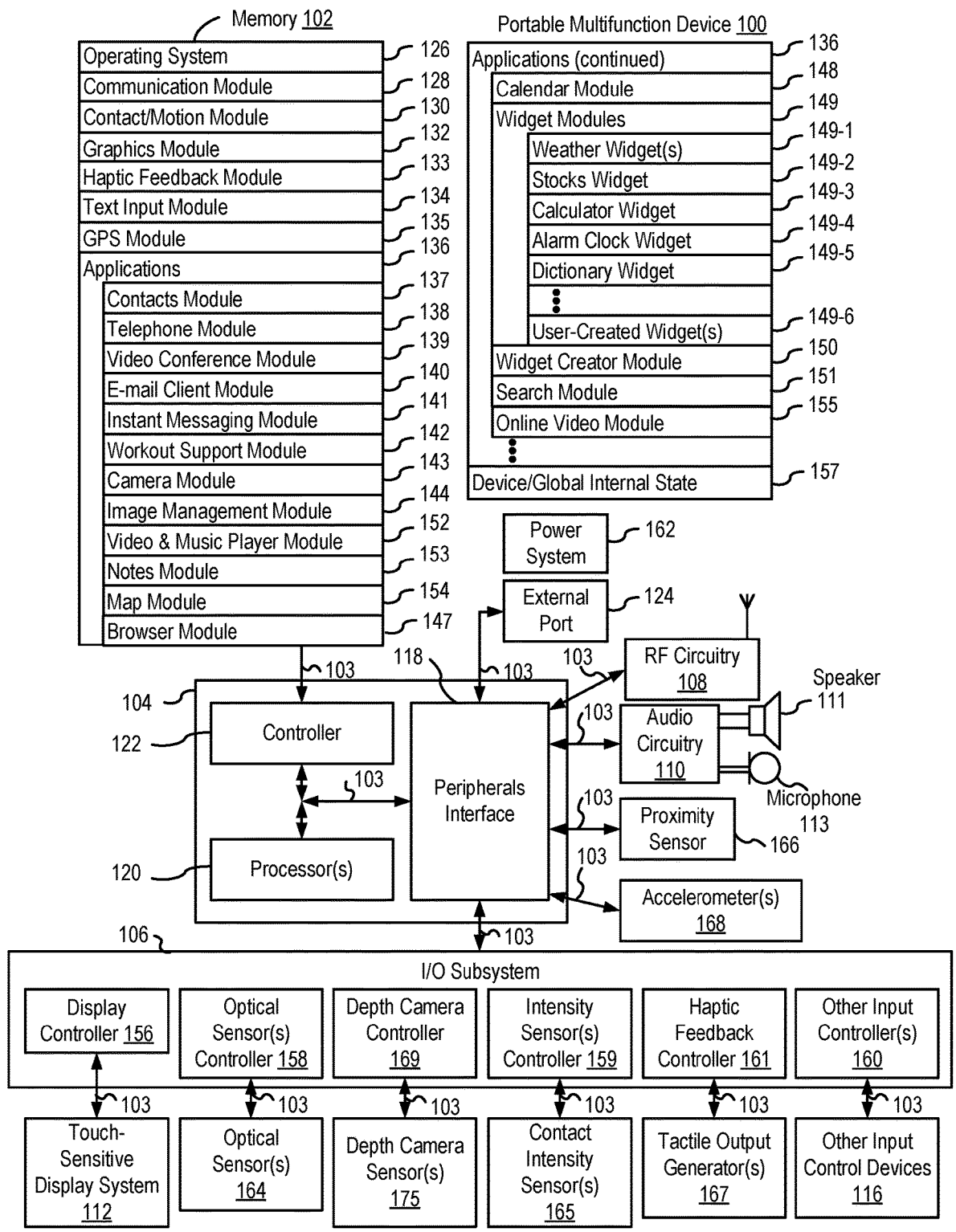
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.1 lac), voice over Internet Protocol (VoTP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
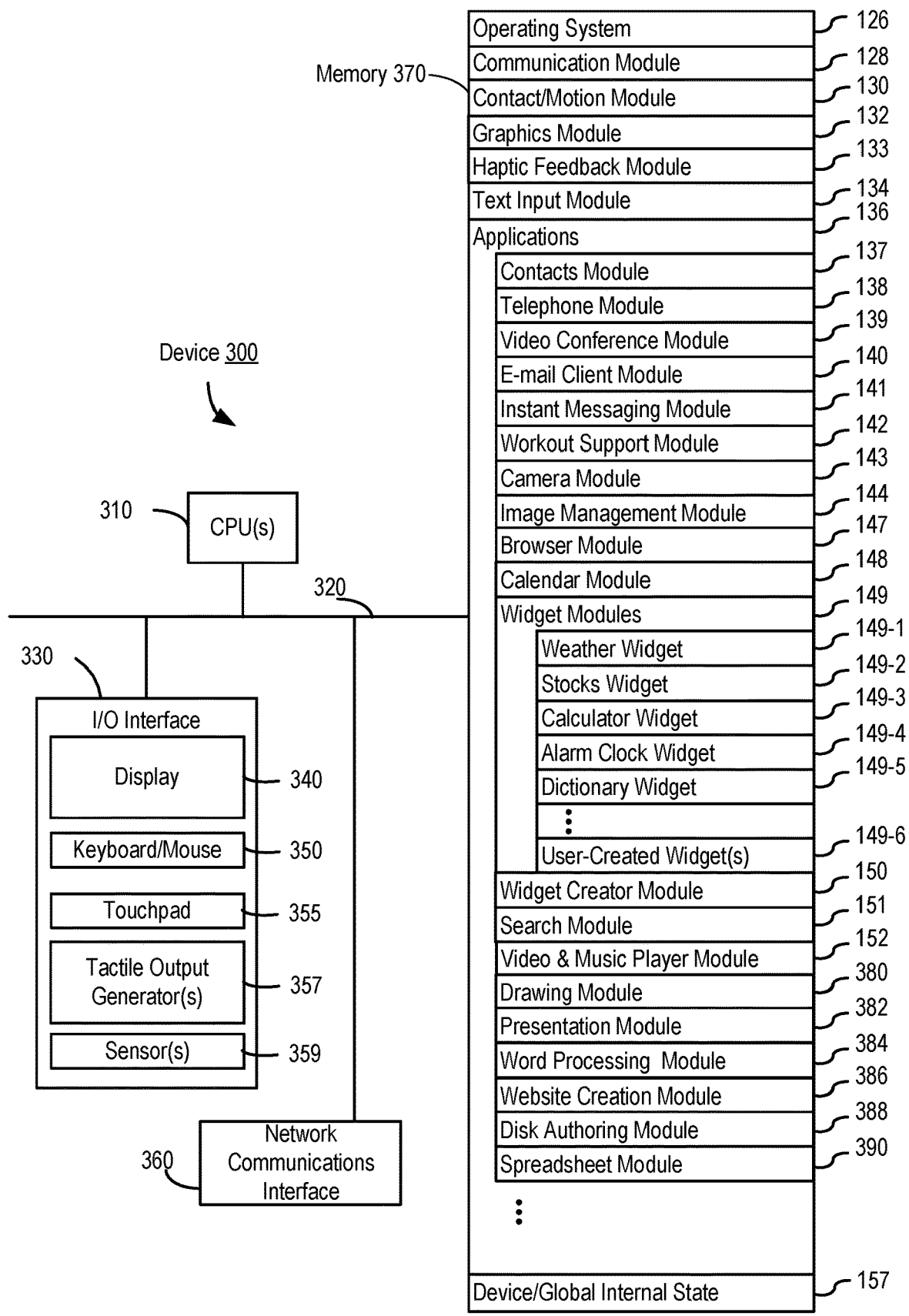
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
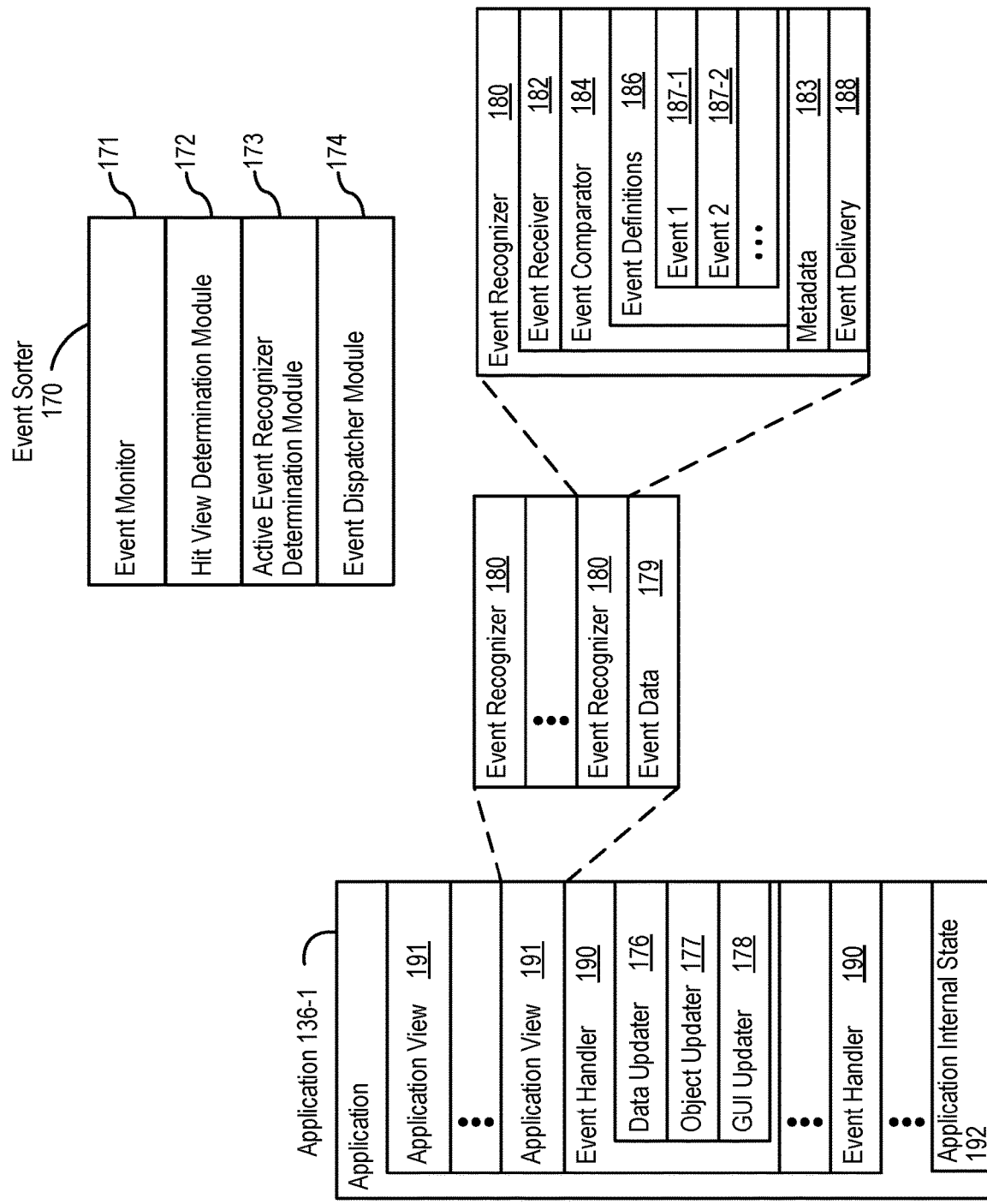
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
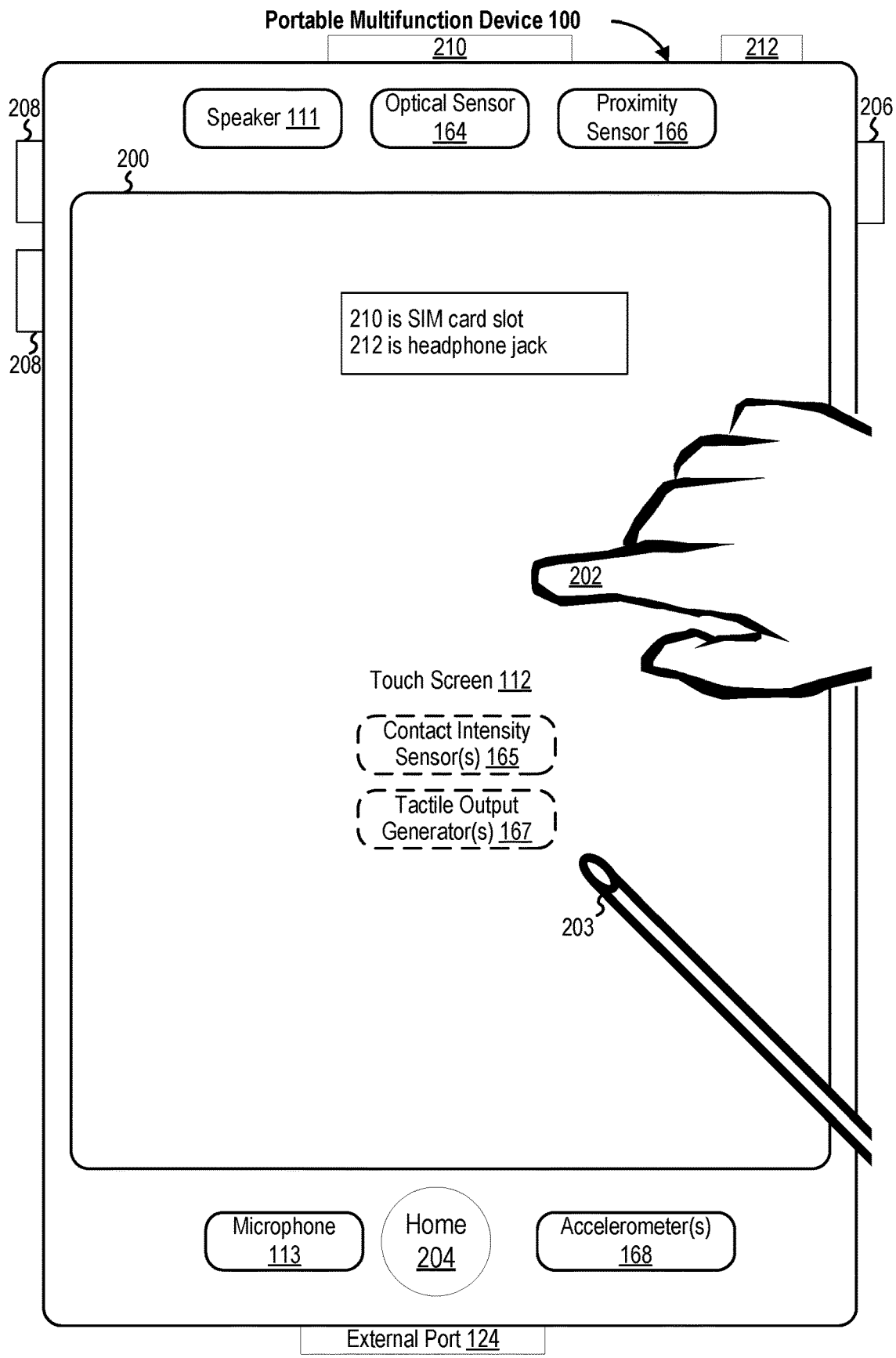
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
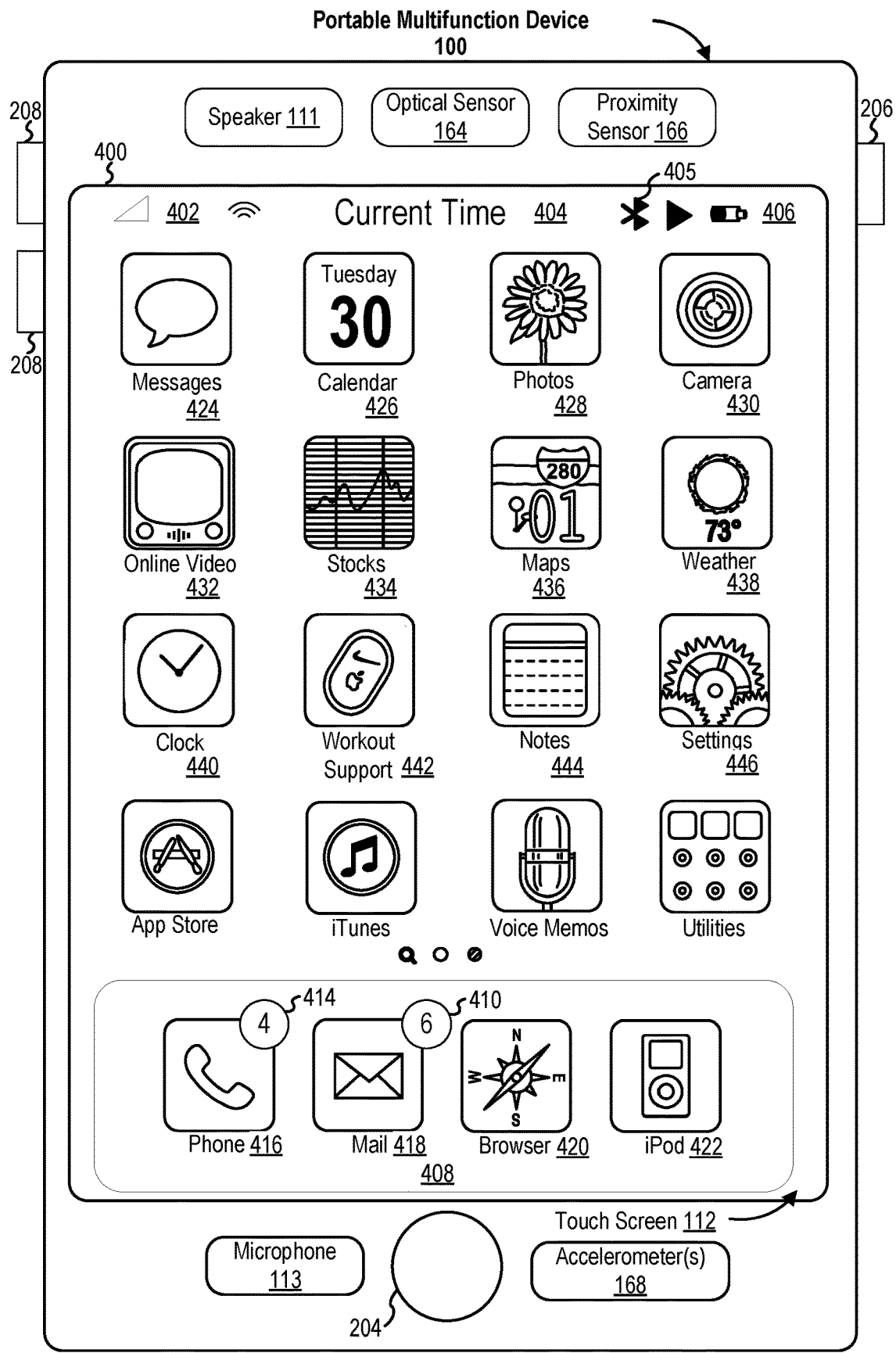
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
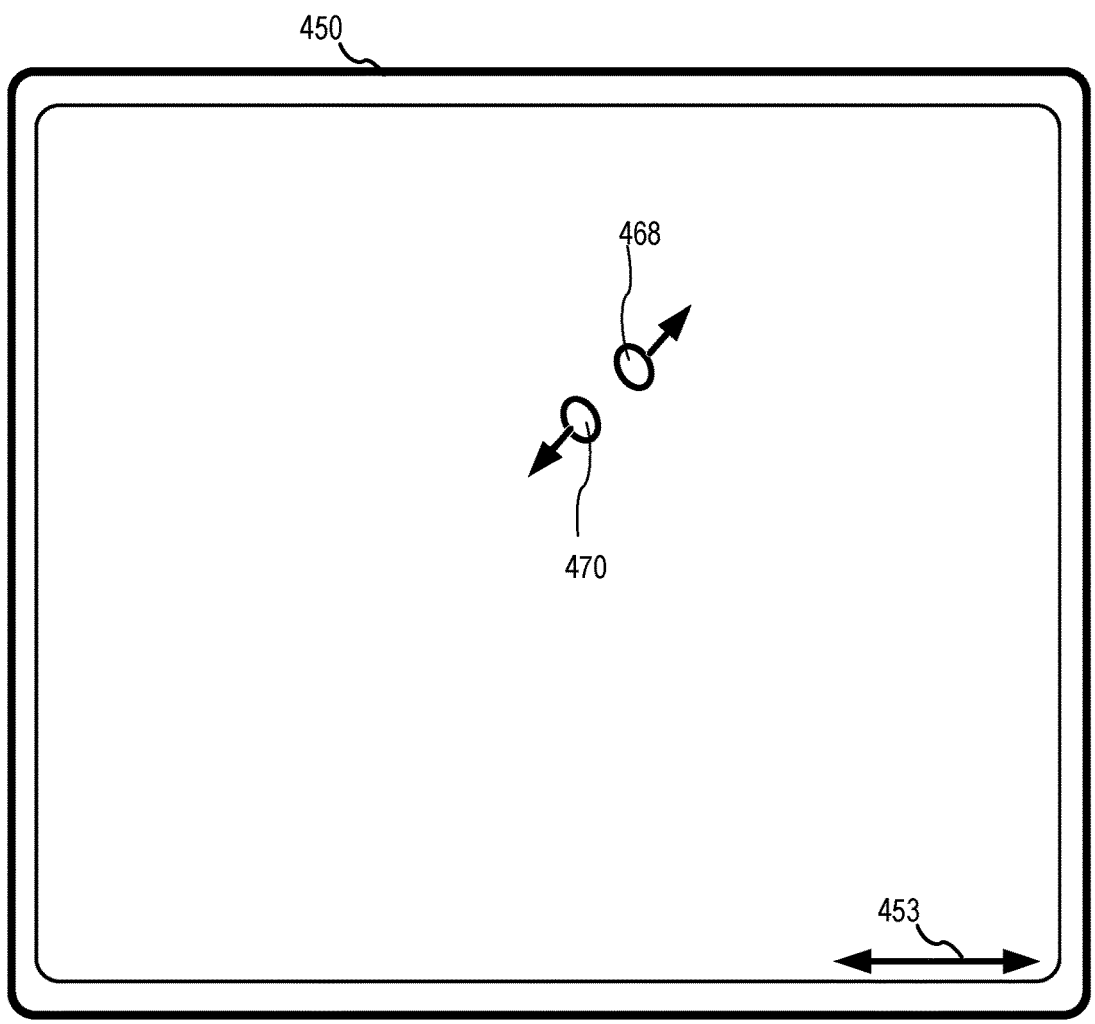
FIG. 4B illustrates an exemplary user interface for a multifunction device with a touch-sensitive surface that is separate from the display in accordance with some embodiments.
Figure 4B:
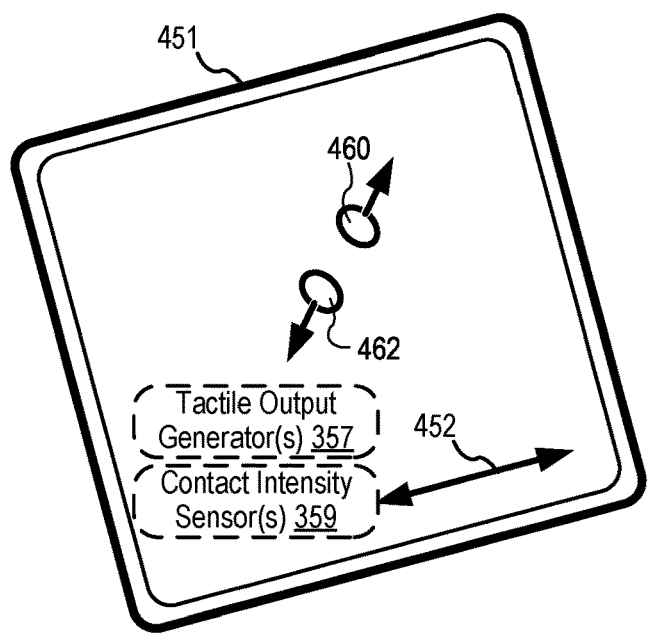

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
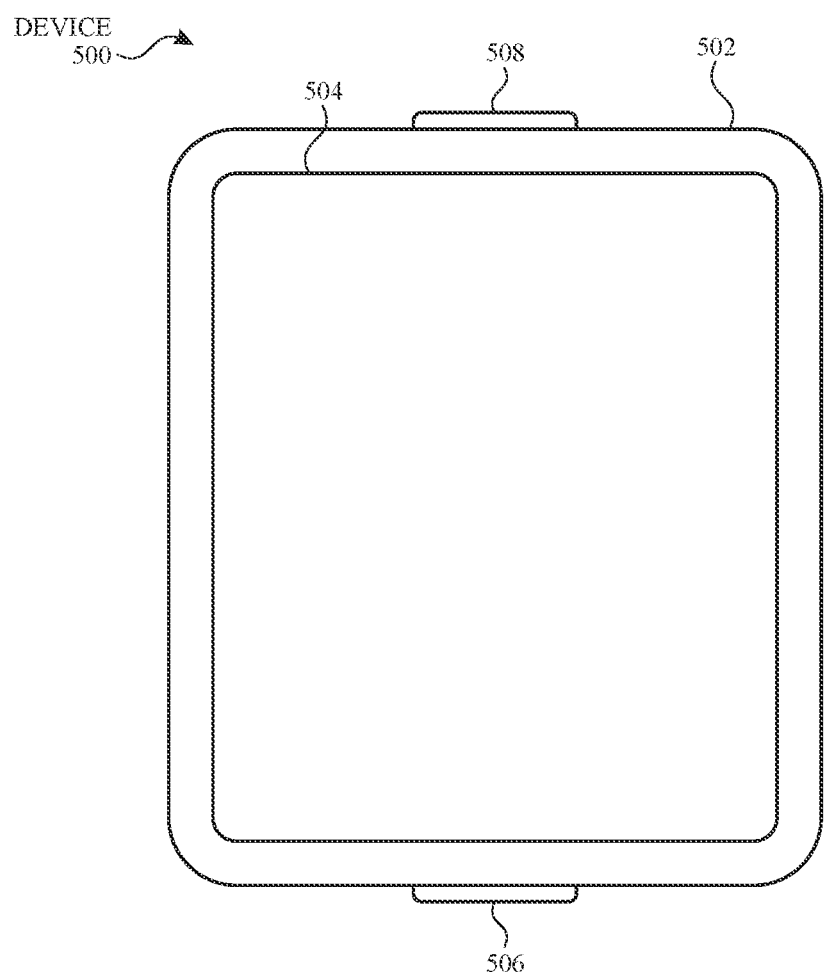
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
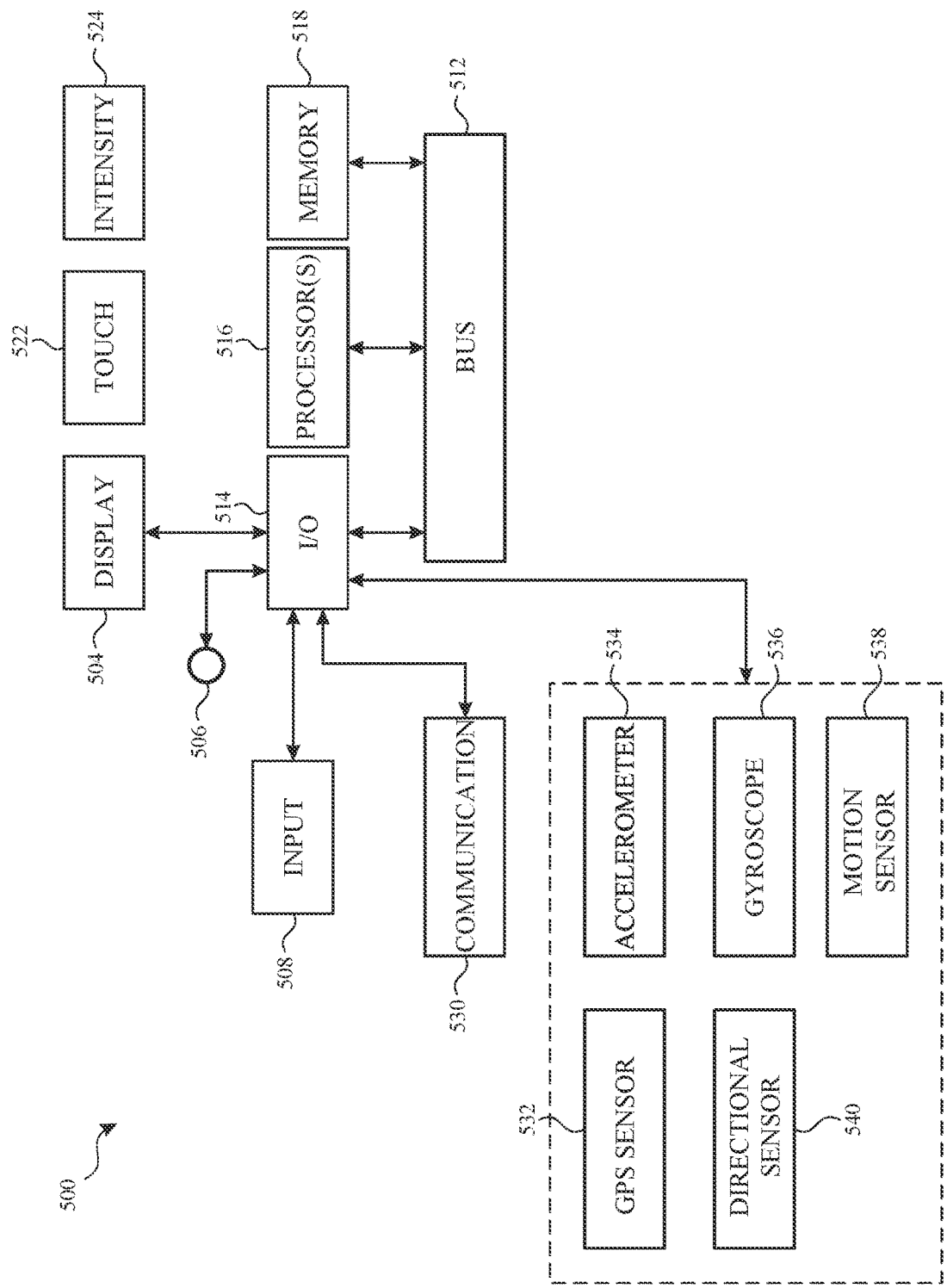
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7C and 9A-9D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
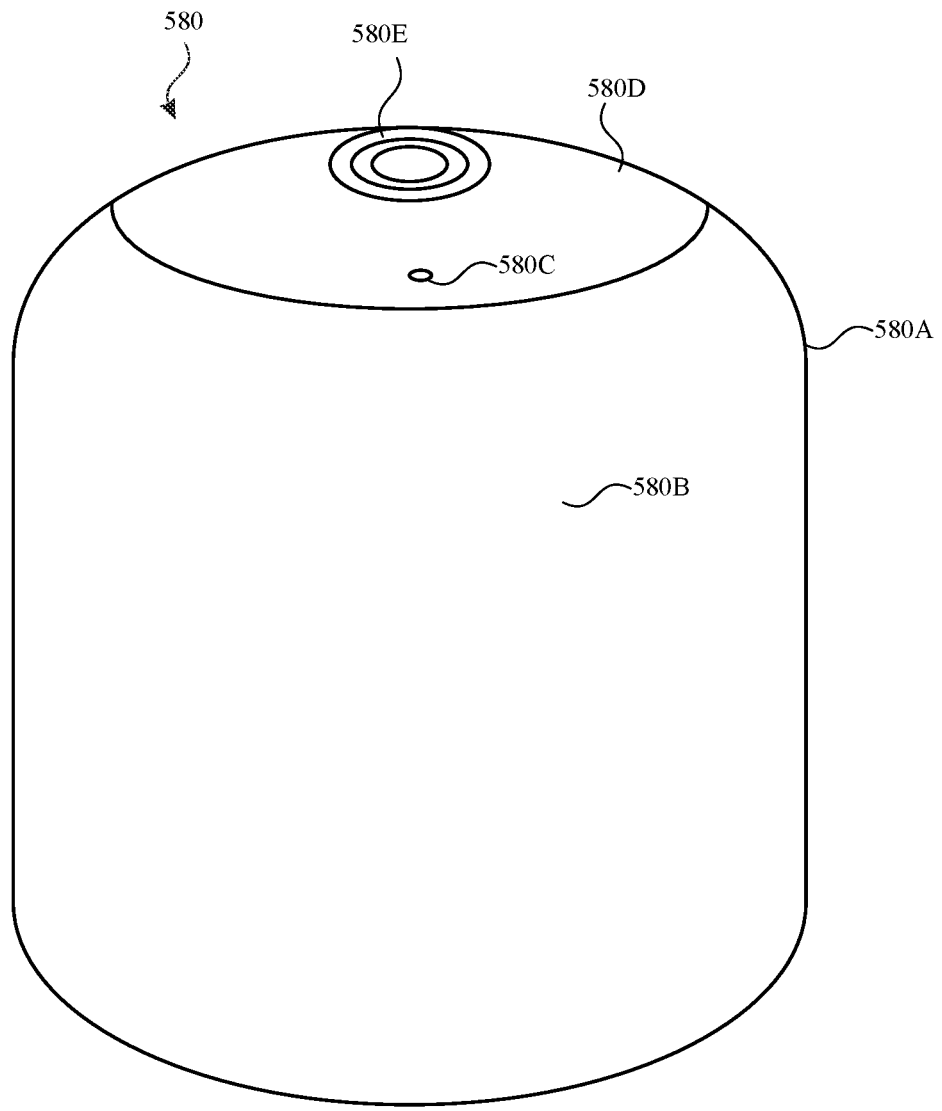
FIG. 5C illustrates an electronic device in accordance with some embodiments.

FIG. 5C illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5D:
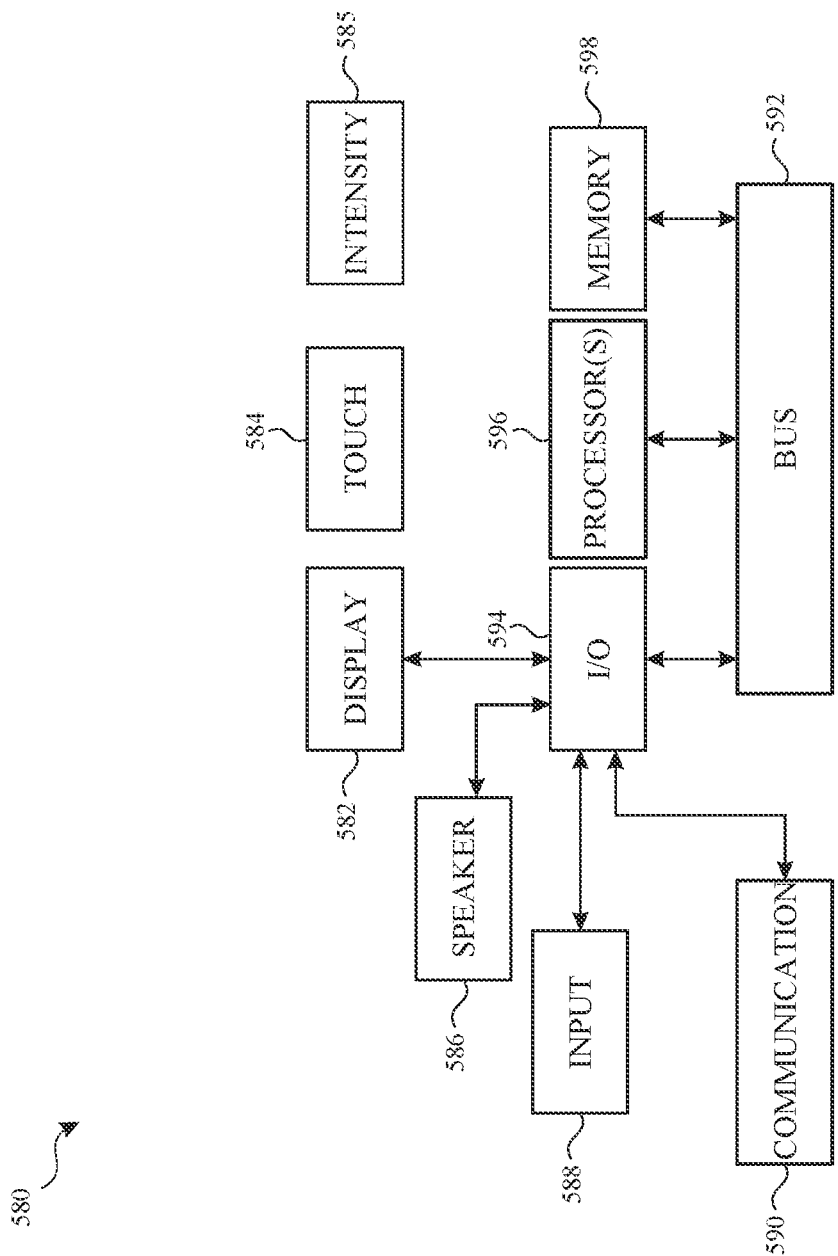
FIG. 5D is a block diagram illustrating an electronic device in accordance with some embodiments.

FIG. 5D depicts exemplary personal electronic device 580. In some embodiments, device 580 can include some or all of the components described with respect to FIGS. 1A, 1, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 700 and 900 (FIGS. 7A-7C and 9A-9D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

Attention is now directed towards embodiments of user interfaces ("UI") and associated processes that are implemented on an electronic device, such as portable multifunction device 100, device 300, or device 500.

FIGS. 6A-6O illustrate examples of techniques for outputting light, in accordance with some embodiments. The user interfaces in these figures are used to illustrate the processes described below, including the processes in FIGS. 7A-7C.

FIG. 6A illustrates schematic 600 of a configuration of devices, which includes display 602, first electronic device 604, second electronic device 606, first speaker accessory device 608, second speaker accessory device 610, and remote control 612. In some embodiments, first electronic device 604 includes one or more features of electronic devices 100, 300, and/or 500. In some embodiments, first electronic device 604 is a smartphone. In some embodiments, second electronic device 606 includes one or more features of electronic devices 100, 300, and/or 500. In some embodiments, second electronic device 606 is a media streaming device. In some embodiments, first speaker accessory device 608 and/or second speaker accessory device 610 include one or more features of electronic devices 100, 300, and/or 500. In some embodiments, first speaker accessory device 608 and/or second speaker accessory device 610 include a smart speaker.

At FIG. 6A, first electronic device 604 is in communication with second electronic device 606, first speaker accessory device 608, and second speaker accessory device 610, as indicated by dashed lines. In some embodiments, first electronic device 604 is in communication with display 602 via second electronic device 606. In some embodiments, first electronic device 604 is in communication (e.g., direct communication, indirect communication, Bluetooth communication, Wi-Fi communication, and/or other Internet connection communication technique) with display 602. Second electronic device 606 is in communication with display 602, first electronic device 604, first speaker accessory device 608, second speaker accessory device 610, and remote control 612, as indicated by dashed lines.

In some embodiments, first electronic device 604 is configured to control and/or adjust settings of second electronic device 606, first speaker accessory device 608, and/or second speaker accessory device 610 in response to detecting one or more user inputs. For instance, in some embodiments, first electronic device 604 can cause second electronic device 606 to initiate playback of a media item (e.g., a movie, a television show, a song, a playlist, a podcast, a video game, and/or a slideshow) and/or to pause and/or stop playback of a media item. In some embodiments, first electronic device 604 can adjust a volume of audio outputted by first speaker accessory device 608 and/or second speaker accessory device 610.

In some embodiments, second electronic device 606 causes display 602 to display one or more images and/or videos associated with a media item. For instance, in some embodiments, second electronic device 606 transmits and/or sends information to display 602 so that display 602 can display the one or more images and/or videos. At FIG. 6A, second electronic device 606 is in communication with remote control 612 and can cause display 602 to initiate display of the one or more images and/or videos in response to user input received and/or detected at remote control 612. In some embodiments, second electronic device 606 is configured to adjust a volume of audio output of first speaker accessory device 608 and/or second speaker accessory device 610 in response to one or more user inputs received at remote control 612. As set forth below, in some embodiments, second electronic device 606 provides audio information (e.g., audio data related to content displayed on display 602) to first speaker accessory device 608 and/or second speaker accessory device 610 so that first speaker accessory device 608 and/or second speaker accessory device 610 output audio associated with the media item being played back by second electronic device 606.

Further still, in some embodiments, second electronic device 606 provides information (e.g., information related to media content and/or data related to colors, brightness, and/or contrast of images and/or video displayed on display 602) to first speaker accessory device 608 and/or second speaker accessory device 610. In some embodiments, first speaker accessory device 608 and/or second speaker accessory device 610 output light based on and/or in accordance with the information. In some embodiments, second electronic device 606 provides light information (e.g., information associated with a color, brightness, and/or contrast of light) that is based on the media item, and the first speaker accessory device 608 and/or the second speaker accessory device 610 output light based on the light information. In some embodiments, first speaker accessory device 608 and/or second speaker accessory device 610 output audio and light concurrently based on information received from second electronic device 606 (and/or another electronic device).

Figure 6B:
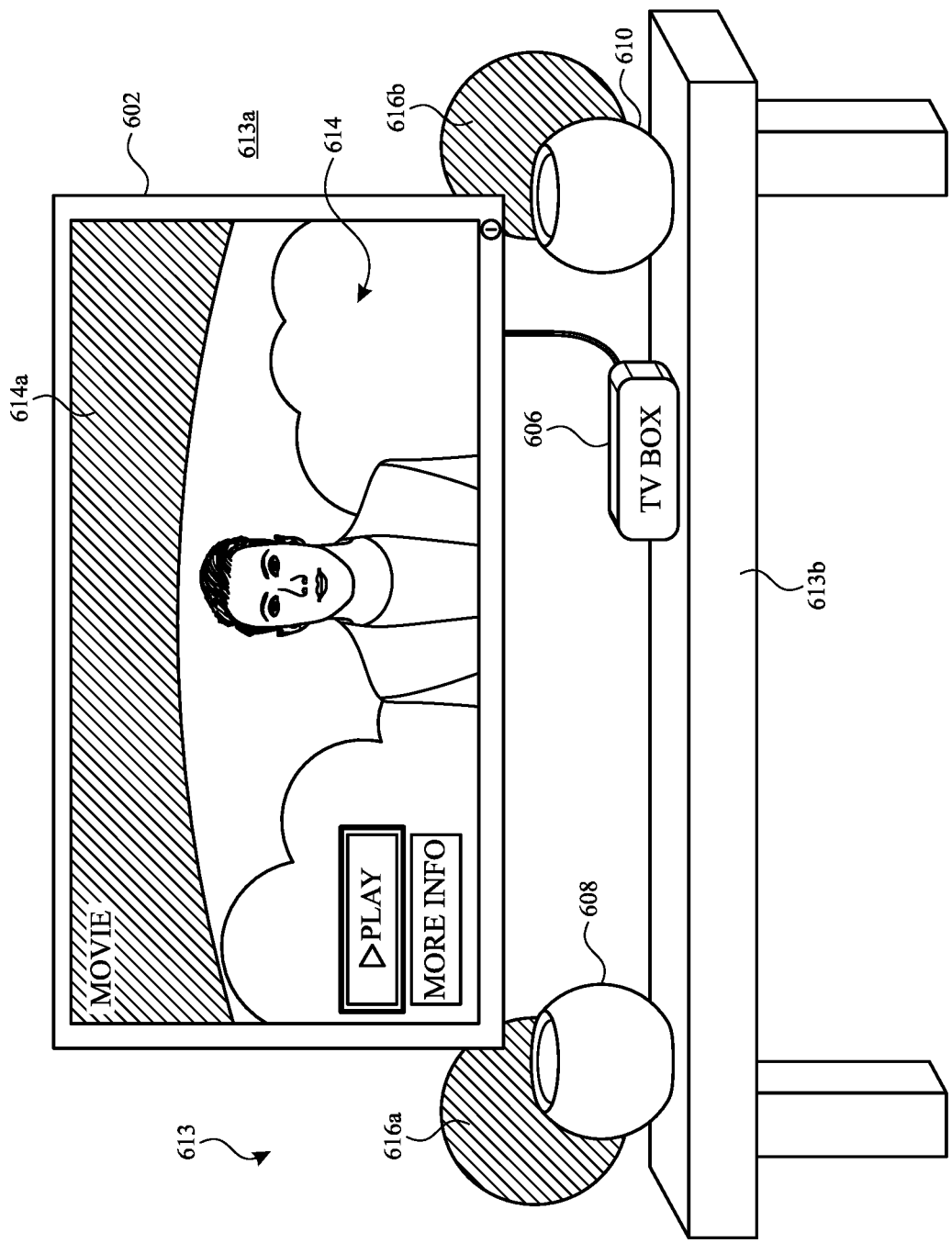

For instance, at FIG. 6B, display 602, second electronic device 606, first speaker accessory device 608, and second speaker accessory device 610 are illustrated in environment 613 (e.g., a physical environment). Display 602 is positioned on (e.g., mounted on) wall 613a of environment 613 and second electronic device 606, first speaker accessory device 608, and second speaker accessory device 610 are positioned on (e.g., resting on and/or placed on) table 613b of environment 613. At FIG. 6B, second electronic device 606 is in communication with display 602 via a wired connection (e.g., a high-definition multimedia interface connection and/or another wired connection). In some embodiments, second electronic device 606 is in communication with display 602 via a wireless communication technique, such as Bluetooth, Wi-Fi, and/or other Internet connection. Second electronic device 606 is in communication with first speaker accessory device 608 and second speaker accessory device 610 via a wireless communication technique. In some embodiments, second electronic device 606 is in communication with first speaker accessory device 608 and/or second speaker accessory device 610 via a wired connection. As set forth above, display 602, second electronic device 606, first speaker accessory device 608, and/or second speaker accessory device 610 are in communication with first electronic device 604 (e.g., via a wireless communication technique).

At FIG. 6B, display 602 is displaying first trailer page 614 based on information received from second electronic device 606. First trailer page 614 includes a preview of a media item configured to be played back and/or initiated by second electronic device 606. First trailer page 614 provides information about the media item, and is displayed prior to second electronic device 606 initiating playback of the media item. For instance, in some embodiments, second electronic device 606 causes display 602 to display one or more browsing menus (e.g., browsing menus of one or more applications) that enable a user to select a media item to experience (e.g., watch and/or listen to). In some embodiments, when a user selects a user interface object corresponding to a respective media item, second electronic device 606 causes display 602 to display first trailer page 614, which provides a user with additional information about the media item. In some embodiments, second electronic device 606 does not initiate playback of the media item when causing display 602 to display first trailer page 614. In some embodiments, first trailer page 614 is static and does not change over time. In some embodiments, first trailer page 614 includes a preview image, series of images, and/or video corresponding to the media item (e.g., a preview of the media item that does not include playback of the full duration of the media item).

At FIG. 6B, while second electronic device 606 causes display 602 to display first trailer page 614, second electronic device 606 provides (e.g., transmits and/or sends) information to first speaker accessory device 608 and second speaker accessory device 610. In some embodiments, the information includes information about first trailer page 614, such as information about colors, brightness, and/or contrasts of one or more images and/or videos of first trailer page 614. In some embodiments, the information includes information about one or more colors, brightness, and/or contrasts of light to be output by first speaker accessory device 608 and/or second speaker accessory device 610. At FIG. 6B, first speaker accessory device 608 outputs light 616a and second speaker accessory device 610 outputs light 616b based on the information. Light 616a and light 616b include a first color, as represented by first hatching at FIG. 6B. First trailer page 614 displayed on display 602 also includes background 614a, having the first color, as represented by the first hatching. Accordingly, first speaker accessory device 608 and second speaker accessory device 610 output light 616a and light 616b, respectively, which include one or more properties (e.g., color, brightness, and/or contrast) that is based on first trailer page 614 (e.g., visual properties of first trailer page 614, such as color, brightness, and/or contrast). As set forth below, in some embodiments, first speaker accessory device 608 and/or second speaker accessory device 610 are configured to output light having multiple different colors (e.g., concurrently output light having different colors). In some embodiments, first speaker accessory device 608 and/or second speaker accessory device 610 output light and output audio concurrently.

At FIG. 6B, first speaker accessory device 608 and second speaker accessory device 610 output light 616a and light 616b, respectively, such that light 616a and light 616b are projected onto wall 613a of environment 613. In some embodiments, light 616a and/or light 616b are projected onto different surfaces and/or objects of an environment (e.g., environment 613) in which first speaker accessory device 608 and/or second speaker accessory device 610 are located. First speaker accessory device 608 and second speaker accessory device 610 are configured to output light 616a and/or light 616b so that light 616a and/or light 616b projects onto surfaces and/or objects so that a user can better view light 616a and/or light 616b. In some embodiments, first speaker accessory device 608 and/or second speaker accessory device 610 are positioned within an environment so that light 616a and/or light 616b are not projected onto an object and/or surface. In some embodiments, light 616a and/or light 616b are output from a top portion of first speaker accessory device 608 and/or second speaker accessory device 610, respectively, and project off one or more surfaces of first speaker accessory device 608 and/or second speaker accessory device 610, respectively. First speaker accessory device 608 and second speaker accessory device 610 outputting light 616a and light 616b, respectively, based on first trailer page 614 provides a user viewing first trailer page 614 with a more enjoyable and/or an improved sensory experience.

FIGS. 6C-6O illustrate display 602, first speaker accessory device 608, second speaker accessory device 610, and remote control 612 outputting various content and/or receiving one or more user inputs. While display 602, first speaker accessory device 608, second speaker accessory device 610, and/or remote control 612 are not shown in environment 613 at FIGS. 6C-6O, display 602, first speaker accessory device 608, second speaker accessory device 610, and/or remote control 612 are configured to operate as described with respect to FIGS. 6C-6O in environment 613 and/or in a different environment. In addition, while FIGS. 6C-6O do not display first electronic device 604 and second electronic device 606, display 602, first speaker accessory device 608, second speaker accessory device 610, and/or remote control 612 are configured to be in communication with first electronic device 604 and/or second electronic device 606, as set forth above with reference to FIGS. 6A and 6B.

Figure 6C:
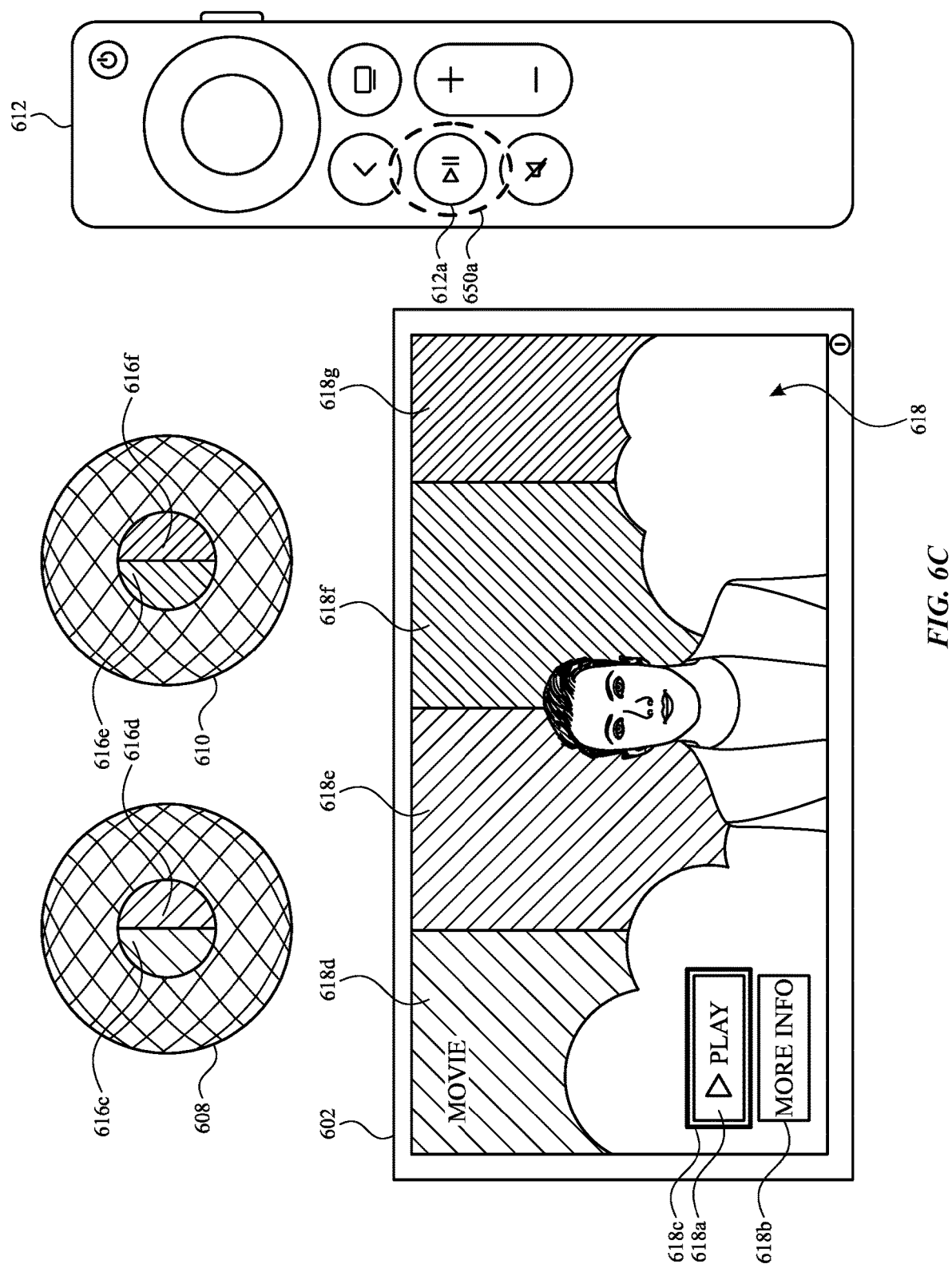

FIG. 6C illustrates first speaker accessory device 608 and second speaker accessory device 610 outputting light that is based on one or more visual elements of a trailer page. For instance, at FIG. 6C, display 602 displays second trailer page 618 based on information received from second electronic device 606. Second trailer page 618 corresponds to a media item, such as a movie and/or television show. Second trailer page 618 provides a user with information related to the media item and enables a user to cause playback of the media item. For instance, second trailer page 618 includes play user interface object 618a and more information user interface object 618b. Second electronic device 606 is in communication with remote control 612, which is configured to receive user inputs and cause second electronic device 606 to perform operations in response to the user inputs. For instance, in some embodiments, in response to detecting one or more user inputs at remote control 612 requesting to select more information user interface object 618b, second electronic device 606 causes display 602 to display an information user interface that includes additional information and/or details related to the media item. As set forth below, in response to detecting user input 650a corresponding to play button 612a of remote control 612 (e.g., while focus is on play user interface object 618a, as indicated by border 618c displayed around play user interface object 618a, or play user interface object 618a is otherwise designated), second electronic device 606 initiates playback of the media item and causes display 602 to display one or more images and/or video associated with the media item.

At FIG. 6C, first speaker accessory device 608 outputs first light 616c and second light 616d, and second speaker accessory device 610 outputs third light 616e and fourth light 616f. As set forth above, first speaker accessory device 608 and second speaker accessory device 610 receive information from second electronic device 606 that includes information related to content displayed on display 602 and/or includes information about one or more properties of the light that first speaker accessory device 608 and second speaker accessory device 610 are configured to output. For instance, in some embodiments, the information includes information about one or more colors associated with images and/or video displayed on display 602 (e.g., colors of second trailer page 618). In some embodiments, the information includes information about one or more colors, brightness, and/or contrast of first light 616c, second light 616d, third light 616e, and/or fourth light 616f. As such, first speaker accessory device 608 and/or second speaker accessory device 610 output light that is based on one or more properties of the content (e.g., one or more visual properties, such as one or more colors) displayed on display 602.

At FIG. 6C, first light 616c includes a second color, as indicated by second hatching, and second light 616d includes a third color, as indicated by third hatching. Second trailer page 618 displayed on display 602 includes first portion 618d that includes the second color, as indicated by the second hatching shown at FIG. 6C, and second portion 618e that includes the third color, as indicated by the third hatching shown at FIG. 6C. Thus, first speaker accessory device 608 outputs first light 616c and second light 616d, which match colors of first portion 618d and second portion 618e of second trailer page 618 displayed on display 602. At FIG. 6C, third light 616e includes a fourth color, as indicated by fourth hatching, and fourth light 616f includes a fifth color, as indicated by fifth hatching. Second trailer page 618 displayed on display 602 includes third portion 618f that includes the fourth color, as indicated by the fourth hatching shown at FIG. 6C, and fourth portion 618g that includes the fifth color, as indicated by the fifth hatching shown at FIG. 6C. Thus, second speaker accessory device 610 outputs third light 616e and fourth light 616f, which match colors of third portion 618f and fourth portion 618g of second trailer page 618 displayed on display 602. At FIG. 6C, first speaker accessory device 608 and second speaker accessory device 610 output light that includes two different colors. As set forth below, in some embodiments, first speaker accessory device 608 and second speaker accessory device 610 output light having a single color. In some embodiments, first speaker accessory device 608 and second speaker accessory device 610 output light having one or more colors that are different from one another.

In some embodiments, first speaker accessory device 608 and second speaker accessory device 610 output light 616c, 616d, 616e, and/or 616f, which are based on one or more colors of second trailer page 618, but do not match the one or more colors of second trailer page 618 (e.g., the colors of light 616c, 616d, 616e, and/or 616f complement and/or otherwise match a color scheme of second trailer page 618). First speaker accessory device 608 and second speaker accessory device 610 can therefore provide a user that is viewing second trailer page 618 on display 602 a more enjoyable and/or an improved sensory experience.

At FIG. 6C, first speaker accessory device 608 and second speaker accessory device 610 are not outputting audio because a media item associated with second trailer page 618 is not being played back (e.g., second electronic device 606 has not initiated playback of the media item). In some embodiments, second trailer page 618 includes a static image representative of the media item associated with second trailer page 618. In some embodiments, second trailer page 618 includes a video and/or a series of images that are displayed over time. In some embodiments, second trailer page 618 includes audio that is output via first speaker accessory device 608 and/or second speaker accessory device 610.

At FIG. 6C, second electronic device 606 receives an indication of user input 650a (e.g., a press gesture or other selection/navigation input) corresponding to play button 612a of remote control 612 (e.g., while focus is on play user interface object 618a, as indicated by border 618c displayed around play user interface object 618a, or play user interface object 618a is otherwise designated). In response to receiving the indication of user input 650a, second electronic device 606 initiates playback of the media item associated with second trailer page 618 and causes display 602 to display first media content 620, as shown at FIG. 6D.

Figure 6D:
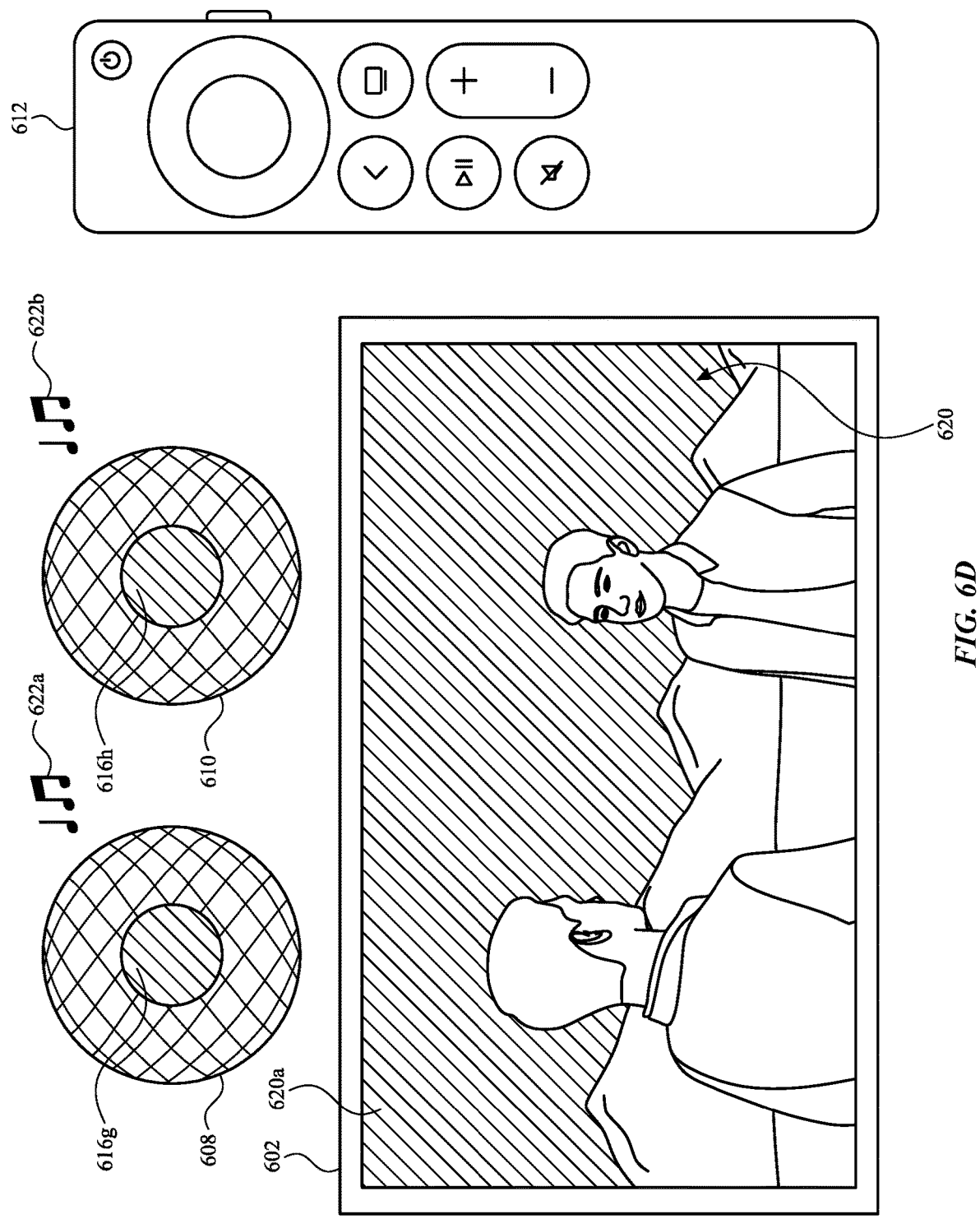

At FIG. 6D, first speaker accessory device 608 and second speaker accessory device 610 output light that is based on one or more first visual elements of the media item at a first playback time of the media item. For instance, at FIG. 6D, first media content 620 includes a scene and/or image of a movie and/or television show associated with the media item. First media content 620 is associated with the first playback time of the media item. For instance, the media item includes a playback duration and first media content 620 is associated with the first playback time that is within the playback duration of the media item. In some embodiments, as the playback duration of the media item progresses (e.g., plays back), display 602 displays different content and first speaker accessory device 608 and/or second speaker accessory device 610 output different audio and/or output different light. In some embodiments, display 602 displays different content and first speaker accessory device 608 and/or second speaker accessory device 610 output different audio and/or output different light as the media item plays back and without receiving an indication of user input at remote control 612.

First media content 620 includes background 620a, which includes a first background color, as indicated by sixth hatching at FIG. 6D. As set forth above, first speaker accessory device 608 and second speaker accessory device 610 output light based on received information, such as information about one or more colors, brightness, and/or contrasts of one or more images displayed on display 602. In some embodiments, first speaker accessory device 608 and/or second speaker accessory device 610 receive the information from second electronic device 606. In some embodiments, first speaker accessory device 608 and/or second speaker accessory device 610 receive the information from another electronic device (e.g., display 602, first electronic device 604, and/or a server). At FIG. 6D, first speaker accessory device 608 outputs light 616g having the first background color, as indicated by sixth hatching at FIG. 6D, and second speaker accessory device 610 outputs light 616h having the first background color, as indicated by sixth hatching at FIG. 6D. In some embodiments, light 616g and light 616h are based on information about first media content 620, such as a color, brightness, and/or contrast of one or more images associated with first media content 620 (e.g., background 620a of first media content 620). For instance, at FIG. 6D, light 616g, light 616h, and background 620a of first media content 620 each include the first background color. In some embodiments, first speaker accessory device 608 and/or second speaker accessory device 610 receive information about one or more properties (e.g., one or more colors, brightness, and/or contrast) of light 616g and/or light 616h, respectively. In some embodiments, second electronic device 606 (and/or a different electronic device) determines the one or more properties of light 616g and/or light 616h based on first media content 620.

In some embodiments, first media content 620 includes multiple colors, such that light 616g and/or light 616h include more than one color that is based on the multiple colors of first media content 620. Therefore, first speaker accessory device 608 and second speaker accessory device 610 can provide a more enjoyable and/or an improved sensory experience for a user viewing first media content 620 (e.g., the media item associated with first media content 620).

At FIG. 6D, first speaker accessory device 608 outputs first audio 622a and second speaker accessory device 610 outputs second audio 622b. First audio 622a and second audio 622b are associated with first media content 620 and are based on audio information received by first speaker accessory device 608 and second speaker accessory device 610, respectively. In some embodiments, first audio 622a and second audio 622b are different from one another. For instance, in some embodiments, first audio 622a includes a left channel audio output of audio associated with first media content 620 (e.g., the media item associated with first media content 620) and second audio 622b includes a right channel audio output of audio associated with first media content 620 (e.g., the media item associated with first media content 620). In some embodiments, first audio 622a and second audio 622b are the same as one another. In some embodiments, first audio 622a and/or second audio 622b include audio output that includes speech, dialogue, music, and/or sound effects associated with first media content 620 (e.g., the media item associated with first media content 620). As such, first speaker accessory device 608 and/or second speaker accessory device 610 are configured to output audio that is associated with the media item. Thus, a user viewing first media content 620 on display 602 can listen to the audio of the media item via first audio 622a and second audio 622b.

Figure 6E:
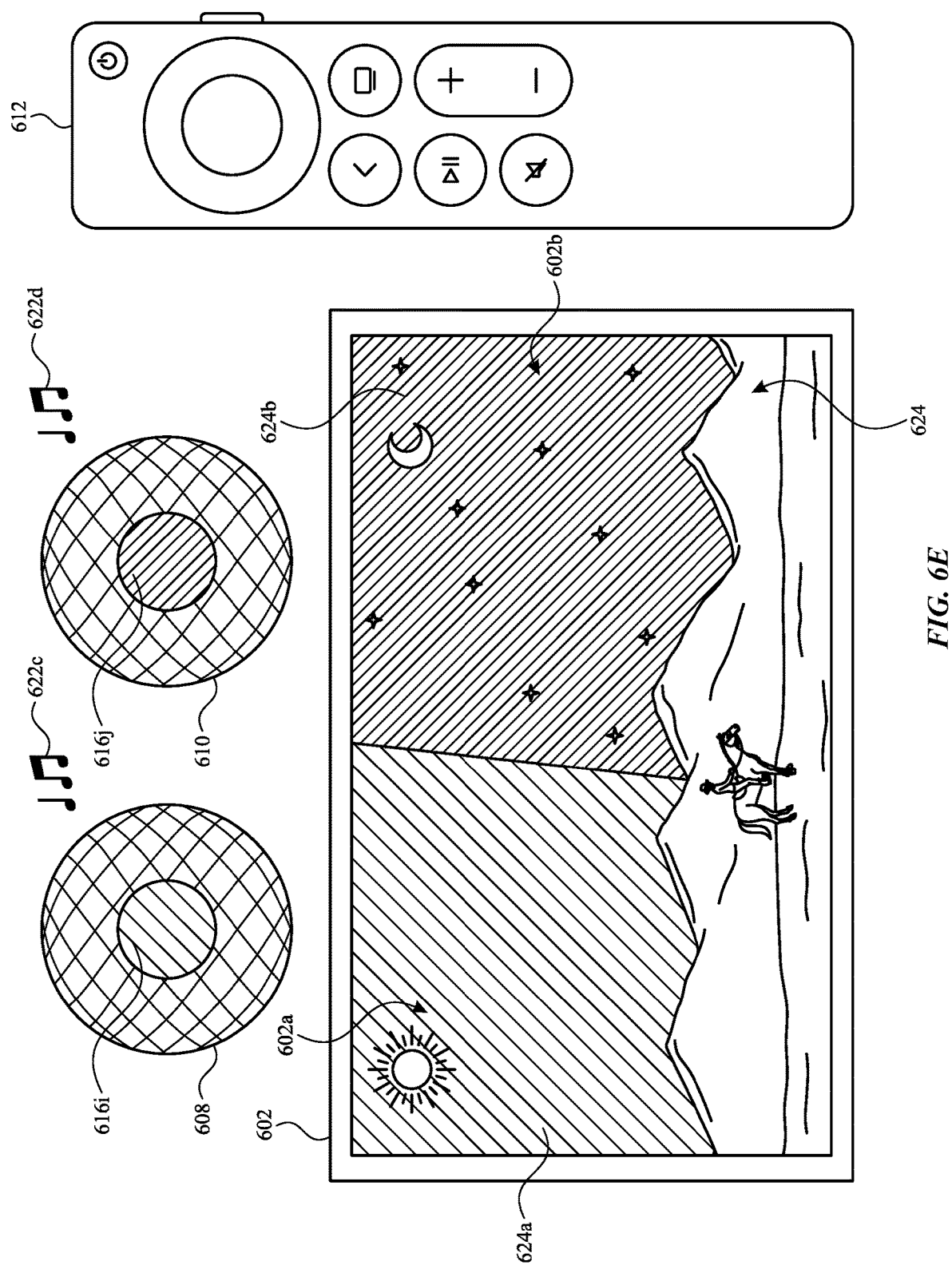

At FIG. 6E, first speaker accessory device 608 and second speaker accessory device 610 output light that is based on one or more second visual elements of the media item at a second playback time, different from the first playback time, of the media item. For instance, at FIG. 6E, display 602 is displaying second media content 624, which includes a second scene and/or image of a movie and/or television show associated with the media item. Second media content 624 is associated with the second playback time of the media item that is different from (e.g., after) the first playback time associated with first media content 620. Accordingly, as the playback duration of the media item progresses (e.g., plays back), display 602 displays different content and/or first speaker accessory device 608 and/or second speaker accessory device 610 output different audio and/or output different light (e.g., light with different characteristics and/or properties). In some embodiments, display 602 displays different content and/or first speaker accessory device 608 and/or second speaker accessory device 610 output different audio and/or output different light as the media item plays back and without receiving an indication of user input at remote control 612.

At FIG. 6E, second media content 624 includes first portion 624a and second portion 624b. First portion 624a includes a second background color, as indicated by seventh hatching at FIG. 6E, and second portion 624b includes a third background color, as indicated by eighth hatching at FIG. 6E. First portion 624a of second media content 624 is displayed on first display area 602a of display 602 and second portion 624b of second media content 624 is displayed on second display area 602b of display 602. At FIG. 6E, first speaker accessory device 608 outputs light 616i having the second background color, as indicated by seventh hatching, and second speaker accessory device 610 outputs light 616j having the third background color, as indicated by eighth hatching. Therefore, first speaker accessory device 608 outputs light 616i that is based on first portion 624a of second media content 624 and second speaker accessory device 610 outputs light 616j that is based on second portion 624b of second media content 624. As shown at FIG. 6B, first speaker accessory device 608 is positioned in environment 613 at a first location that is proximate to (e.g., closer to as compared to second speaker accessory device 610) display area 602a where first portion 624a is displayed on display 602 at FIG. 6E. At FIG. 6B, second speaker accessory device 610 is positioned in environment 613 at a second location that is proximate to (e.g., closer to as compared to first speaker accessory device 608) display area 602b where second portion 624b is displayed on display 602 at FIG. 6E. As such, first speaker accessory device 608 and second speaker accessory device 610 can output light having different properties based on positions and/or locations of different portions of content displayed on display 602.

In some embodiments, first speaker accessory device 608 and/or second speaker accessory device 610 include a configuration that indicates a position of first speaker accessory device 608 and/or second speaker accessory device 610 with respect to display 602 (e.g., in environment 613). In some embodiments, second electronic device 606 (and/or another electronic device) causes first speaker accessory device 608 and second speaker accessory device 610 to output light having different properties from one another based on the configuration of first speaker accessory device 608 and second speaker accessory device 610. For instance, in some embodiments, second electronic device 606 (and/or another electronic device) provides first information to first speaker accessory device 608 and provides second information, different from the first information, to second speaker accessory device 610. In some embodiments, first speaker accessory device 608 outputs light (e.g., light 616i) having first properties based on the first information and second speaker accessory device 610 outputs light (e.g., light 616j) having second properties, different from the first properties, based on the second information. In some embodiments, the properties of light include one or more colors, brightness, and/or contrast. In some embodiments, the first information includes information based on display area 602a of display 602 and the second information includes information based on display area 602b of display 602.

At FIG. 6E, first speaker accessory device 608 outputs audio 622c and second speaker accessory device 610 outputs audio 622d. Audio 622c and audio 622d are associated with second media content 624 (e.g., a playback time of the media item associated with second media content 624) and are based on audio information received by first speaker accessory device 608 and second speaker accessory device 610, respectively. As set forth above, in some embodiments, audio 622c and audio 622d are different from one another. For instance, in some embodiments, audio 622c includes a left channel audio output of audio associated with second media content 624 and audio 622d includes a right channel audio output of audio associated with second media content 624. In some embodiments, audio 622c and audio 622d are the same as one another. In some embodiments, audio 622c and/or audio 622d include audio output that includes speech, dialogue, music, and/or sound effects associated with second media content 624 (e.g., the media item associated with second media content 624). As such, first speaker accessory device 608 and/or second speaker accessory device 610 are configured to output audio that is associated with the media item. Thus, a user viewing second media content 624 on display 602 can listen to the audio of the media item via audio 622c and audio 622d.

Figure 6F:
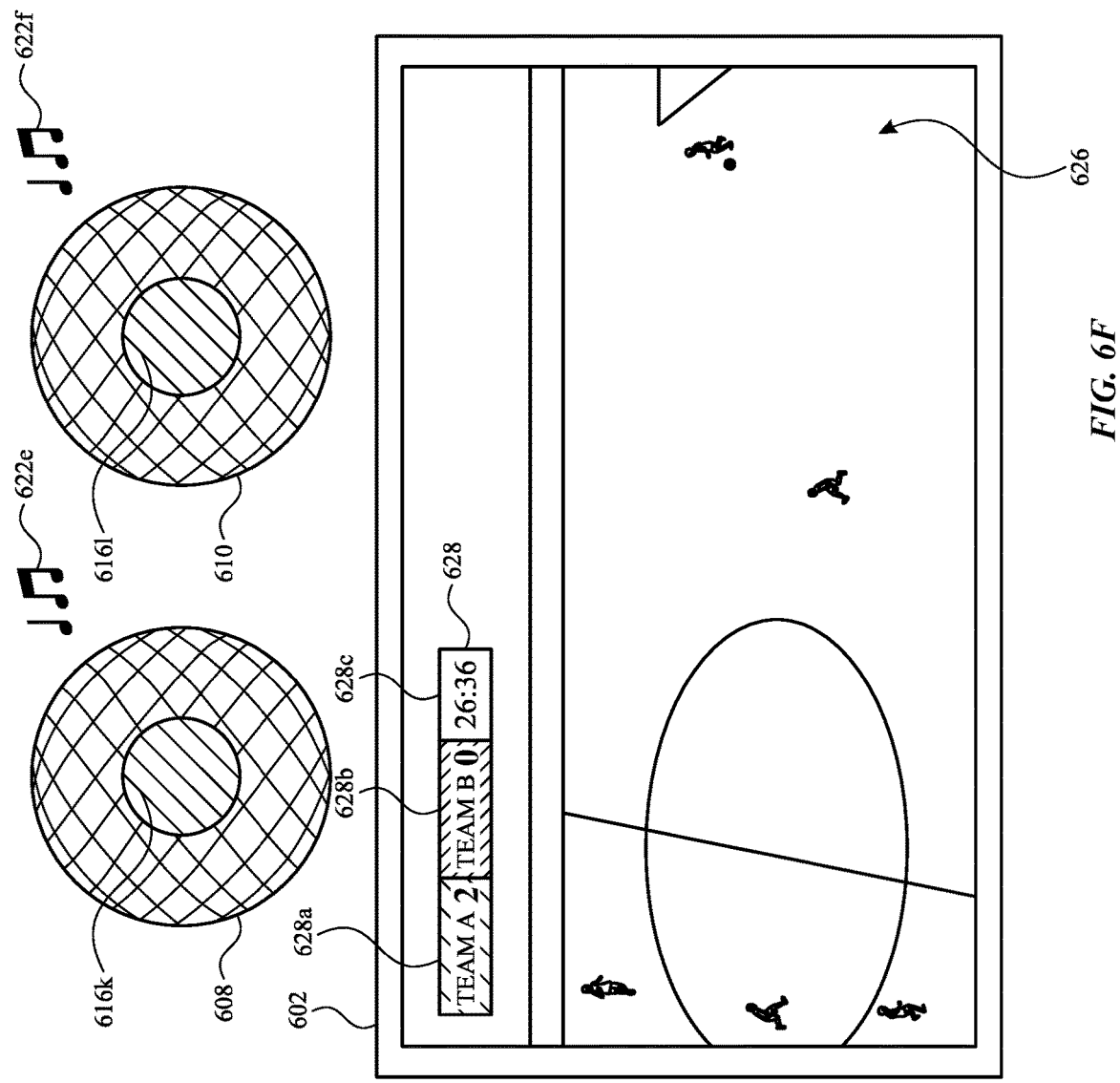

At FIG. 6F, first speaker accessory device 608 and second speaker accessory device 610 output light that is based on attributes of a sporting event at a first time of the sporting event. For instance, at FIG. 6F, display 602 displays first sporting event 626, which includes a representation (e.g., an image, a frame of a video, and/or a frame of a live video) of a sporting event (e.g., a soccer game). First sporting event 626 includes scoreboard 628 having first team score 628a, second team score 628b, and time indicator 628c (e.g., time remaining within a portion (e.g., half, quarter, or period) of the sporting event and/or time elapsed since a start of the sporting event). First team score 628a indicates that Team A has two points and second team score 628b indicates that Team B has zero points. Accordingly, Team A is currently winning the sporting event. First team score 628a includes a first team color, as indicated by ninth hatching, representative of a first color scheme (e.g., team colors) associated with Team A. Similarly, second team score 628b includes a second team color, as indicated by tenth hatching, representative of a second color scheme (e.g., team colors) associated with Team B.

At FIG. 6F, first speaker accessory device 608 and second speaker accessory device 610 receive information from second electronic device 606 (and/or another electronic device) that is based on a current score and/or a recent event of the sporting event. For instance, at FIG. 6F, first speaker accessory device 608 and second speaker accessory device 610 output light 616*k* and light 616*l*, respectively, where light 616*k* and light 616*l* each include the first team color. First speaker accessory device 608 and second speaker accessory device 610 output light 616*k* and light 616*l*, respectively, because Team A is the team that is currently winning the sporting event. Thus, a user viewing first sporting event 626 can easily determine which team participating in the sporting event is currently winning via light 616*k* and/or light 616*l*.

At FIG. 6F, first speaker accessory device 608 and second speaker accessory device 610 output audio 622*e* and audio 622*f*, respectively. Audio 622*e* and audio 622*f* are associated with first sporting event 626 (e.g., audio of a commentator of the sporting event and/or audio otherwise associated with the sporting event) and are based on audio information received by first speaker accessory device 608 and second speaker accessory device 610, respectively. As such, first speaker accessory device 608 and second speaker accessory device 610 output audio and light concurrently to improve an experience of a user viewing first sporting event 626.

Figure 6G:
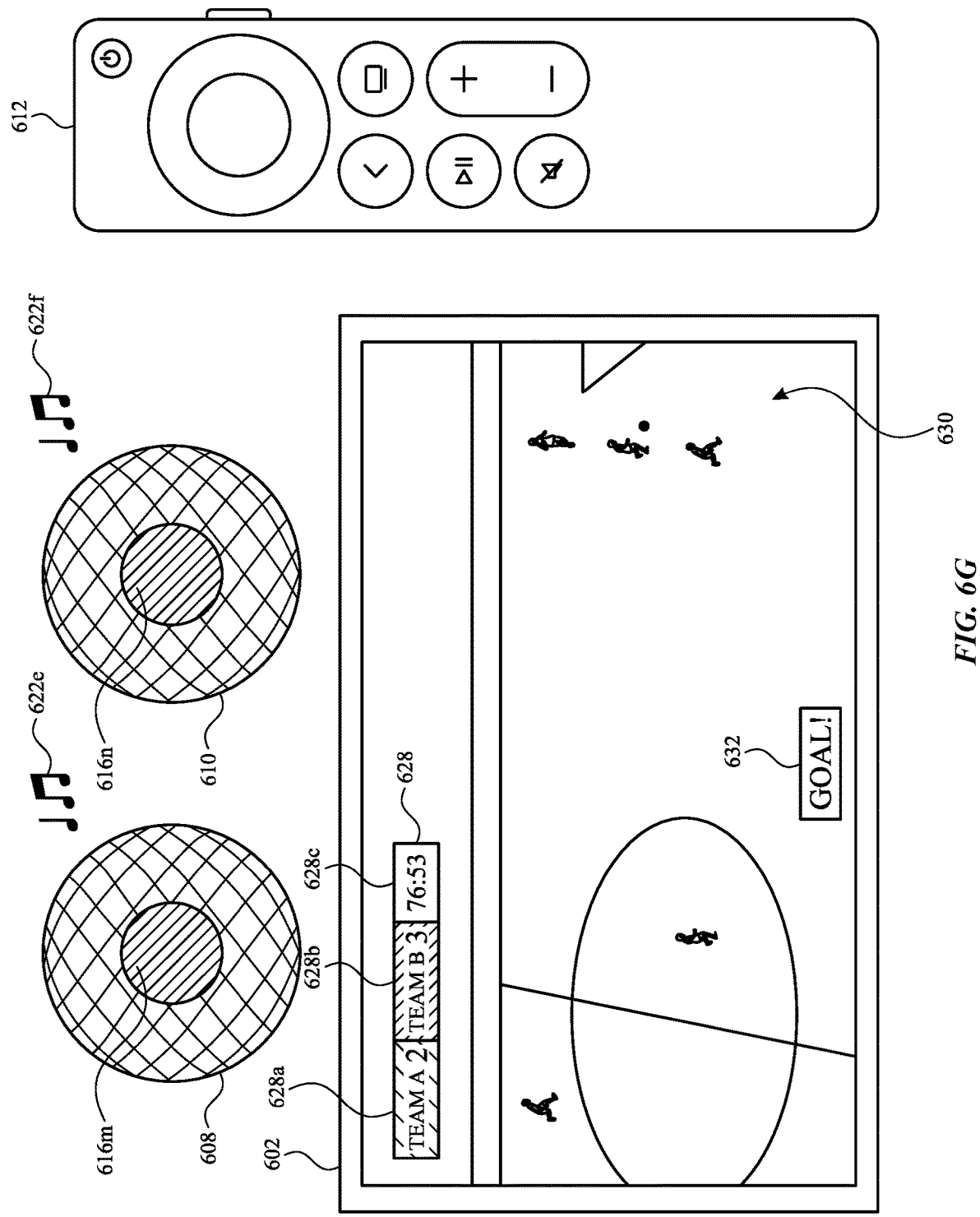

At FIG. 6G, first speaker accessory device 608 and second speaker accessory device 610 output light that is based on attributes of the sporting event at a second time, different from the first time. For instance, at FIG. 6G, display 602 is displaying second sporting event 630, which also includes a representation of the sporting event associated with first sporting event 626 (e.g., the same sporting event associated with first sporting event 626 at a different time of the sporting event). Second sporting event 630 includes scoreboard 628 and event indicator 632. Scoreboard 628 includes first team score 628*a* indicating that Team A has a score of two points and second team score 628*b* indicating that Team B has a score of three points. Event indicator 632 (e.g., "GOAL!") indicates that Team B has recently scored their third point and has taken the lead over Team B. In some embodiments, display 602 does not display event indicator 632, but instead displays second team score 628*b* with an updated score for Team B.

At FIG. 6G, first speaker accessory device 608 and second speaker accessory device 610 output light 616*m* and light 616*n*, respectively. As shown at FIG. 6G, light 616*m* and light 616*n* both include the second team color associated with Team B, as represented by the tenth hatching. In some embodiments, first speaker accessory device 608 and second speaker accessory device 610 output light 616*m* and light 616*n*, respectively, based on Team B scoring a point and/or a goal, as indicated by event indicator 632. In some embodiments, first speaker accessory device 608 and second speaker accessory device 610 output light 616*m* and light 616*n*, respectively, based on Team B taking the lead over Team A in the sporting event. In some embodiments, first speaker accessory device 608 and second speaker accessory device 610 output light 616*m* and light 616*n*, respectively, based on both Team B scoring the point and/or the goal and Team B taking the lead over Team A in the sporting event.

In some embodiments, when Team A and Team B are tied, first speaker accessory device 608 outputs light 616*k* having the first team color associated with Team A and second speaker accessory device 610 outputs light 616*n* having the second team color associated with Team B. In some embodiments, when a team that is not currently winning the sporting event scores a point and/or a goal, first speaker accessory device 608 and/or second speaker accessory device 610 output light having a color associated with the team that scored the point and/or the goal for a predetermined period of time before outputting light having a color associated with the team that is currently in the lead. As set forth above, first speaker accessory device 608 and second speaker accessory device 610 receive information from second electronic device 606 that provides information about the sporting event and/or information about one or more properties of the light in which first speaker accessory device 608 and second speaker accessory device are configured to output.

While FIGS. 6F and 6G illustrate first sporting event 626 and second sporting event 630 that includes a representation of a soccer game, first sporting event 626 and/or second sporting event 630 can include a representation of any sporting event. Accordingly, first speaker accessory device 608 and/or second speaker accessory device 610 can output light to indicate a currently winning team and/or participant of a sporting event, a team and/or participant that recently scored a point and/or a goal, and/or a team and/or participant that recently received an advantage and/or a penalty.

Figure 6H:
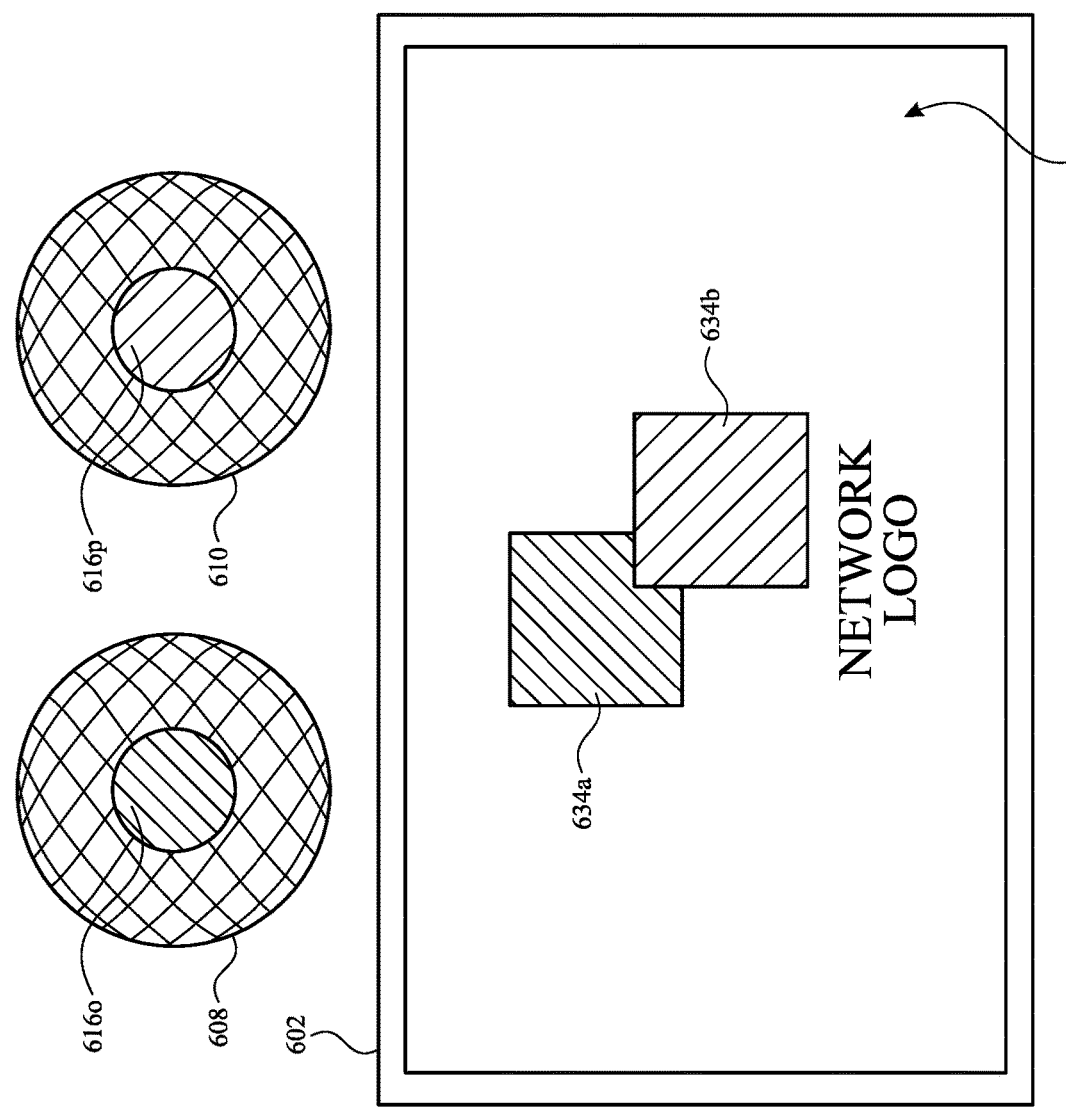

At FIG. 6H, first speaker accessory device 608 and second speaker accessory device 610 output light based on one or more visual elements of a symbol. For instance, at FIG. 6H, display 602 is displaying logo 634, which includes a logo and/or a brand symbol. Logo 634 includes first portion 634*a* having a first logo color and second portion 634*b* having a second logo color, as indicated by eleventh and twelfth hatching, respectively. In some embodiments, display 602 displays logo 634 as part of a currently playing media item. In some embodiments, display 602 displays logo 634 as part of an inactive screen and/or screen saver.

At FIG. 6H, first speaker accessory device 608 outputs light 616*o* having the first logo color, as represented by the eleventh hatching, and second speaker accessory device 610 outputs light 616*p* having the second logo color, as represented by the twelfth hatching. First speaker accessory device 608 and second speaker accessory device 610 receive information related to logo 634 (e.g., one or more visual properties of first portion 634*a*, second portion 634*b*, and/or another portion of logo 634) and/or information about one or more properties of light 616*o* and light 616*p*. As set forth above, in some embodiments, first speaker accessory device 608 and second speaker accessory device 610 output light 616*o* and light 616*p*, respectively, based on a configuration of first speaker accessory device 608 and second speaker accessory device 610, such as a configuration (e.g., a physical configuration) of first speaker accessory device 608 and second speaker accessory device 610 relative to display 602. For instance, at FIG. 6B, first speaker accessory device 608 is positioned at the first location that is proximate to (e.g., as compared to second speaker accessory device 610) first portion 634*a* when first portion 634*a* is displayed on display 602 at FIG. 6H. At FIG. 6B, second speaker accessory device 610 is positioned at the second location that is proximate to (e.g., as compared to first speaker accessory device 608) second portion 634*b* when second portion 634*b* is displayed on display 602 at FIG. 6H.

In some embodiments, while display 602 is displaying logo 634, first speaker accessory device 608 and/or second speaker accessory device 610 output light having both the first logo color and the second logo color (e.g., instead of first speaker accessory device 608 outputting light having the first logo color and second speaker accessory device 610 outputting light having the second logo color). In some embodiments, first speaker accessory device 608 and/or second speaker accessory device 610 output audio concurrently with light 616*o* and/or light 616*p*, respectively, while display 602 is displaying logo 634.

Figure 6I:
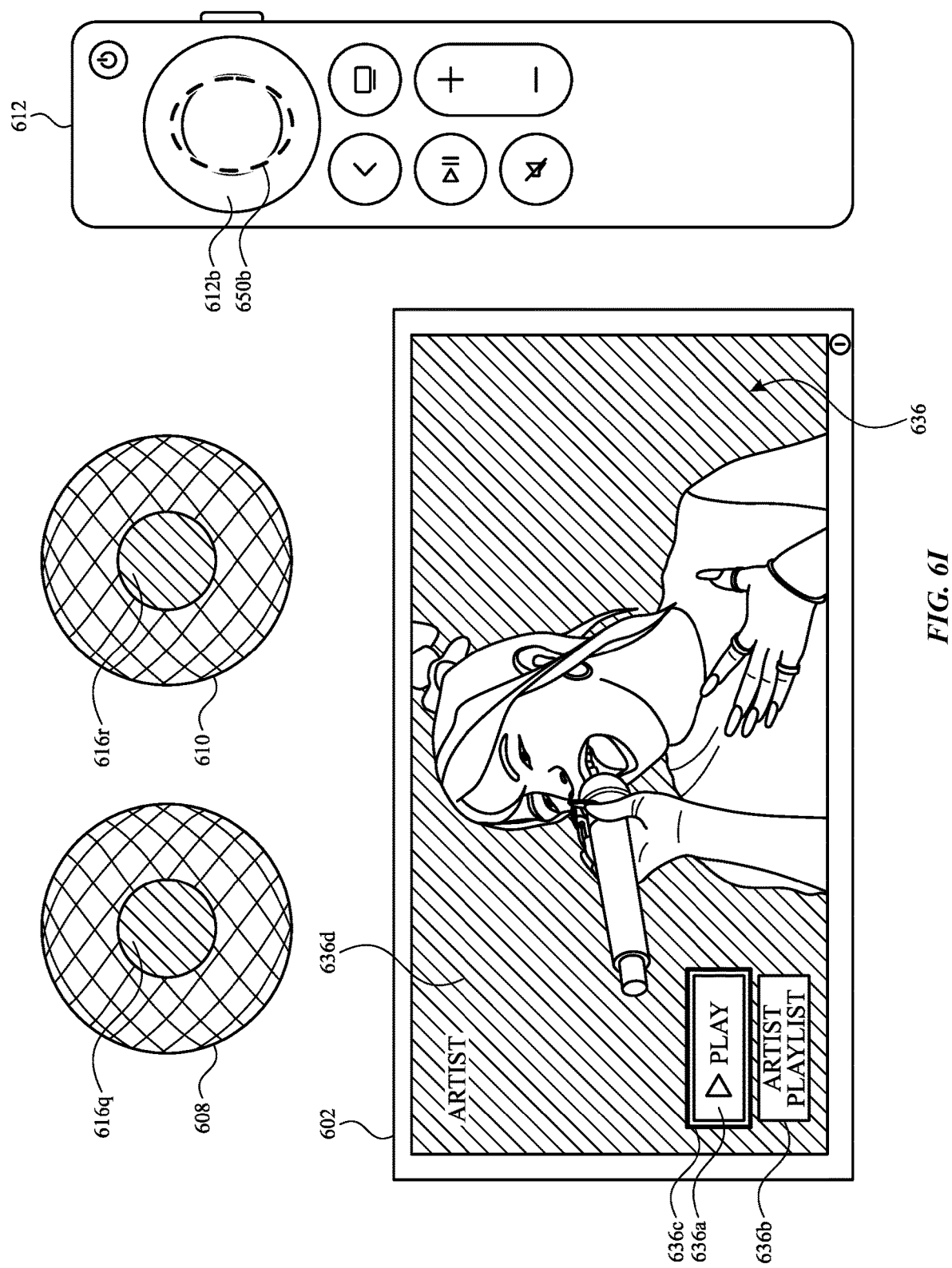

At FIG. 6I, first speaker accessory device 608 and second speaker accessory device 610 output light based on one or more visual elements of an artist page and/or a playlist page. For instance, at FIG. 6I, display 602 is displaying media page 636 that includes an artist page and/or a playlist page, which corresponds to one or more media items, such as one or more songs of a playlist and/or an album. The artist page and/or playlist page provides a user with information related to the one or more media items and enables a user to cause playback of the one or more media items. For instance, media page 636 includes play user interface object 636a and playlist user interface object 636b. Second electronic device 606 is in communication with remote control 612, which is configured to receive user inputs and cause second electronic device 606 to perform operations in response to the user inputs. For instance, in some embodiments, in response to detecting one or more user inputs at remote control 612 requesting to select playlist user interface object 636b, second electronic device 606 causes display 602 to display an information user interface that includes additional information and/or details related to the one or more media items (e.g., one or more songs included in a playlist). As set forth below, in response to detecting user input 650b corresponding to play button 612a of remote control 612 (e.g., while focus is on play user interface object 636a, as indicated by border 636c displayed around play user interface object 636a, or play user interface object 636a is otherwise designated), second electronic device 606 initiates playback of a media item of the one or more media items and causes display 602 to display one or more images and/or video associated with the media item.

At FIG. 6I, media page 636 includes background 636d having a fourth background color, as indicated by thirteenth hatching. First speaker accessory device 608 outputs light 616q having the fourth background color and second speaker accessory device 610 outputs light 616r having the fourth background color. As set forth above, first speaker accessory device 608 and second speaker accessory device 610 receive information from second electronic device 606 that includes information related to content displayed on display 602 and/or includes information about one or more properties of the light that first speaker accessory device 608 and second speaker accessory device 610 are configured to output. For instance, in some embodiments, the information includes information about one or more colors associated with images and/or video displayed on display 602 (e.g., colors of background 636d of media page 636). In some embodiments, the information includes information about one or more colors, brightness, and/or contrast of light 616q and/or 616r. As such, first speaker accessory device 608 and/or second speaker accessory device 610 output light that is based on one or more properties of media page 636 (e.g., one or more visual properties of media page 636, such as one or more colors) displayed on display 602.

While FIG. 6I shows light 616q and light 616r having the fourth background color, which matches the fourth background color of background 636d, in some embodiments, light 616q and/or light 616r include one or more different colors from the fourth background color that is based on background 636d and/or another portion of media page 636.

At FIG. 6I, second electronic device 606 receives an indication of user input 650b corresponding to button 612b of remote control 612. In response to receiving the indication of user input 650b, second electronic device 606 initiates playback of a media item of the one or more media items associated with media page 636, such as a song included in a playlist of songs. After second electronic device 606 initiates playback of the media item, display 602 displays first media item content 638, as shown at FIG. 6J.

Figure 6J:
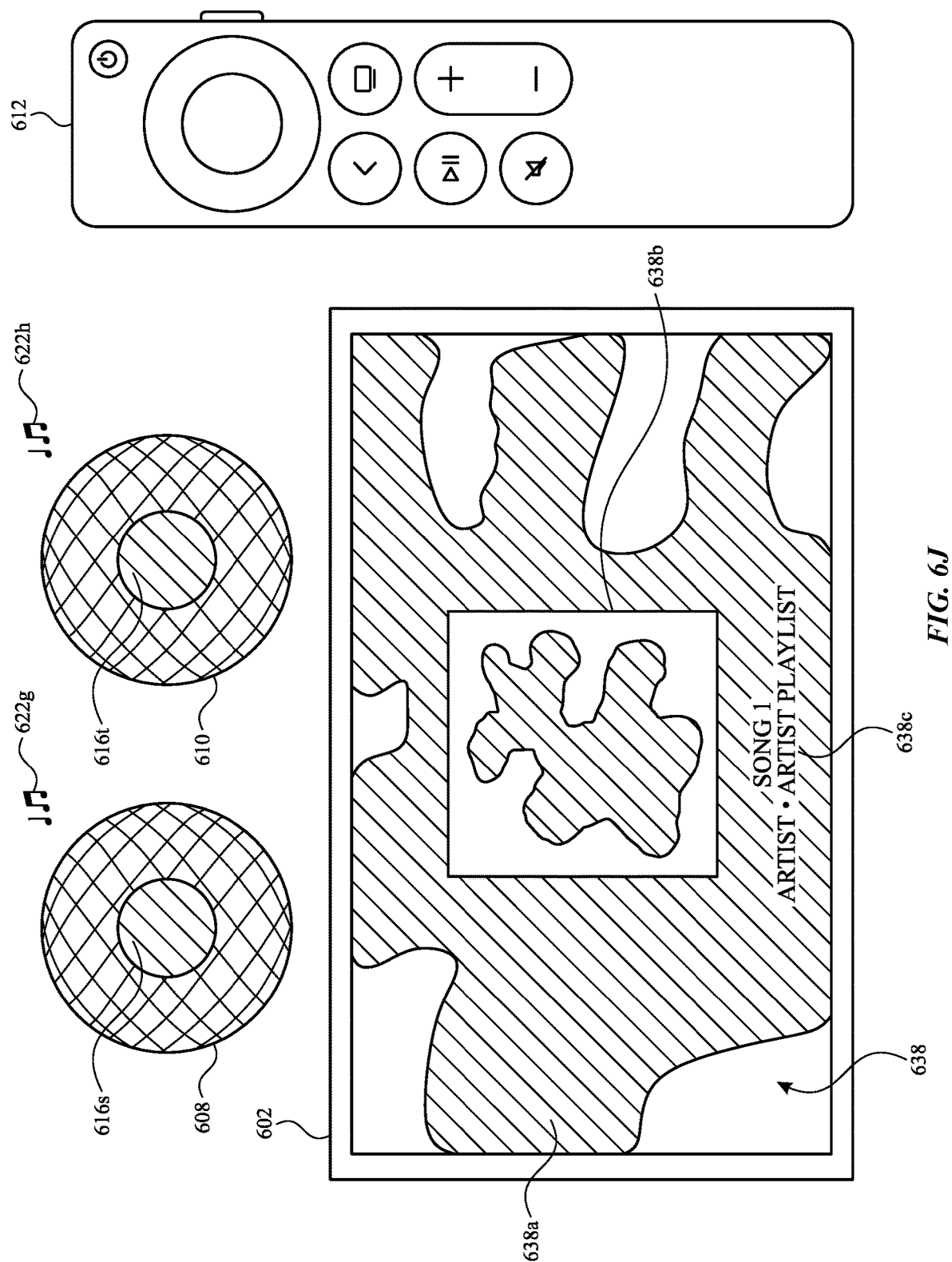

At FIG. 6J, first speaker accessory device 608 and second speaker accessory device 610 output light based on one or more visual properties of first media item content 638. First media item content 638 includes information about the media item. For instance, first media item content 638 includes background 638a, visual element 638b, and media item indicator 638c. Background 638a includes symbols, icons, images, and/or visual elements that are associated with the media item being played back, such as a song of a playlist. In some embodiments, background 638a includes a color that is based on one or more properties of visual element 638b. For instance, at FIG. 6J, visual element 638b includes a representation of an album cover and/or image associated with the media item. Both background 638a and visual element 638b include a first media item color, as indicated by fourteenth hatching at FIG. 6J. Media item indicator 638c includes text identifying and/or providing information about the media item, such as a song title, an artist name, an album name, and/or a playlist name.

At FIG. 6J, first speaker accessory device 608 outputs light 616s having the first media item color and second speaker accessory device 610 outputs light 616t having the first media item color. First speaker accessory device 608 and second speaker accessory device 610 receive information from second electronic device 606 (and/or another electronic device) that includes information about first media item content 638 (e.g., first speaker accessory device and/or second speaker accessory device 610 determine one or more properties of light 616s and/or light 616t, respectively) and/or information about one or more properties of light 616s and light 616t, respectively, where the one or more properties of light 616s and light 616t are based on first media item content 638 (e.g., second electronic device 606 and/or another electronic device determines the one or more properties of light 616s and light 616t). Accordingly, first speaker accessory device 608 and second speaker accessory device 610 output light 616s and light 616t, respectively, which is based on one or more properties (e.g., visual properties) of first media item content 638, such as one or more colors of background 638a and/or visual element 638b.

At FIG. 6J, first speaker accessory device 608 outputs audio 622g and second speaker accessory device 610 outputs audio 622h. Audio 622g and audio 622h are associated with first media item content 638 (e.g., audio of a song) and are based on audio information received by first speaker accessory device 608 and second speaker accessory device 610, respectively. In some embodiments, first speaker accessory device 608 and/or second speaker accessory device 610 receive the audio information from second electronic device 606. In some embodiments, first speaker accessory device 608 and/or second speaker accessory device 610 receive the audio information from another electronic device (e.g., first electronic device 604 and/or a server). As such, first speaker accessory device 608 and second speaker accessory device 610 output audio and light concurrently to improve an experience of a user viewing first media item content 638.

In some embodiments, media page 636 is associated with the media item and a second media item. In some embodiments, after the media item corresponding to first media item content 638 ends (e.g., plays back for the entire duration of the media item and/or is skipped), second electronic device 606 (and/or another electronic device) causes playback of the second media item and/or causes display 602 to display second media item content 640, as shown at FIG. 6K.

Figure 6K:
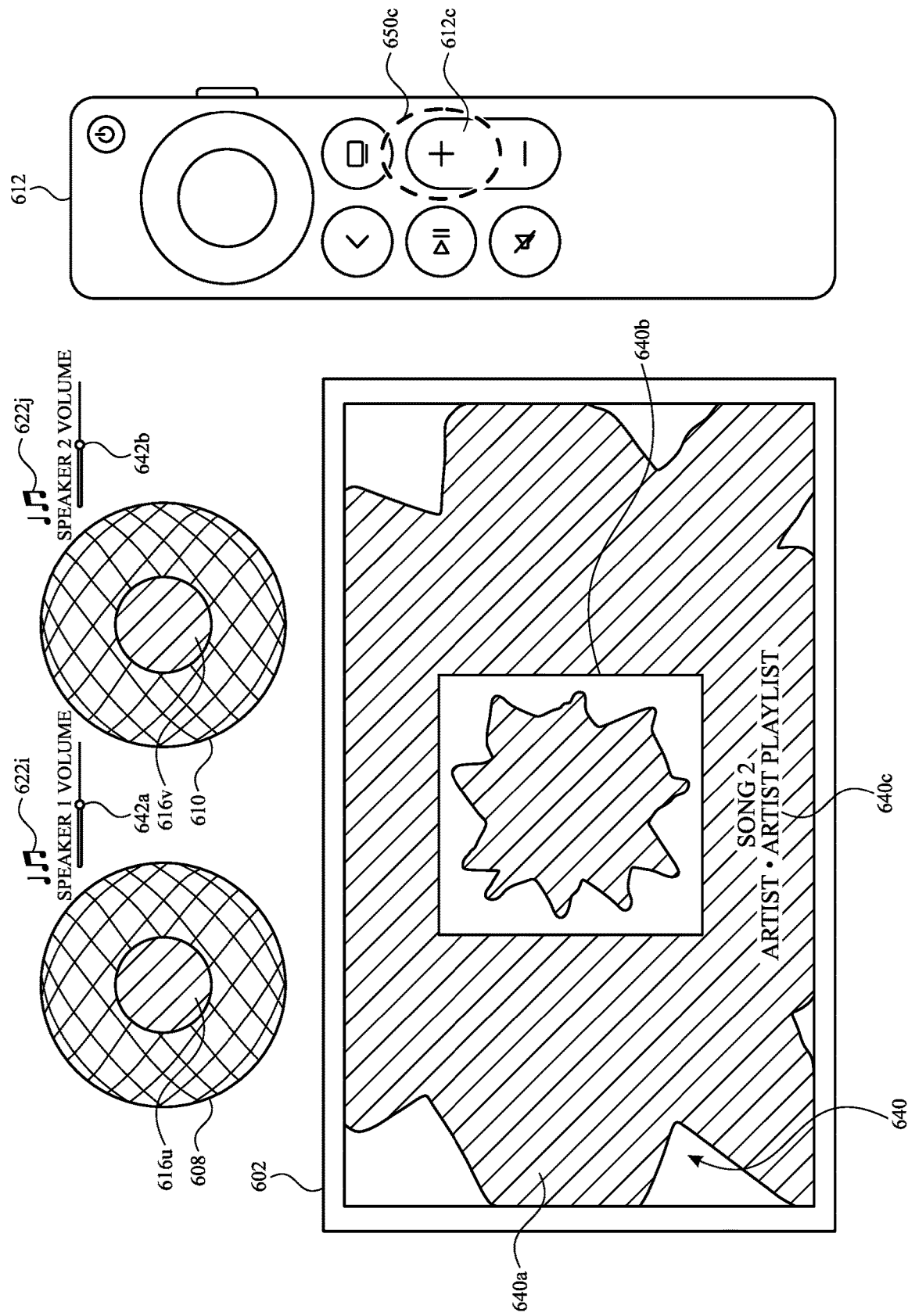

At FIG. 6K, first speaker accessory device 608 and second speaker accessory device 610 output light based on one or more visual properties of second media item content 640. Second media item content 640 includes information about the second media item. For instance, second media item content 640 includes background 640a, visual element 640b, and media item indicator 640c. Background 640a includes symbols, icons, images, and/or visual elements that are associated with the media item being played back, such as a song of a playlist. In some embodiments, background 640a includes a color that is based on one or more properties of visual element 640b. For instance, at FIG. 6K, visual element 640b includes a representation of an album cover and/or image associated with the media item. Both background 640a and visual element 640b include a second media item color, as indicated by fifteenth hatching at FIG. 6K. Media item indicator 640c includes text identifying and/or providing information about the second media item, such as a song title, an artist name, an album name, and/or a playlist name.

At FIG. 6K, first speaker accessory device 608 outputs light 616u having one or more first properties, such as a first brightness and the second media item color, and second speaker accessory device 610 outputs light 616v having one or more second properties, such as a second brightness and the second media item color. First speaker accessory device 608 and second speaker accessory device 610 receive information from second electronic device 606 (and/or another electronic device) that includes information about second media item content 640 (e.g., first speaker accessory device and/or second speaker accessory device 610 determine one or more properties of light 616u and/or light 616v, respectively) and/or information about one or more properties of light 616u and light 616v, respectively, where the one or more properties of light 616u and light 616v are based on second media item content 640 (e.g., second electronic device 606 and/or another electronic device determines the one or more properties of light 616u and light 616v). As set forth below, in some embodiments, one or more properties of light 616u and/or light 616v are based on a volume level of audio outputted by first speaker accessory device 608 and second speaker accessory device 610, respectively. Accordingly, first speaker accessory device 608 and second speaker accessory device 610 output light 616u and light 616v, respectively, which is based on one or more properties (e.g., visual properties) of second media item content 640, such as one or more colors of background 640a and/or visual element 640b, and/or a volume level of audio outputted by first speaker accessory device 608 and second speaker accessory device 610.

At FIG. 6K, first speaker accessory device 608 outputs audio 622i and second speaker accessory device 610 outputs audio 622j. Audio 622i and audio 622j are associated with second media item content 640 (e.g., audio of a song) and are based on audio information received by first speaker accessory device 608 and second speaker accessory device 610, respectively. As such, first speaker accessory device 608 and second speaker accessory device 610 output audio and light concurrently to improve an experience of a user viewing second media item content 640. At FIG. 6K, first speaker accessory device 608 outputs audio 622i at a first volume, as indicated first volume indicator 642a. Second speaker accessory device 610 outputs audio 622j at a second volume, as indicated by second volume indicator 642b. In some embodiments, the first volume of audio 622i and the second volume of audio 622j are the same. Illustrated first volume indicator 642a and second volume indicator 642b are provided for clarity, but are not part of the second media item content 640 displayed on display 602.

Light 616u includes a first brightness that is based on the first volume of audio 622i and light 616v includes a second brightness that is based on the second volume of audio 622j. For instance, at FIG. 6K, fifteenth hatching representative of light 616u indicates that light 616u includes both the second media item color and the first brightness. Similarly, fifteenth hatching representative of light 616v indicates that light 616v includes both the second media item color and the second brightness. Therefore, in some embodiments, one or more properties of light output by first speaker accessory device 608 and/or second speaker accessory device 610 are based on content displayed on display 602 and/or a volume level of audio outputted by first speaker accessory device 608 and/or second speaker accessory device 610.

In some embodiments, first speaker accessory device 608 and second speaker accessory device 610 are configured to adjust the respective volumes of audio 622i and audio 622j in response receiving an indication of user input (e.g., receiving an indication of user input corresponding to remote control 612 from second electronic device 606 and/or another electronic device). In some embodiments, first speaker accessory device 608 and second speaker accessory device 610 are configured to adjust the respective volumes of audio 622i and audio 622j based on information received from second electronic device 606 (and/or another electronic device) without receiving an indication of user input. For instance, in some embodiments, audio information associated with a media item includes different volumes at different playback times. Thus, first speaker accessory device 608 and second speaker accessory device 610 automatically adjust the volume of audio 622i and audio 622j, respectively, based on the audio information associated with the media file.

At FIG. 6K, second electronic device 606 (and/or another electronic device) receives an indication of user input 650c corresponding to volume button 612c of remote control 612. In response to receiving the indication of user input 650c, second electronic device 606 (and/or another electronic device) causes first speaker accessory device 608 and second speaker accessory device 610 to adjust the volumes of audio 622i and audio 622j, respectively, as shown at FIG. 6L.

Figure 6L:
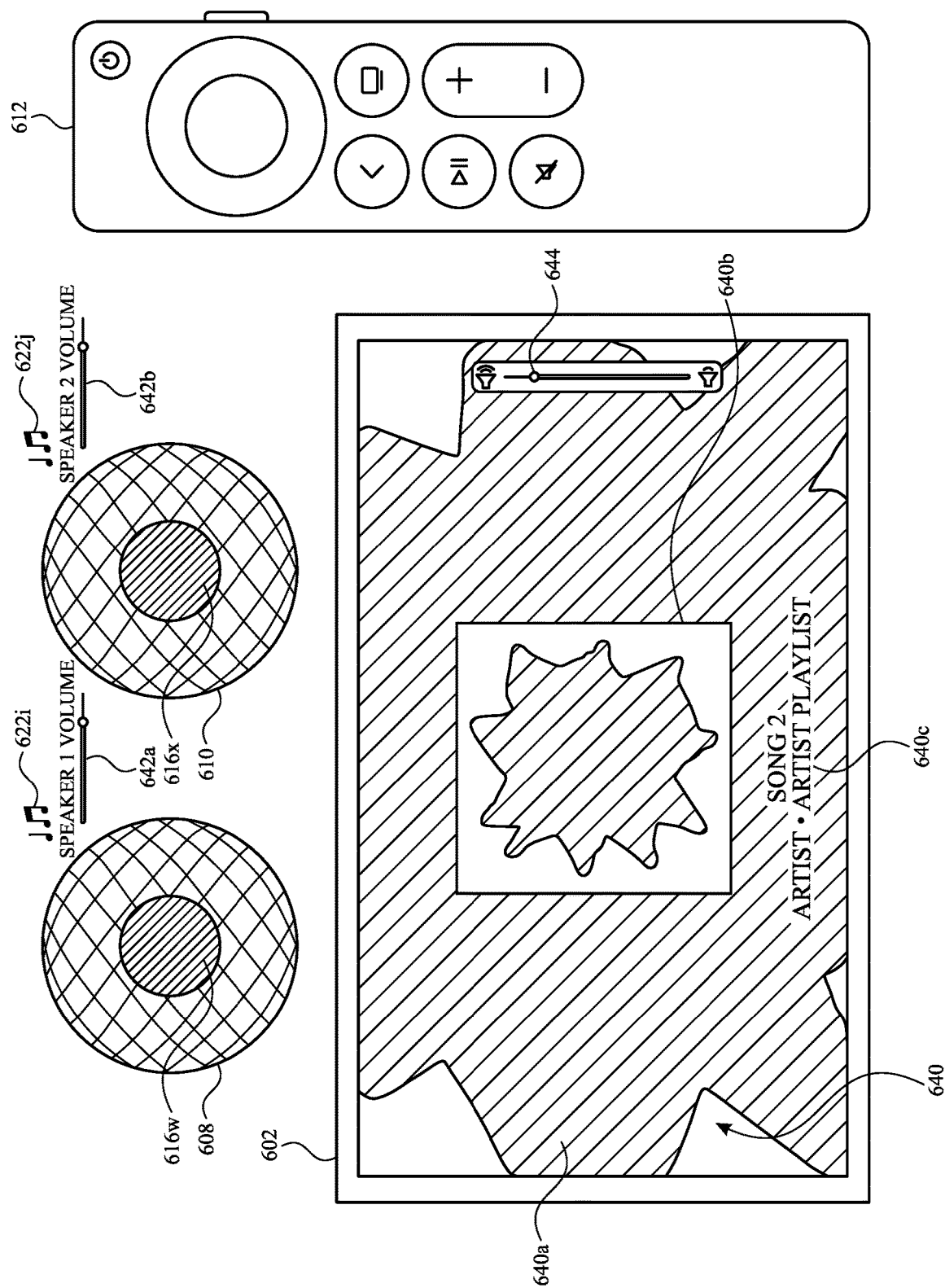

At FIG. 6L, display 602 maintains display of second media item content 640 and displays volume adjustment indicator 644 overlaid on second media item content 640. In some embodiments, display 602 displays volume adjustment indicator 644 in response to receiving information from second electronic device 606 (and/or another electronic device) indicative of user input 650c. In some embodiments, volume adjustment indicator 644 moves and or is animated on display 602 to visually show an adjustment in volume of output of audio (e.g., audio output from a speaker of display 602 and/or audio 622i and audio 622j). In some embodiments, display 602 does not include and/or display volume adjustment indicator 644. For instance, as set forth above, in some embodiments, volume of audio output associated with second media item content 640 (e.g., audio 622i and/or audio 622j) is adjusted without receiving an indication of user input (e.g., user input 650c).

At FIG. 6L, first speaker accessory device 608 and second speaker accessory device 610 adjust a brightness of the outputted light based on an adjustment in the volume of audio output by first speaker accessory device 608 and second speaker accessory device 610. For instance, at FIG. 6L, first volume indicator 642a shows that audio 622i is at a third volume, greater than the first volume, and second volume indicator 642b shows that audio 622j is at a fourth volume, greater than the second volume. Accordingly, first speaker accessory device 608 and second speaker accessory device 610 increased the volume of audio 622i and audio 622j, respectively, in response to receiving an indication of user input 650c from second electronic device 606 (and/or another electronic device). At FIG. 6L, first speaker accessory device 608 outputs light 616w having one or more third properties, such as the second media item color and a third brightness, and second speaker accessory device 610 outputs light 616x having the one or more fourth properties, such as the second media item color and a fourth brightness. Light 616w includes a third brightness, greater than the first brightness, that is based on the third volume of audio 622i and light 616x includes a fourth brightness, greater than the second brightness, that is based on the fourth volume of audio 622j. For instance, at FIG. 6L, sixteenth hatching representative of light 616w indicates that light 616w includes the second media item color and the third brightness. Similarly, sixteenth hatching representative of light 616x indicates that light 616x includes the second media item color and the fourth brightness.

Therefore, first speaker accessory device 608 outputs light 616w that maintains the second media item color, but includes a greater brightness than light 616u because of the increase in volume of audio 622i. Similarly, second speaker accessory device 610 outputs light 616x that maintains the second media item color, but includes a greater brightness than light 616v because of the increase in volume of audio 622j. In some embodiments, first speaker accessory device 608 and/or second speaker accessory device 610 do not adjust the brightness of the outputted light based on a change in volume of audio outputted by first speaker accessory device 608 and/or second speaker accessory device 610, respectively. In some embodiments, first speaker accessory device 608 and/or second speaker accessory device 610 adjust a different property of the outputted light based on the change in volume of audio outputted by first speaker accessory device 608 and/or second speaker accessory device 610, respectively.

First speaker accessory device 608 and/or second speaker accessory device 610 are configured to output light having one or more predetermined properties (e.g., light having a predetermined color) when a function and/or operation is available to be performed by second electronic device 606 (and/or another electronic device). For instance, at FIG. 6M, while display 602 is displaying second media item content 640 and while first speaker accessory device 608 outputs light 616w, second speaker accessory device 610 outputs light 616y, which includes one or more properties that are different from light 616x, as indicated by seventeenth hatching at FIG. 6M. Light 616y provides guidance and/or prompts a user that a function and/or operation is available to be performed. In some embodiments, second speaker accessory device 610 outputs light 616y based on receiving information from second electronic device 606 (and/or another electronic device) that the function and/or operation is available to be performed.

In some embodiments, second electronic device 606 (and/or another electronic device) provides information to second speaker accessory device 610 (and/or first speaker accessory device 608) in response to receiving an indication of one or more user inputs (e.g., a touch gesture detected at remote control 612), in response to receiving an indication of a notification, and/or in response to receiving an indication that an external device (e.g., headphones) is within communication range of second electronic device 606 (and/or another electronic device). Therefore, second speaker accessory device 610 outputs light 616y to provide guidance to a user that the function and/or operation can be performed. In some embodiments, the function and/or operation can be performed by second electronic device 606 (and/or another electronic device) in response to receiving an indication of one or more second user inputs at remote control 612. As set forth below, in some embodiments, the function and/or operation is causing display 602 to display a settings user interface (e.g., settings user interface 648) that enables control of playback of a media item, display of content on display 602, launching and/or navigating to one or more applications, and/or connecting an external device.

Figure 6M:
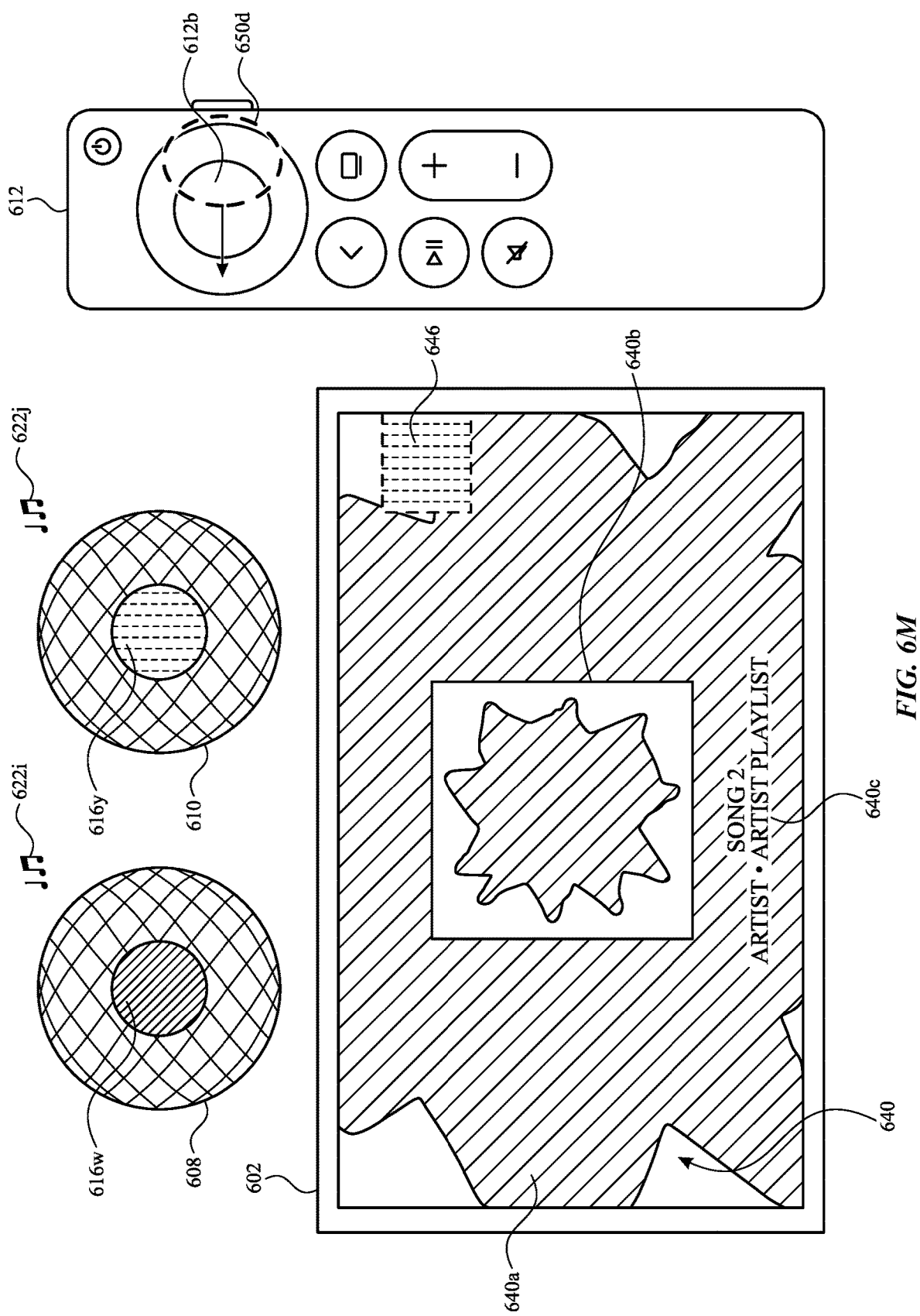

At FIG. 6M, display 602 is displaying prompt 646 overlaid on second media item content 640. In some embodiments, prompt 646 is also displayed when the function and/or operation is available to be performed. Thus, in some embodiments, prompt 646 provides additional guidance to a user that the function and/or operation is able to be performed (e.g., in response to one or more user inputs). At FIG. 6M, prompt 646 is partially displayed on display 602, such that a portion of prompt 646 is not shown on display 602. Partially displaying prompt 646 on display 602 provides an indication and/or guidance to a user that providing one or more user inputs causes additional user interfaces and/or information to be displayed on display 602. For instance, by displaying a portion of prompt 646 on display 602, a user can understand that additional visual elements are not displayed on display 602 and that providing one or more user inputs can cause such additional elements to be displayed on display 602. In some embodiments, display 602 does not display prompt 646 when second speaker accessory device 610 outputs light 616y.

At FIG. 6M, second electronic device 606 (and/or another electronic device) receives an indication of user input 650d corresponding to button 612b of remote control 612. In response to receiving the indication of user input 650d, second electronic device 606 (and/or another electronic device) initiates performance of the function and/or operation and causes display of settings user interface 648, as shown at FIG. 6N.

Figure 6N:
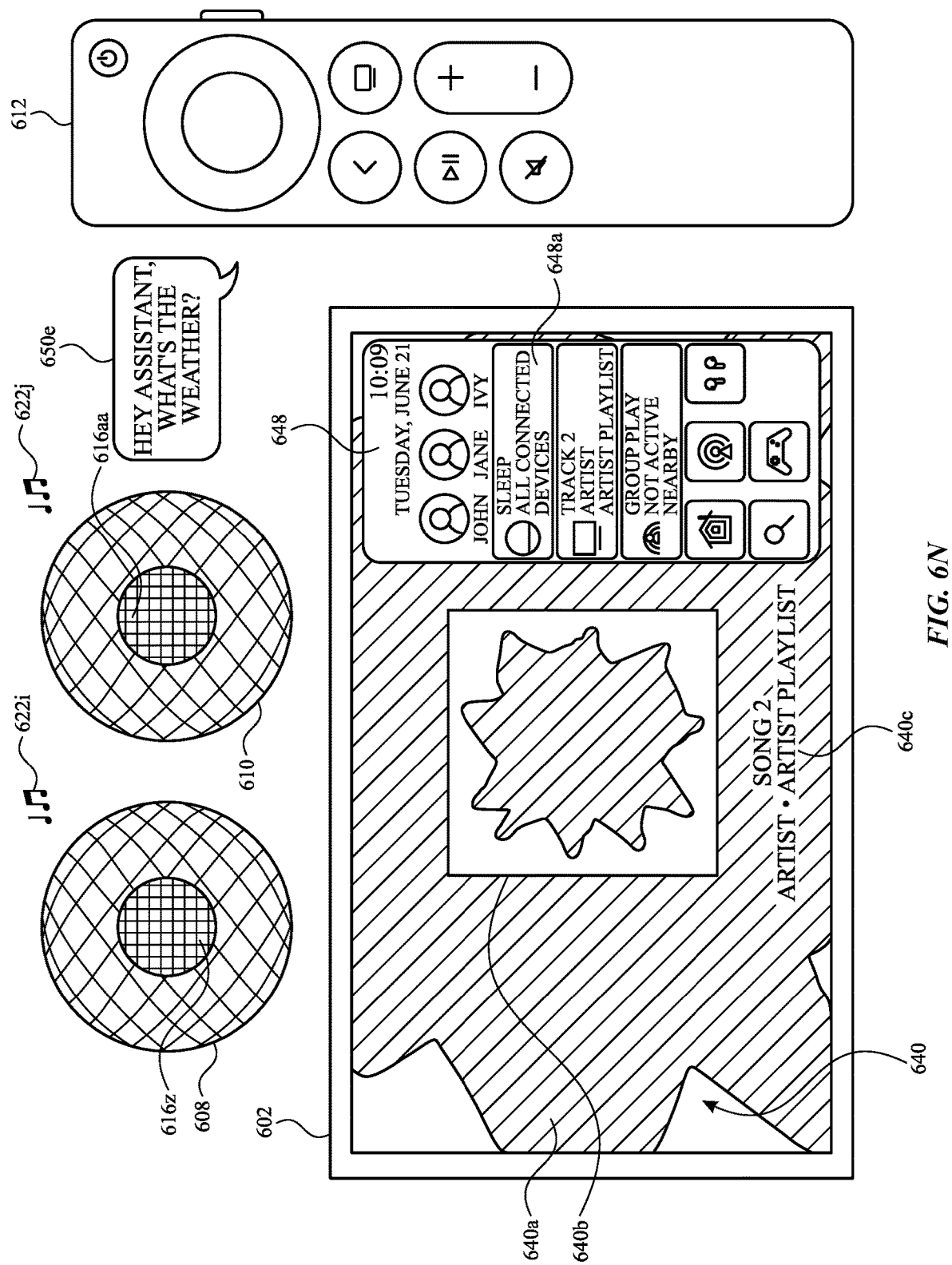

At FIG. 6N, second electronic device 606 (and/or another electronic device) causes display 602 to display settings user interface 648 in response to receiving the indication of user input 650d. Settings user interface 648 includes user interface objects that enable control of second electronic device 606 (and/or another electronic device). For instance, in some embodiments, in response to receiving an indication of user input selecting user interface object 648a, second electronic device 606 initiates a sleep mode and causes display 602 to cease displaying second media item content 640 and settings user interface 648.

At FIG. 6N, first speaker accessory device 608 outputs light 616z and second speaker accessory device 610 outputs light 616aa. Light 616z includes one or more properties (e.g., one or more colors, brightness, and/or contrast) that are different from light 616w, where light 616w is output by first speaker accessory device 608 prior to (e.g., before) display 602 displaying settings user interface 648. Similarly, light 616aa includes one or more properties (e.g., one or more colors, brightness, and/or contrast) that are different from light 616x and/or light 616y, where light 616x and light 616y are output by second speaker accessory device 610 prior to (e.g., before) display 602 displaying settings user interface 648. Therefore, in some embodiments, first speaker accessory device 608 and/or second speaker accessory device 610 adjust and/or change one or more properties of the outputted light based on display 602 displaying settings user interface 648. In some embodiments, first speaker accessory device 608 maintains output of light 616w when display 602 displays settings user interface 648 and second speaker accessory device 610 maintains output of light 616x and/or light 616y when display 602 displays settings user interface 648.

First speaker accessory device 608 and/or second speaker accessory device 610 are configured to perform functions in addition to outputting light and audio. In some embodiments, first speaker accessory device 608 and/or second speaker accessory device 610 are smart speakers that are in communication with an external device (e.g., a server) via a wireless communication technique (e.g., Bluetooth, Wi-Fi, and/or other Internet connection). Accordingly, in some embodiments, first speaker accessory device 608 and/or second speaker accessory device 610 can request and/or receive information from the external device, such as news, weather information, media items (e.g., music and/or podcasts), and/or location information. In some embodiments, first speaker accessory device 608 and/or second speaker accessory device 610 can perform various functions in response to user inputs (e.g., voice inputs) that include a predetermined word and/or phrase (e.g., "Hey Assistant"). In some embodiments, in response to detecting the predetermined word and/or phrase, first speaker accessory device 608 and/or second speaker accessory device 610 are configured to detect utterances (e.g., speech) of a user and determine a function to perform based on the detected utterances of the user.

For instance, at FIG. 6N, second speaker accessory device 610 detects user input 650e (e.g., a voice command) requesting second speaker accessory device 610 to perform a function (e.g., "Hey Assistant, what's the weather?"). At FIG. 6N, user input 650e includes a voice input and/or voice command requesting that second speaker accessory device 610 provide information about the current weather. In response to detecting user input 650e, second speaker accessory device 610 outputs light 616ab and outputs audio 622k, as shown at FIG. 6O.

At FIG. 6O, audio 622k includes the response "The weather is sunny and 70°," which is a response to the request associated with user input 650e. In addition, light 616ab includes a virtual assistant color, as indicated by nineteenth hatching at FIG. 6O. Light 616ab is different from light 616v, light 616x, light 616y, and/or light 616aa and is associated with performing an operation that includes outputting audio 622k (e.g., performing a function in response to detecting user input 650e). For instance, at FIG. 6O, first speaker accessory device 608, which did not detect user input 650e, maintains output of light 616z and does not output audio 622k. Thus, first speaker accessory device 608 and/or second speaker accessory device 610 can provide visual indications associated with the current functions and/or operations in which first speaker accessory device 608 and/or second speaker accessory device 610 are performing.

FIGS. 7A-7C are a flow diagram illustrating a method for outputting light using a computer system in accordance with some embodiments. Method 700 is performed at a computer system (e.g., 100, 300, 500, 604, 606, 608, 610, and/or 800) (e.g., an electronic device; a smart device, such as a smartphone, a smartwatch, and/or a smart speaker; a mobile device; a wearable device; and/or a set of devices in communication with one another (e.g., two or more smart speakers operating independently of one another or operating together as a stereo pair)) that is in communication with one or more light sources (e.g., a light device (e.g., integrated into the computer system or connected to the computer system) and/or a light accessory, such as a light bulb and/or a light emitting diode ("LED")). In some embodiments, the computer system is in communication with a display generation component (e.g., a display controller, a touch-sensitive display system, a projector, a display screen, a display monitor, and/or a holographic display) via a wireless connection, such as Bluetooth, Wi-Fi, and/or another Internet connection. In some embodiments, the computer system is in communication with the display generation component via an intermediate device, such as a server. In some embodiments, the one or more light sources are included in and/or attached to a housing of the computer system. In some embodiments, the one or more lights sources are in wireless (e.g., Bluetooth, Wi-Fi, and/or an Internet connection) and/or wired communication with the computer system. Some operations in method 700 are, optionally, combined, the orders of some operations are, optionally, changed, and some operations are, optionally, omitted.

As described below, method 700 provides an intuitive way for outputting light. The method reduces the cognitive burden on a user for outputting light, thereby creating a more efficient human-machine interface. For battery-operated computing devices, enabling a user to output light faster and more efficiently conserves power and increases the time between battery charges.

While the computer system (e.g., 100, 300, 500, 604, 606, 608, 610, and/or 800) is configured to provide output (e.g., 622a-622j) (e.g., audio output) (in some embodiments, output that is different from light) associated with content (e.g., 614, 618, 620, 624, 626, 630, 634, 636, 638, and/or 640) displayed on a display generation component (e.g., 602 and/or 802) (e.g., the computer system is in communication with one or more devices (e.g., speakers) and/or includes one or more devices (e.g., speakers) that are configured to output second content (e.g., audio) that relates to the content displayed on the display generation component, such as audio of a video, audio of a song, audio of a podcast, audio of a movie and/or television show, audio of a sporting event, and/or audio of other multimedia content), the computer system (e.g., 100, 300, 500, 604, 606, 608, 610, and/or 800) receives (702) information associated with the content (e.g., 614, 618, 620, 624, 626, 630, 634, 636, 638, and/or 640) displayed (e.g., currently displayed) on the display generation component (e.g., 602 and/or 802) (e.g., information about images, symbols, icons, graphics, logos, objects, teams, and/or other visual elements displayed on the display generation component, such as colors associated with (and/or included in) the images, symbols, icons, graphics, logos, objects, teams, and/or other visual elements; information about a type of the content, such as a movie, television show, song, playlist, album, artist, sporting event, podcast, and/or other type of multimedia; information about timing of the content (e.g., what images are displayed at what playback times of the content); information about a status of the content (e.g., a current playback time, a team that is winning a sporting event, an event that occurred (such as a player or team scoring), a current volume of audio output, and/or whether the content is currently playing or is paused); and/or information about characteristics of the content, such as a network and/or brand associated with the content; an album, artist, playlist, and/or track title of a song of the content; and/or general colors associated with the content (e.g., colors that are associated with the content generally and not based on images currently displayed on the display generation component)).

In response to receiving the information associated with the content (e.g., 614, 618, 620, 624, 626, 630, 634, 636, 638, and/or 640) displayed on the display (e.g., 602 and/or 802), the computer system (e.g., 100, 300, 500, 604, 606, 608, 610, and/or 800) outputs (704), via the one or more light sources, light (e.g., 616a-616ab) (e.g., causes light to be emitted via the one or more light sources that are in communication with the computer system) in accordance with the received information (e.g., based on the received information) associated with the content (e.g., 614, 618, 620, 624, 626, 630, 634, 636, 638, and/or 640) displayed on the display generation component (e.g., 602 and/or 802) (e.g., one or more characteristics of the light (e.g., color, intensity, brightness, color temperature, contrast, hardness, and/or direction) is based on the information about the content displayed on the display generation component so that the light is perceived as part of the experience associated with the content). In some embodiments, the light (e.g., 616a-616ab) includes one or more colors that are based on the received information about the content (e.g., 614, 618, 620, 624, 626, 630, 634, 636, 638, and/or 640) displayed on the display generation component (e.g., 602 and/or 802). In some embodiments, the light (e.g., 616a-616ab) changes in color, intensity, brightness, color temperature, contrast, hardness, and/or direction over time as playback of the content (e.g., 614, 618, 620, 624, 626, 630, 634, 636, 638, and/or 640) progresses.

Outputting the light in accordance with the received information associated with the content displayed on the display generation component improves an experience of a user viewing the content without needing additional user input, thereby reducing the number of inputs needed to perform an operation.

In some embodiments, the light (e.g., 616a-616ab) (e.g., visible light emitted from the one or more light sources) includes a first color (e.g., a first set of one or more light sources of the one or more light sources outputs a first portion of the light having a first color that is based on the received information associated with the content displayed on the display generation component) and a second color (e.g., a second set of one or more light sources of the one or more light sources outputs a second portion of the light having a second color, different from the first color, that is based on the received information associated with the content displayed on the display generation component), different from the first color. Outputting the light including a first color and a second color, different from the first color improves an experience of a user viewing the content without needing additional user input, thereby reducing the number of inputs needed to perform an operation.

In some embodiments, the computer system (e.g., 100, 300, 500, 604, 606, 608, 610, and/or 800) outputting, via the one or more light sources, the light (e.g., 616a-616ab) in accordance with the received information associated with the content (e.g., 614, 618, 620, 624, 626, 630, 634, 636, 638, and/or 640) displayed on the display generation component (e.g., 602 and/or 802) includes the computer system (e.g., 100, 300, 500, 604, 606, 608, 610, and/or 800) adjusting (e.g., changing an amount, transitioning between different amounts and/or states, and/or otherwise modifying) one or more properties (e.g., color, intensity, brightness, color temperature, contrast, hardness, and/or direction) of the light (e.g., 616a-616ab) over time (e.g., as the content is played back) based on timing information (e.g., what images are displayed at what playback times of the content and/or a status of the content (e.g., a current playback time, a team that is winning a sporting event, an event that occurred (such as a player or team scoring)) of the received information associated with the content (e.g., 614, 618, 620, 624, 626, 630, 634, 636, 638, and/or 640) displayed on the display generation component (e.g., 602 and/or 802) (e.g., the computer system adjusts the one or more properties of the light based on the content updating and/or playing back over time). Adjusting one or more properties of the light over time based on timing information improves an experience of a user viewing the content without needing additional user input, thereby reducing the number of inputs needed to perform an operation.

In some embodiments, the light (e.g., 616a-616ab) includes a third color (e.g., a third set of one or more light sources of the one or more light sources outputs the light having a third color that is based on a fourth color of at least a portion of the content displayed on the display generation component) that is based on a fourth color of at least a portion of the content (e.g., 614, 618, 620, 624, 626, 630, 634, 636, 638, and/or 640) displayed on the display generation component (e.g., 602 and/or 802) (e.g., the third color matches and/or corresponds to at least one color that is associated with the content (e.g., a color currently displayed on the display generation component) and/or the third color is based on a set of one or more colors that are associated with the content (e.g., one or more colors that are currently displayed on the display generation component)). The light including the third color that is based on the fourth color of at least a portion of the content displayed on the display generation component improves an experience of a user viewing the content without needing additional user input, thereby reducing the number of inputs needed to perform an operation.

In some embodiments, the content (e.g., 614, 618, 620, 624, 626, 630, 634, 636, 638, and/or 640) displayed on the display generation component (e.g., 602 and/or 802) includes a sporting event (e.g., a sporting event associated with first sporting event 626 and/or second sporting event 630) (e.g., a game, match, competition, and/or contest that includes individuals and/or teams competing against one another, such as a basketball game, a football game, a soccer game, a baseball game, a hockey game, and/or a tennis match), the received information associated with the content (e.g., 614, 618, 620, 624, 626, 630, 634, 636, 638, and/or 640) displayed on the display generation component includes a status (e.g., a score represented by scoreboard 628 and/or an event indicated by event indicator 632) (e.g., a current score, a recently scored goal and/or point, a player and/or team that is in the lead and/or winning, and/or a player and/or team that has won the sporting event) of the sporting event (e.g., the sporting event associated with first sporting event 626 and/or second sporting event 630), and the light (e.g., 616a-616ab) includes one or more properties based on the status (e.g., the score represented by scoreboard 628 and/or an event indicated by event indicator 632) of the sporting event (e.g., the sporting event associated with first sporting event 626 and/or second sporting event 630) (e.g., the light includes one or more colors representative of a player and/or team that is in the lead, a player and/or team that recently scored a goal and/or point, a player and/or team that has won, and/or a player and/or team that has gained an advantage (e.g., a penalty kick and/or a power play)). The light including one or more properties based on the status of the sporting event provides a user with an ability to quickly and easily identify a current standing and/or condition of the sporting event, thereby providing improved visual feedback.

In some embodiments, the content (e.g., 614, 618, 620, 624, 626, 630, 634, 636, 638, and/or 640) displayed on the display generation component (e.g., 602 and/or 802) includes a trailer page (e.g., 614 and/or 618) (e.g., a preview user interface that includes one or more images, text, symbols, video, and/or icons that provide information about a media file that can be played back and/or output from the trailer page). In some embodiments, the trailer page includes a playback user interface object, such as a selectable user interface object and/or affordance that, when selected, causes a second computer system (e.g., the computer system or a different computer system) to initiate playback and/or output of a media file associated with the trailer pager and/or the content (e.g., causes the computer system to display second content associated with the media file and/or the trailer page). The content including a trailer page improves an experience of a user viewing the content without needing additional user input, thereby reducing the number of inputs needed to perform an operation.

In some embodiments, while displaying the trailer page (706) (e.g., 614 and/or 618), the trailer page (e.g., 614 and/or 618) including a playback user interface object (e.g., 618*a*) and in accordance with a determination that user input (e.g., 650*a*) corresponding to the playback user interface object (e.g., 618*a*) has been received (e.g., user input requesting selection of the playback user interface object and/or to initiate and/or output a media file associated with the trailer page), the computer system (e.g., 100, 300, 500, 604, 606, 608, 610, and/or 800) outputs (708), via the one or more light sources, the light (e.g., 616*a*-616*ab*) as dynamic light (e.g., one or more properties of the light changes over time based on changes and/or updates of second content that is displayed in response to receiving the user input corresponding to the playback user interface object). While displaying the trailer page (706) (e.g., 614 and/or 618), the trailer page (e.g., 614 and/or 618) including the playback user interface object (e.g., 618*a*) and in accordance with a determination that user input (e.g., 650*a*) corresponding to the playback user interface object (e.g., 618*a*) has not been received (e.g., the computer system and/or a second computer system has not detected user input requesting to select the playback user interface object and/or initiate and/or output a media file associated with the trailer page), the computer system (e.g., 100, 300, 500, 604, 606, 608, 610, and/or 800) outputs (710), via the one or more light sources, the light (e.g., 616*a*-616*ab*) as static light (e.g., one or more properties of the light do not change over time, but are maintained while the trailer page having the playback user interface object is displayed). In some embodiments, when the computer system receives an indication that user input corresponding to the playback user interface object was received (e.g., by the computer system and/or a second computer system), second content associated with a media file is displayed via the display generation component, where the second content includes dynamic content, such as a video, that changes over time. In some embodiments, when the computer system does not receive an indication that user input corresponding to the playback user interface object was received, display of the trailer page having the playback user interface object is maintained.

Outputting the light as dynamic light when user input corresponding to the playback user interface object is received and outputting the light as static light when user input corresponding to the playback user interface object is not received provides a user with confirmation about whether the user input was received or not, thereby providing improved visual feedback.

In some embodiments, prior to receiving an indication of user input (e.g., 650*a*) corresponding to the playback user interface object (e.g., 618*a*) (e.g., before the computer system detects and/or receives an indication that another computer system detected user input selecting the playback user interface object), the computer system (e.g., 100, 300, 500, 604, 606, 608, 610, and/or 800) outputs (712), via the one or more light sources, the light (e.g., 616*a*-616*ab*) having a first brightness (e.g., a brightness shown at FIG. 6C) (e.g., a first amount of lumen output and/or a first amount of wattage and/or power supplied to the one or more light sources). In response to receiving the indication of user input (e.g., 650*a*) corresponding to the playback user interface object (e.g., 618*a*) (e.g., in response to the computer system detecting and/or in response to the computer system receiving an indication that another computer system detected user input selecting the playback user interface object), the computer system (e.g., 100, 300, 500, 604, 606, 608, 610, and/or 800) outputs (714), via the one or more light sources, the light (e.g., 616*a*-616*ab*) having a second brightness (e.g., a brightness shown at FIGS. 6D and/or 6E) (e.g., a second amount of lumen output and/or a second amount of wattage and/or power supplied to the one or more light sources), greater than the first brightness (e.g., a brightness shown at FIG. 6C). Outputting the light at a first brightness prior to receiving an indication of user input corresponding to the playback user interface object and outputting the light at a second brightness in response to receiving an indication of user input corresponding to the playback user interface object provides a user with confirmation about whether the user input was received or not, thereby providing improved visual feedback.

In some embodiments, the content (e.g., 614, 618, 620, 624, 626, 630, 634, 636, 638, and/or 640) displayed on the display generation component (e.g., 602 and/or 802) includes content (e.g., 614, 618, 620, 624, 626, 630, 634, 636, 638, and/or 640) from a currently playing media file (e.g., a current and/or active movie being played back, displayed, and/or output, album art corresponding to current and/or active audio output (e.g., a song, a podcast, an audio book, and/or streamed audio), a current and/or active sporting event being played back, displayed, and/or output, and/or a current and/or active television show being played back, displayed, and/or output). In some embodiments, the currently playing media file does not include a paused and/or stopped media file that includes a static image corresponding to a portion of the media file displayed on the display generation component (e.g., 602 and/or 802). The content including a content from a currently playing media file improves an experience of a user viewing the content without needing additional user input, thereby reducing the number of inputs needed to perform an operation.

In some embodiments, at a first playback time of the currently playing media file (e.g., a first time that is within a duration of time associated with the media file and/or a first time that is measured from a starting point and/or an ending point of the media file), the computer system (e.g., 100, 300, 500, 604, 606, 608, 610, and/or 800) outputs (716), via the one or more light sources, the light (e.g., 616*a*-616*ab*) having one or more first properties (e.g., properties of light 616*g* and/or light 616*h* shown at FIG. 6D) (e.g., a first color, intensity, brightness, color temperature, contrast, hardness, and/or direction). At a second playback time (e.g., a second time that is within the duration of time associated with the media file and/or a second time that is measured from the starting point and/or the ending point of the media file), different from the first playback time, of the currently playing media file, the computer system (e.g., 100, 300, 500, 604, 606, 608, 610, and/or 800) outputs (718), via the one or more light sources, the light (e.g., 616a-616ab) having one or more second properties (e.g., properties of light 616i and/or light 616j shown at FIG. 6E) (e.g., a second color, intensity, brightness, color temperature, contrast, hardness, and/or direction), different from the one or more first properties. Outputting the light having one or more first properties at a first playback time and outputting the light having one or more second properties, different from the first properties, at a second playback time, different from the first playback time, improves an experience of a user viewing the content without needing additional user input, thereby reducing the number of inputs needed to perform an operation.

In some embodiments, the output (e.g., 622a-622j) (e.g., audio content associated with the currently playing media file) associated with the currently playing media file (e.g., an album and/or a playlist) includes audio output (e.g., 622a-622j) associated with a first song (e.g., audio 622g and/or audio 622h) (e.g., a first track and/or first portion of the album and/or playlist) and a second song (e.g., audio 622i and/or 622j) (e.g., a second track and/or second portion of the album and/or playlist), different from the first song. While outputting the audio output (e.g., 622a-622j) corresponding to the first song (e.g., audio 622g and/or 622h) and while outputting, via the one or more light sources, the light (e.g., 616a-616ab) having one or more third properties (e.g., properties of light 616s and/or light 616t shown at FIG. 6L) (e.g., a third color, intensity, brightness, color temperature, contrast, hardness, and/or direction), the computer system (e.g., 100, 300, 500, 604, 606, 608, 610, and/or 800) transitions (720) to outputting the audio output (e.g., 622a-622j) corresponding to the second song (e.g., audio 622i and/or audio 622j). Concurrently with transitioning to outputting the audio output (e.g., 622a-622j) corresponding to the second song (e.g., audio 622i and/or 622j), the computer system (e.g., 100, 300, 500, 604, 606, 608, 610, and/or 800) outputs (722), via the one or more light sources, the light (e.g., 616a-616ab) having one or more fourth properties (e.g., properties of light 616u and/or light 616v shown at FIG. 6K) (e.g., a fourth color, intensity, brightness, color temperature, contrast, hardness, and/or direction), different from the one or more third properties (e.g., properties of light 616s and/or light 616t shown at FIG. 6L).

Outputting the light having one or more fourth properties, different from the one or more third properties, concurrently with transitioning to outputting the audio output corresponding to the second song improves an experience of a user viewing the content without needing additional user input, thereby reducing the number of inputs needed to perform an operation.

In some embodiments, the computer system (e.g., 100, 300, 500, 604, 606, 608, 610, and/or 800) includes a smart speaker (e.g., 608 and/or 610) (e.g., an audio output device that is configured to be in communication with one or more external devices and/or the Internet, so that the audio output device can perform functions in addition to outputting audio (e.g., via voice commands and/or other user input)). In response to receiving, via one or more input devices (e.g., one or more audio detection devices, such as one or more microphones) in communication with the computer system (e.g., 100, 300, 500, 604, 606, 608, 610, and/or 800), a voice input (e.g., 650e) (e.g., speech (e.g., speech including one or more keyword and/or key phrases) recognized, via sound recognition, requesting the computer system to perform a predetermined operation and/or function), the computer system (e.g., 100, 300, 500, 604, 606, 608, 610, and/or 800) outputs (724), via the one or more light sources, second light (e.g., 616ab) different from the light (e.g., 616a-616ab) (e.g., the light includes one or more first properties that are different from one or more second properties of the second light, such as a different color). Outputting second light that is different from the light in response to receiving voice input allows a user to visually confirm that the computer system recognized, received, and/or detected the voice input, thereby improving visual feedback.

In some embodiments, while outputting, via the one or more light sources, the light (e.g., 616a-616ab) in accordance with the received information associated with the content (e.g., 614, 618, 620, 624, 626, 630, 634, 636, 638, and/or 640) displayed on the display generation component (e.g., 602 and/or 802) at a third brightness (e.g., a brightness of light 616u and/or light 616v shown at FIG. 6K) (e.g., a third amount of lumen output and/or a third amount of wattage and/or power supplied to the one or more light sources), the computer system (e.g., 100, 300, 500, 604, 606, 608, 610, and/or 800) receives (726) an indication (in some embodiments, an input (e.g., 650c) requesting an increase in the volume) of an increase in volume of audio (e.g., 622a-622j) associated with the output (e.g., 622a-622j). In response to receiving the indication of the increase in volume of the audio (e.g., 622a-622j) associated with the output (e.g., 622a-622j), the computer system (e.g., 100, 300, 500, 604, 606, 608, 610, and/or 800) outputs (728), via the one or more light sources, the light (e.g., 616a-616ab) in accordance with the received information associated with the content (e.g., 614, 618, 620, 624, 626, 630, 634, 636, 638, and/or 640) displayed on the display generation component (e.g., 602 and/or 802) at a fourth brightness (e.g., a brightness of light 616w and/or light 616x shown at FIG. 6L) (e.g., a fourth amount of lumen output and/or a fourth amount of wattage and/or power supplied to the one or more light sources), greater than the third brightness (e.g., a brightness of light 616u and/or light 616v shown at FIG. 6K) (e.g., when the computer system outputs the audio associated with the output at an increased volume, the computer system outputs the light at an increased brightness). Outputting the light at a fourth brightness, greater than the third brightness, in response to receiving an indication of an increase in volume of the audio associated with the output allows a user to visually confirm that the computer system increased the volume in response to receiving the user input, thereby improving visual feedback.

In some embodiments, the computer system (e.g., 100, 300, 500, 604, 606, 608, 610, and/or 800) is in communication with a second computer system (e.g., 608 and/or 610) (e.g., an electronic device; a smart device, such as a smartphone, a smartwatch, and/or a smart speaker; a mobile device; a wearable device; and/or a set of devices in communication with one another (e.g., two or more smart speakers operating independently of one another or operating together as a stereo pair)) that is of a same type (e.g., a same type of device and/or computer system, such as a smart speaker) as the computer system (e.g., 100, 300, 500, 604, 606, 608, 610, and/or 800). The computer system being in communication with a second computer system that is of the same type as the computer system improves an experience of a user viewing the content without needing additional user input, thereby reducing the number of inputs needed to perform an operation.

In some embodiments, the light (e.g., 616a-616ab) includes one or more fifth properties (e.g., properties of light 616i) (e.g., a fifth color, intensity, brightness, color temperature, contrast, hardness, and/or direction) that are different from one or more sixth properties (e.g., properties of light 616j) (e.g., a fourth color, intensity, brightness, color temperature, contrast, hardness, and/or direction) of third light (e.g., 616a-616ab) outputted by the second computer system (e.g., 608 and/or 610) (e.g., the second computer system is configured to output third light, via one or more second light sources, in accordance with the received information associated with the content displayed on the display generation component and the third light is different from the light). The lighting including one or more fifth properties that are different from one or more sixth properties of the third light outputted by the second computer system improves an experience of a user viewing the content without needing additional user input, thereby reducing the number of inputs needed to perform an operation.

In some embodiments, the light (e.g., 616a-616ab) corresponds to a first portion (e.g., 618d, 618e, 618f, 618g, 624a, and/or 624b) (e.g., a first portion of a display area of the display generation component, a first portion of a color scheme and/or arrangement of the content, and/or a first portion of an image, video, symbol, and/or icon of the content) of the received information associated with the content (e.g., 614, 618, 620, 624, 626, 630, 634, 636, 638, and/or 640) displayed on the display generation component (e.g., 602 and/or 802), and the second computer system (e.g., 608 and/or 610) is configured to output fourth light (e.g., 616a-616ab) (e.g., the second computer system causes light to be emitted via one or more second light sources that are in communication with the second computer system) that corresponds to a second portion (e.g., 618d, 618e, 618f, 618g, 624a, and/or 624b) (e.g., a second portion of a display area of the display generation component, a second portion of a color scheme and/or arrangement of the content, and/or a second portion of an image, video, symbol, and/or icon of the content) of the received information associated with the content (e.g., 614, 618, 620, 624, 626, 630, 634, 636, 638, and/or 640) displayed on the display generation component (e.g., 602 and/or 802), different from the first portion (e.g., 618d, 618e, 618f, 618g, 624a, and/or 624b). The light output by the computer system corresponding to a first portion of the received information associated with the content displayed on the display generation component and fourth light output by the second computer system corresponding to a second portion of the received information associated with the content displayed on the display generation component improves an experience of a user viewing the content without needing additional user input, thereby reducing the number of inputs needed to perform an operation.

In some embodiments, the light (e.g., 616a-616ab) includes a fifth color (e.g., a color of light 616c and/or 616e) (e.g., a fifth set of one or more light sources of the one or more light sources outputs the light having a fifth color) and a sixth color (e.g., a color of light 616d and/or 616f) (e.g., a sixth set of one or more light sources of the one or more light sources outputs the light having a sixth color), different from the fifth color (e.g., a color of light 616c and/or 616e), and the second computer system (e.g., 608 and/or 610) is configured to output fifth light (e.g., 616a-616ab) (e.g., the second computer system causes light to be emitted via one or more second light sources that are in communication with the second computer system) that includes a seventh color (e.g., a color of light 616c and/or 616e) (e.g., a seventh set of one or more light sources of the one or more light sources outputs the light having a seventh color) and an eighth color (e.g., a color of light 616d and/or 616f) (e.g., an eighth set of one or more light sources of the one or more light sources outputs the light having a eighth color), different from the seventh color (e.g., a color of light 616c and/or 616e). The light output by the computer system including a fifth color and a sixth color, different from the fifth color, and fifth light output by the second computer system including a seventh color and an eighth color, different from the seventh color, improves an experience of a user viewing the content without needing additional user input, thereby reducing the number of inputs needed to perform an operation.

In some embodiments, outputting, via the one or more light sources, the light (e.g., 616a-616ab) in accordance with the received information associated with the content (e.g., 614, 618, 620, 624, 626, 630, 634, 636, 638, and/or 640) displayed on the display generation component (e.g., 602 and/or 802) includes, in accordance with a determination that a predetermined function (e.g., displaying a settings menu and/or displaying one or more selectable options that control output of the output and/or content) is available (e.g., one or more conditions are met (e.g., an indication of one or more detected user inputs is received, an indication of a notification and/or event is received, and/or an indication of a detected external device is received) that enable the predetermined function to be performed by the computer system and/or a different computer system), the computer system (e.g., 100, 300, 500, 604, 606, 608, 610, and/or 800) outputting the light (e.g., 616a-616ab) having one or more seventh properties (e.g., properties of light 616y) (e.g., a seventh color, intensity, brightness, color temperature, contrast, hardness, and/or direction) (in some embodiments, the one or more seventh properties guide and/or prompt a user to provide a user input that causes performance of the predetermined function) (in some embodiments, the light having the one or more seventh properties is output in a direction, with a color, and/or a brightness that signals and/or provides guidance to a user that user input will cause performance of the predetermined function). Outputting, via the one or more light sources, the light (e.g., 616a-616ab) in accordance with the received information associated with the content (e.g., 614, 618, 620, 624, 626, 630, 634, 636, 638, and/or 640) displayed on the display generation component (e.g., 602 and/or 802) includes, in accordance with a determination that the predetermined function is not available (e.g., one or more conditions are not met (e.g., an indication of one or more detected user inputs is not received, an indication of a notification and/or event is not received, and/or an indication of a detected external device is not received) that enable the predetermined function to be performed by the computer system and/or a different computer system), the computer system (e.g., 100, 300, 500, 604, 606, 608, 610, and/or 800) outputting the light (e.g., 616a-616ab) having one or more eighth properties (e.g., properties of light 616x) (e.g., an eighth color, intensity, brightness, color temperature, contrast, hardness, and/or direction), different from the one or more seventh properties (e.g., properties of light 616y).

Outputting the light having the one or more seventh properties in accordance with a determination that a predetermined function is available and outputting the light having one or more eight properties, different from the one or more seventh properties, in accordance with a determination that the predetermined function is not available allows a user to quickly provide the user input to cause the third computer system to perform the predetermined function, thereby improving visual feedback.

Note that details of the processes described above with respect to method 700 (e.g., FIGS. 7A-7C) are also applicable in an analogous manner to the methods described below. For example, method 900 optionally includes one or more of the characteristics of the various methods described above with reference to method 700. For example, a computer system performing method 900 can group a computer system performing method 900 with other accessory devices. For brevity, these details are not repeated below.

FIGS. 8A-8V illustrate examples of techniques for managing controllable accessories, in accordance with some embodiments. The user interfaces in these figures are used to illustrate the processes described below, including the processes in FIGS. 9A-9D.

In some embodiments, any of the inputs described herein (e.g., input 850a, 850b, 850c, 850d, 850e, 850f, 850g, 850h, 850i, 850j, 850k, 850l, 850m, 850n, 850o, 850p, 850q, 850r, and/or 850s) is or includes a touch input (e.g., a tap gesture and/or a swipe gesture). In some embodiments, any of the inputs described herein (e.g., input 850a, 850b, 850c, 850d, 850e, 850f, 850g, 850h, 850i, 850j, 850k, 850l, 850m, 850n, 850o, 850p, 850q, 850r, and/or 850s) is or includes a voice input (e.g., a voice command to select a user interface element or to activate a feature or perform a function, such as a feature or function associated with a user interface element). In some embodiments, any of the inputs described herein (e.g., input 850a, 850b, 850c, 850d, 850e, 850f, 850g, 850h, 850i, 850j, 850k, 850l, 850m, 850n, 850o, 850p, 850q, 850r, and/or 850s) is or includes a gesture (e.g., hand gesture, facial gesture, and/or an air gesture to select a user interface element or to activate a feature or perform a function, such as a feature or function associated with a user interface element) and/or is or includes a voice command. In some embodiments, any of the inputs described herein (e.g., input 850a, 850b, 850c, 850d, 850e, 850f, 850g, 850h, 850i, 850j, 850k, 850l, 850m, 850n, 850o, 850p, 850q, 850r, and/or 850s) is or includes activation (e.g., a press, a rotation, and/or a movement) of a hardware device (e.g., a button, a rotatable input mechanism, a rotatable and depressible input mechanism, a mouse button, a button of a remote control, and/or a joystick). In some embodiments, any of the user interface elements described as being selected herein (e.g., an icon, affordance, button, and/or selectable option) is selected by activating a hardware device while the user interface element is in focus (e.g., highlighted, bolded, outlined, visually distinguished from other user interface elements, and/or located at or near a cursor).

FIG. 8A illustrates electronic device 800 displaying, via display 802, home user interface 804 associated with a home automation system. In some embodiments, the home automation system includes one or more accessory devices (e.g., devices configured to be in communication with and/or controlled by electronic device 800) that are associated with a location, such as a structure, a home, an office, and/or an apartment. At FIG. 8A, electronic device 800 is configured to adjust and/or control a state and/or settings of one or more of the accessory devices of the home automation system via home user interface 804. In some embodiments, home user interface 804 is a user interface that is first displayed by electronic device 800 in response to launching an application associated with the home automation system.

At FIG. 8A, home user interface 804 includes home indicator 804a (e.g., "123 MAIN ST.") that provides an indication of a location (e.g., a physical address) associated with the home automation system. In addition, home user interface 804 includes category region 806, camera region 808, scene region 810, and first room region 812. In some embodiments, home user interface 804 is scrollable so that one or more additional regions corresponding to respective rooms, scenes, types or categories of accessory devices, and/or designated accessory devices (e.g., favorites) of the home automation system can be displayed in response to a swipe and/or scroll gesture on home user interface 804.

In response to receiving an indication of an event, electronic device 800 is configured to display a designated region (e.g., platter) on home user interface 804 that enables electronic device 800 to group and/or associate accessory devices with one another. Displaying the designated region facilitates an ability of a user to group and/or associate accessory devices with one another by reducing the number of inputs needed to create an accessory group. For instance, by displaying the designated region on home user interface 804, electronic device 800 enables a user to group and/or associate accessory devices with one another without having to navigate to additional user interfaces to search for particular accessory devices. FIGS. 8A-8Q illustrate electronic device 800 displaying the designated region (e.g., designated region 814) in response to receiving an indication that an accessory device initiated playback of a media item. At FIGS. 8A-8Q, electronic device 800 enables accessory devices to be grouped and/or associated with one another, such that the grouped accessory devices output content associated with the media item in conjunction with one another. While FIGS. 8A-8Q relate to electronic device 800 displaying the designated region in response to receiving an indication that an accessory device initiated playback of a media item, electronic device 800 is also configured to display designated regions (e.g., designated region 842 and/or designated region 848) in response to receiving an indication and/or request to create a new scene and/or a new room of the home automation system, as set forth below with reference to FIGS. 8R-8V.

At FIG. 8A, electronic device 800 receives an indication that an accessory device of the home automation initiates (e.g., starts and/or begins) outputting and/or playing back content. In some embodiments, electronic device 800 receives the indication from the accessory device (e.g., electronic device 800 is in communication with the accessory device). In some embodiments, electronic device 800 receives the indication from a different electronic device (e.g., a server). In response to receiving the indication that the accessory device of the home automation system initiates outputting and/or playing back content, electronic device 800 displays home user interface 804, as shown at FIG. 8B.

Figure 8B:
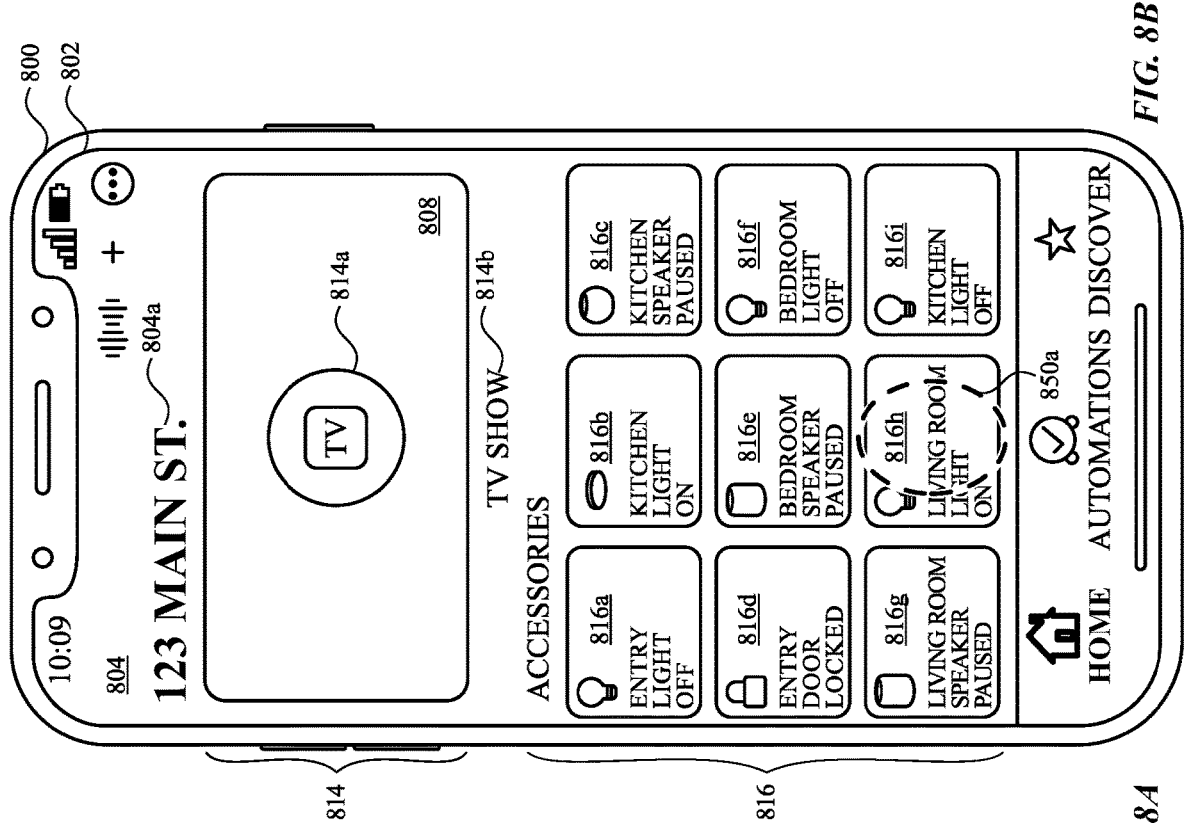
FIGS. 8A-8V illustrate exemplary user interfaces for managing controllable devices, in accordance with some embodiments.
Figure 8A:
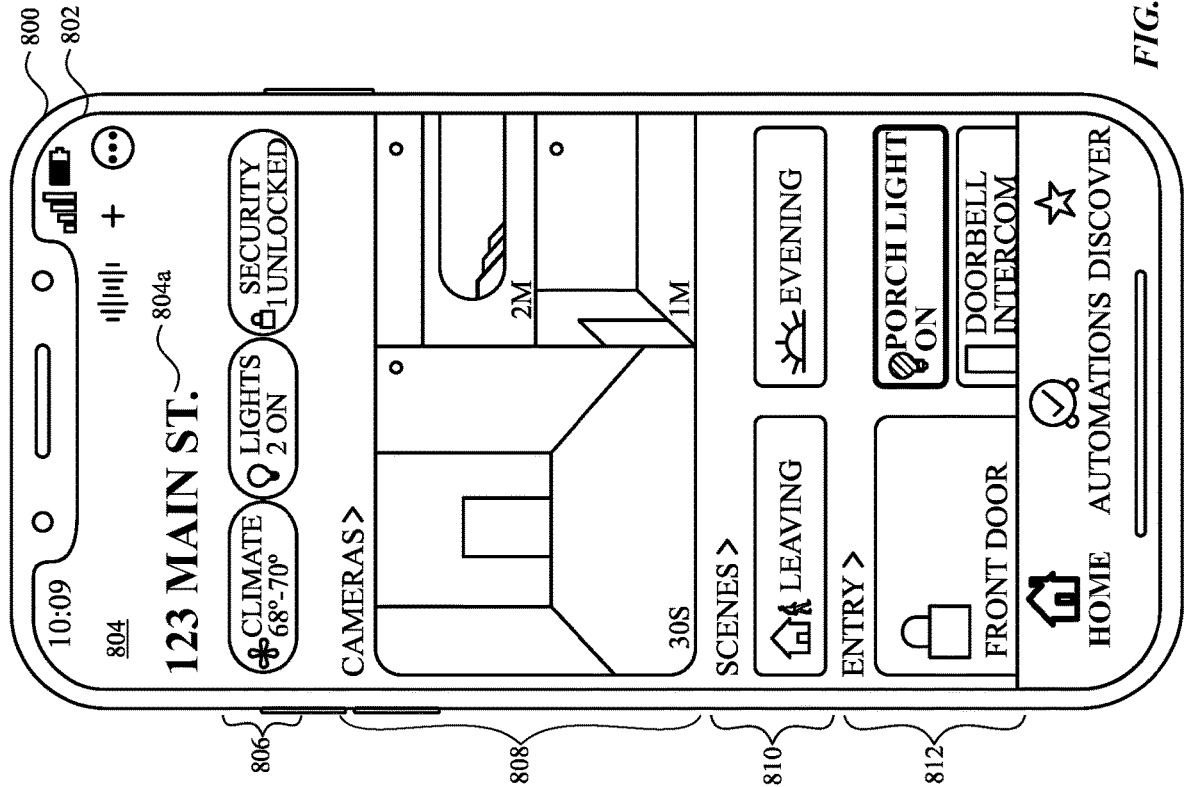

At FIG. 8B, home user interface 804 includes home indicator 804a, designated region 814 (e.g., a platter), and accessories region 816. In some embodiments, home user interface 804 is scrollable, such that electronic device 800 displays category region 806, camera region 808, scene region 810, and/or first room region 812 in response to receiving user input. In some embodiments, in response to receiving the indication that the accessory device of the home automation system initiates outputting and/or playing back content, electronic device 800 displays designated region 814 and accessories region 816 at a position above category region 806, camera region 808, scene region 810, and/or first room region 812. Thus, in some embodiments, category region 806, camera region 808, scene region 810, and/or first room region 812 are still included and/or part of home user interface 804, but are displayed at different positions and/or locations on home user interface 804, as compared to FIG. 8A. In some embodiments, electronic device 800 does not display accessories region 816 in response to receiving the indication that the accessory device initiates outputting and/or playing back content. In some embodiments, electronic device 800 displays category region 806, camera region 808, scene region 810, and/or first room region 812 below designated region 814 in response to receiving the indication that the accessory device initiates outputting and/or playing back content.

At FIG. 8B, designated region 814 includes first user interface object 814a corresponding to an accessory device of the home automation system that initiated outputting and/or playing back content. At FIG. 8B, first user interface object 814a corresponds to a television accessory device. In some embodiments, the television accessory device provides information to electronic device 800 that the television accessory device has been turned on, activated, and/or has initiated outputting content. In some embodiments, electronic device 800 displays designated region 814 including first user interface object 814a based on receiving the information from the television accessory device. Designated region 814 provides a visual indication to a user of electronic device 800 that an accessory device of the home automation system is currently outputting content. Designated region 814 includes content indicator 814b (e.g., "TV SHOW") that provides a visual indication of the content being output by the television accessory device. For instance, at FIG. 8B, content indicator 814b indicates that the television accessory device is configured to and/or is outputting a television show. In some embodiments, content indicator 814b includes information about the television show, such as an episode number, an episode name, a series name, a season number, and/or an air date of the television show. As set forth below, electronic device 800 can associate one or more additional accessory devices with the content being output by television accessory device in response to receiving one or more user inputs requesting to associate the one or more additional accessory devices with the content.

For instance, accessories region 816 of home user interface 804 includes accessory user interface objects 816a-816i corresponding to respective accessory devices of the home automation system. Electronic device 800 is configured to control and/or adjust settings of an accessory device in response to detecting user input corresponding to a respective accessory user interface object 816a-816i. As set forth below, in some embodiments, electronic device 800 can associate an accessory device corresponding to a respective accessory device user interface object 816a-816i with the content initiated by the television accessory device when the accessory device is compatible with one or more accessory devices (e.g., the television accessory device) associated with the content and displayed in designated region 814. In some embodiments, electronic device 800 determines whether an accessory device corresponding to a respective accessory user interface object 816a-816i is compatible with one or more accessory devices associated with the content based on a function of the accessory device. For instance, when the accessory device corresponding to a respective accessory user interface object 816a-816i is configured to perform a function and/or operation that is consistent with the current content being outputted and/or played back by the television accessory device, electronic device 800 can associate the accessory device with the content.

In some embodiments, when electronic device 800 associates an accessory device corresponding to a respective accessory user interface object 816-816i with the content, the additional accessory device is configured to output second content that is based on the content in which the television accessory device is currently outputting. For instance, in some embodiments, the television accessory device is outputting a video (e.g., the television show), and when electronic device 800 associates a speaker accessory device with the content being outputted by the television accessory device, the speaker accessory device outputs audio corresponding to the video.

At FIG. 8B, electronic device 800 detects user input 850a (e.g., a tap gesture, a tap gesture that includes a duration that exceeds a predefined duration, or other selection/navigation input) corresponding to selection of accessory user interface object 816h. In response to detecting user input 850a, electronic device 800 displays accessory user interface 818, as shown at FIG. 8C.

Figure 8D:
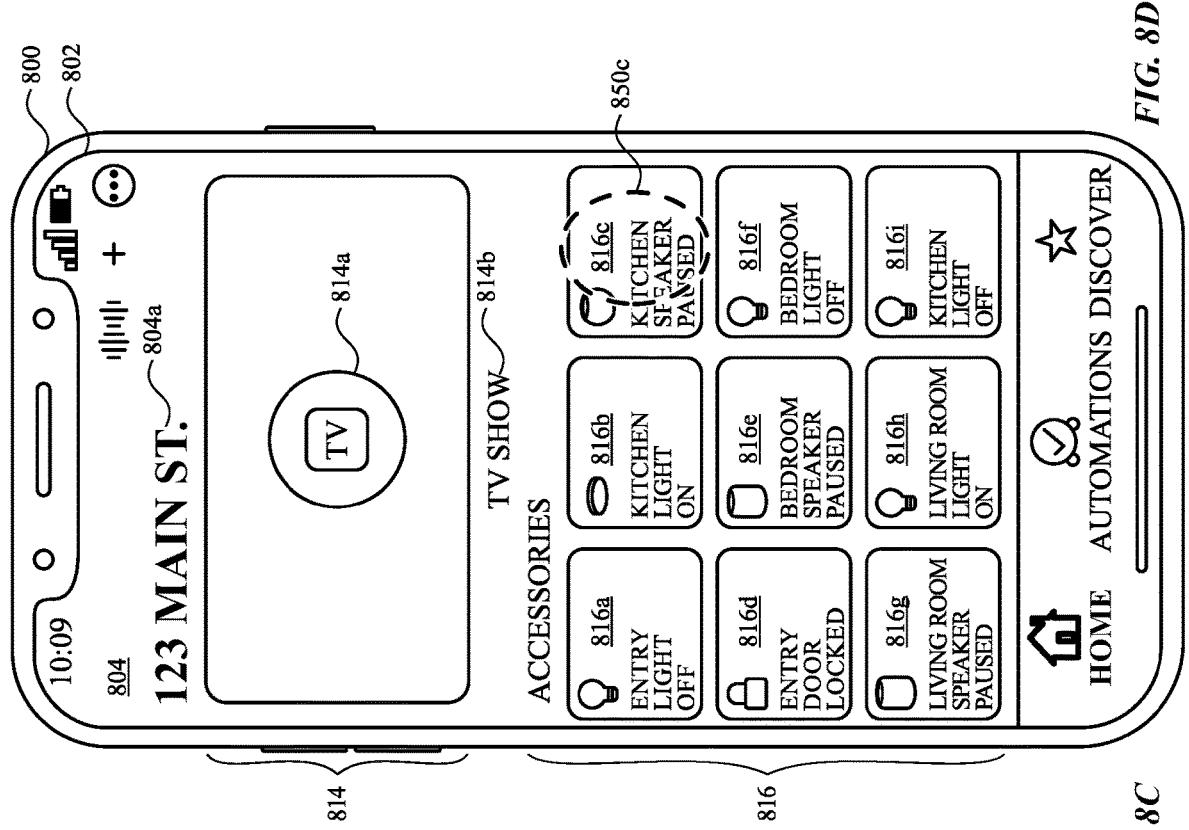
Figure 8C:
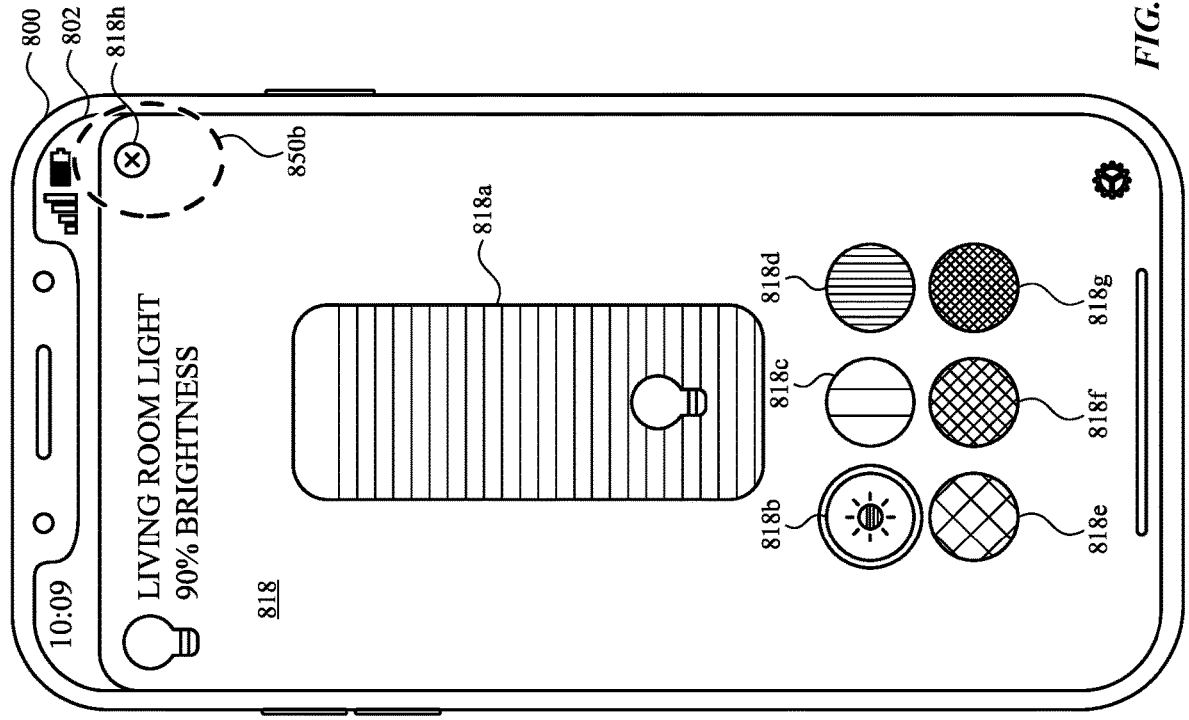
Figure 8F:
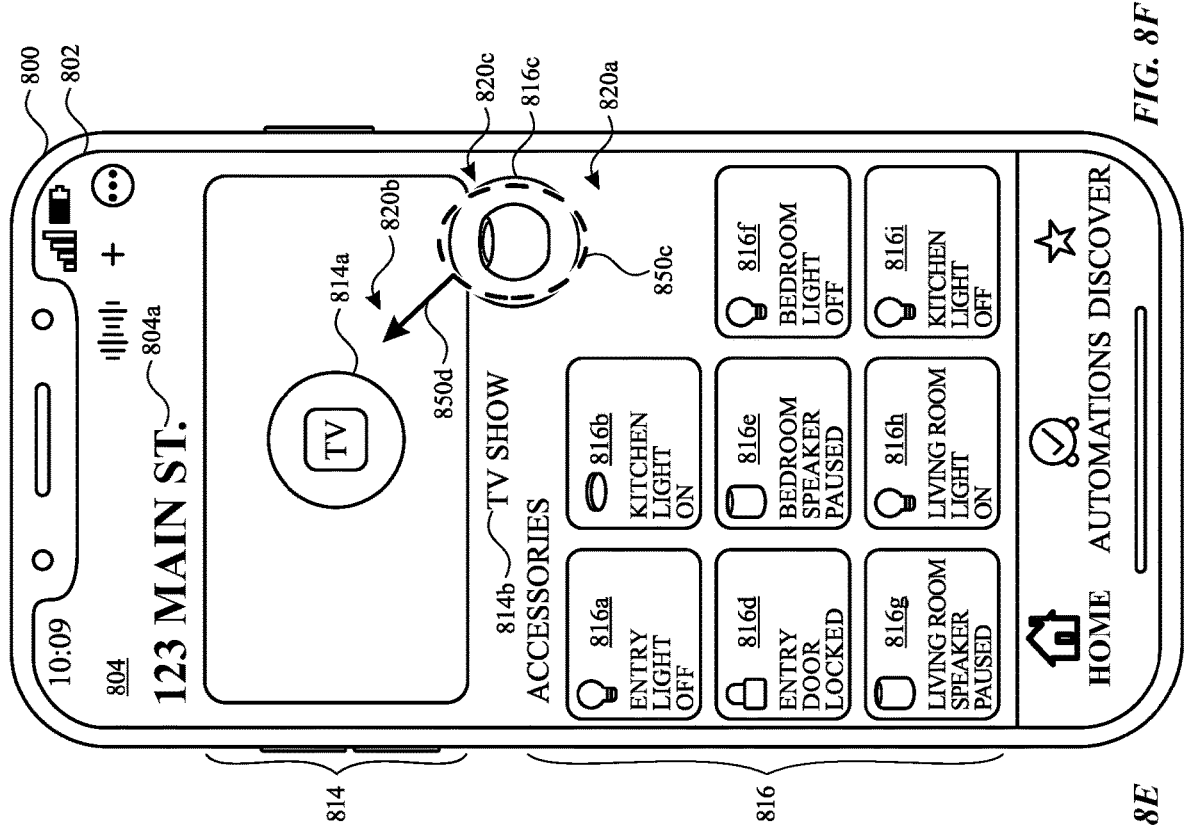

At FIG. 8C, accessory user interface 818 includes control user interface objects 818a-818g that enable electronic device 800 to adjust an operation of and/or settings of a light accessory device associated with accessory user interface object 816h. For instance, accessory user interface 818 enables control of a brightness, a color temperature, and/or an operation state (e.g., whether the light accessory device is on or off) of the light accessory device. At FIG. 8C, electronic device 800 detects user input 850b (e.g., a tap gesture or other selection/navigation input) corresponding to exit user interface object 818h of accessory user interface 818. In response to detecting user input 850b, electronic device 800 displays (e.g., re-displays) home user interface 804, as shown at FIG. 8D.

At FIG. 8D, electronic device 800 detects user input 850c (e.g., a tap and/or press gesture having a duration that exceeds a predefined duration followed by movement or another selection/navigation input) on accessory user interface object 816c requesting to associate a speaker accessory device (e.g., kitchen speaker) corresponding to accessory user interface object 816c with content being (e.g., configured to be) output and/or played back by the television accessory device. At FIG. 8D, accessory user interface object 816c includes a first appearance (e.g., a first color, font, shading, emphasis, size, and/or shape, such as a substantially square and/or block shape). As set forth below, electronic device 800 is configured to change an appearance of accessory user interface object 816c based on a determination as to whether the speaker accessory device can be associated with the content being output (e.g., configured to be output by) the television accessory device.

At FIG. 8D, electronic device 800 determines whether the speaker accessory device satisfies a set of criteria that indicates whether the speaker accessory device can be associated with content being output and/or played back by the television accessory device. For instance, as set forth above, electronic device 800 determines that the speaker accessory device can be associated with the content being output and/or played back by the television accessory device based on a function of the speaker accessory device. In some embodiments, electronic device 800 determines that the speaker accessory device includes a function, such as a primary function, that includes outputting audio. In some embodiments, electronic device 800 determines that the function of the speaker accessory device is compatible with the content being output and/or played back by the television accessory device. For instance, the speaker accessory device can output audio that is associated with the television show that is configured to be and/or is currently being output by the television accessory device.

As set forth below, in some embodiments, electronic device 800 determines that a respective accessory device associated with one of accessory user interface objects 816a-816i cannot be associated with the content being output and/or played back by the television accessory device when the respective accessory device does not satisfy the set of one or more criteria. For instance, in some embodiments, the respective accessory device does not include a function (e.g., any function) that is compatible with the content configured to be output and/or currently being output by the television accessory device. In some embodiments, electronic device 800 does not enable the respective accessory device to be associated with the content when electronic device 800 determines that the respective accessory device does not satisfy the set of one or more criteria, as set forth below with reference to FIGS. 8H and 8I.

At FIG. 8D, electronic device 800 determines that the speaker accessory device can be associated with the content being output and/or played back by the television accessory device. Based on the determination that the speaker accessory device can be associated with the content, electronic device 800 changes an appearance of accessory user interface object 816c after detecting user input 850c, as shown at FIG. 8E.

Figure 8E:
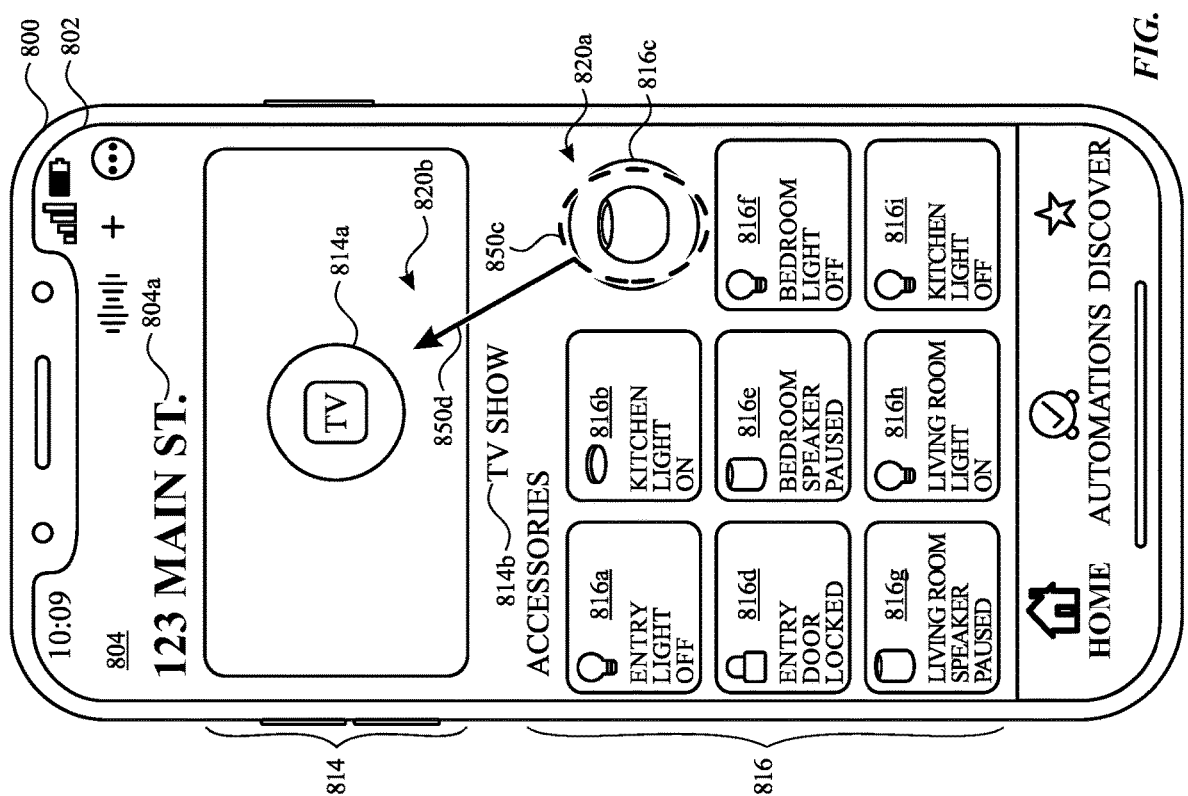
Figure 8J:
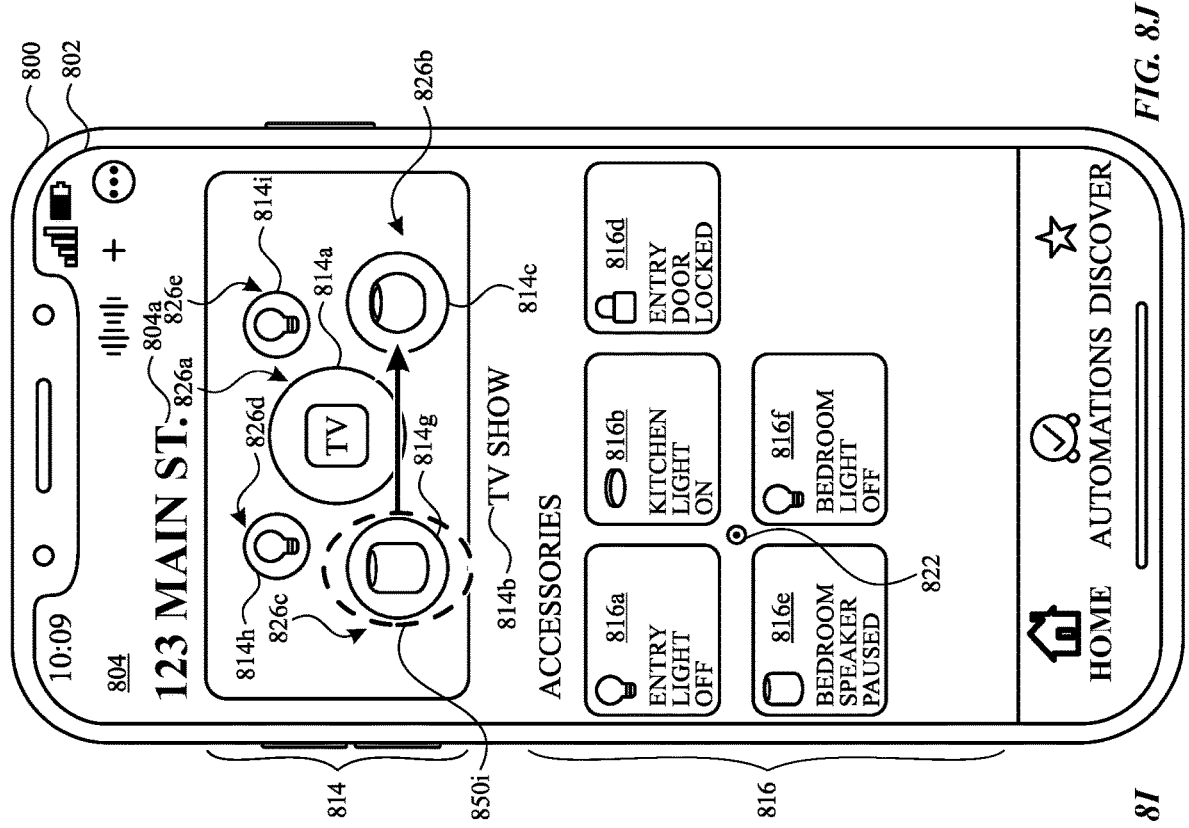

At FIG. 8E, accessory user interface object 816c includes a second appearance (e.g., a second color, font, shading, emphasis, size, and/or shape, such as a substantially circular and/or rounded shape) that is different from the first appearance. The second appearance provides a visual indication to a user of electronic device 800 that the speaker accessory device corresponding to accessory user interface object 816c can be associated with the content. At FIG. 8E, while user input 850c is maintained, electronic device 800 detects movement component 850d of user input 850c. For instance, electronic device 800 detects a request to move accessory user interface object 816c from accessories region 816 toward designated region 814. At FIG. 8E, electronic device 800 displays accessory user interface object 816c at first position 820a in accessories region 816 and in response to detecting movement component 850d of user input 850c, electronic device 800 is configured to move accessory user interface object 816c toward second position 820b in designated region 814.

At FIG. 8F, electronic device 800 displays movement of accessory user interface object 816c toward designated region 814 in response to detecting movement component 850d of user input 850c. As shown at FIG. 8F, accessory user interface object 816c is displayed at third position 820c, which is between first position 820a in accessories region 816 and second position 820b in designated region 814. Thus, electronic device 800 animates and/or moves accessory user interface object 816c in response to detecting movement component 850d of user input 850c (and in accordance with the determination that the speaker accessory device corresponding to accessory user interface object 816c is able to be associated with the content).

At FIG. 8G, electronic device 800 displays accessory user interface object 816c at second position 820b in designated region 814. In some embodiments, when electronic device 800 displays accessory user interface object 816c within designated region 814 (e.g., at second position 820b and/or another position), electronic device 800 causes the speaker accessory device corresponding to accessory user interface object 816c to output content (e.g., audio output) that is based on the content being output by the television accessory device. In other words, accessory devices that include corresponding accessory user interface objects within designated region 814 are configured to operate in conjunction with another, such that the accessory devices output content that are based on the same media file (e.g., a television show). For instance, at FIG. 8G, the television accessory device causes a display (e.g., a display different from display 802) to display one or more images associated with the television show and the speaker accessory device outputs audio output associated with the television show.

At FIG. 8G, first user interface object 814a is displayed at a first size that is larger than a second size of accessory user interface object 816c. In some embodiments, electronic device 800 displays a user interface object corresponding to a primary device at a larger size within designated region 814 as compared to non-primary devices. In some embodiments, electronic device 800 determines that the television accessory device corresponding to first user interface object 814a is the primary device because the television accessory device initiated output of the content. In some embodiments, electronic device 800 determines that the television accessory device is the primary device because the television accessory device was the first accessory device to include a corresponding user interface object in designated region 814.

At FIG. 8G, electronic device 800 displays suggestion indicators 822 next to accessory user interface objects 816e, 816g, 816h, and 816i in accessories region 816. Suggestion indicator 822 provides a visual indication that one or more accessory devices are suggested for associating with the content (e.g., the content being output by the television accessory device and the speaker accessory device at FIG. 8G). For instance, in some embodiments, electronic device 800 determines which accessory devices corresponding to accessory user interface objects 816a, 816b, and 816d-816i satisfy the set of one or more criteria that enable a respective accessory device to be associated with the content. In some embodiments, electronic device 800 determines which accessory devices can be associated with the content prior to receiving user input selecting a respective accessory user interface object. In some embodiments, electronic device 800 does not display suggestion indicator 822 next to accessory user interface objects corresponding to accessory devices that electronic device 800 determines do not satisfy the set of one or more criteria and/or cannot be associated with the content.

At FIG. 8G, electronic device 800 detects user input 850e, user input 850f, and user input 850g corresponding to accessory user interface object 816g, accessory user interface object 816h, and accessory user interface object 816i, respectively. User input 850e, user input 850f, and user input 850g each include a contact component (e.g., a tap and/or press gesture that includes a duration that exceeds a predefined duration) and a movement component. The movement component of user input 850e, user input 850f, and user input 850g includes movement from accessories region 816 toward designated region 814. As such, user input 850e includes a request to associate a second speaker accessory device (e.g., living room speaker) corresponding to accessory user interface object 816g with the content, user input 850f includes a request to associate a first light accessory device (e.g., living room light) corresponding to accessory user interface object 816h with the content, and user input 850g includes a request to associate a second light accessory device (e.g., kitchen light) corresponding to accessory user interface object 816i with the content.

As set forth above, in some embodiments, electronic device 800 determines that the second speaker accessory device, the first light accessory device, and the second light accessory device satisfy the set of one or more criteria prior to detecting user inputs 850e, 850f, and/or 850g. In some embodiments, in response to detecting user input 850e, user input 850f, and user input 850g, electronic device 800 determines that the second speaker accessory device, the first light accessory device, and the second light accessory device satisfy the set of one or more criteria and/or can be associated with the content. Based on the determination that the second speaker accessory device, the first light accessory device, and the second light accessory device satisfy the set of one or more criteria and/or can be associated with the content, electronic device 800 displays accessory user interface objects 816g-816i in designated region 814, as shown at FIG. 8H. In some embodiments, electronic device 800 displays movement of accessory user interface objects 816g-816i from accessories region 816 toward designated region 814, as set forth above with reference to FIGS. 8E-8G.

At FIG. 8H, electronic device 800 displays designated region 814 including first user interface object 814a, accessory user interface object 816c, and accessory user interface objects 816g-816i. When electronic device 800 displays accessory user interface objects 816g-816i in designated region 814, electronic device 800 causes the second speaker accessory device, the first light accessory device, and the second light accessory device to output content (e.g., audio and/or light output) that is in conjunction with content outputted by the television accessory device and/or the speaker accessory device. In some embodiments, second speaker accessory device outputs audio output that is based on audio of the television show. In some embodiments, first light accessory device and/or second light accessory device output light that includes one or more properties (e.g., one or more colors, brightness, and/or contrast) that is based on one or more visual elements of the television show displayed on a display (e.g., one or more visual elements that the television accessory device causes to be displayed on the display).

At FIG. 8H, electronic device 800 detects user input 850h (e.g., a tap and/or press gesture that includes a duration that exceeds a predefined duration or another selection/navigation input) corresponding to accessory user interface object 816d in accessories region 816. As set forth above, in some embodiments, electronic device 800 does not associate a respective accessory device with the content when electronic device 800 determines that the respective accessory device does not satisfy the set of one or more criteria. For instance, at FIG. 8H, electronic device 800 determines that a lock accessory device corresponding to accessory user interface object 816d does not satisfy the set of one or more criteria and cannot be associated with the content. In some embodiments, electronic device 800 determines that the lock accessory device does not include a function (e.g., any function) that is compatible with outputting content, such as a television show. In some embodiments, electronic device 800 determines that the lock accessory device includes a function that enables a lock of a door to change between a locked position and an unlocked position. In some embodiments, electronic device 800 determines that the lock accessory device does not include an additional function and/or determines that the lock accessory device does not include any function that enables the lock accessory device to output content that is consistent with and/or compatible with the television show.

Figure 8I:
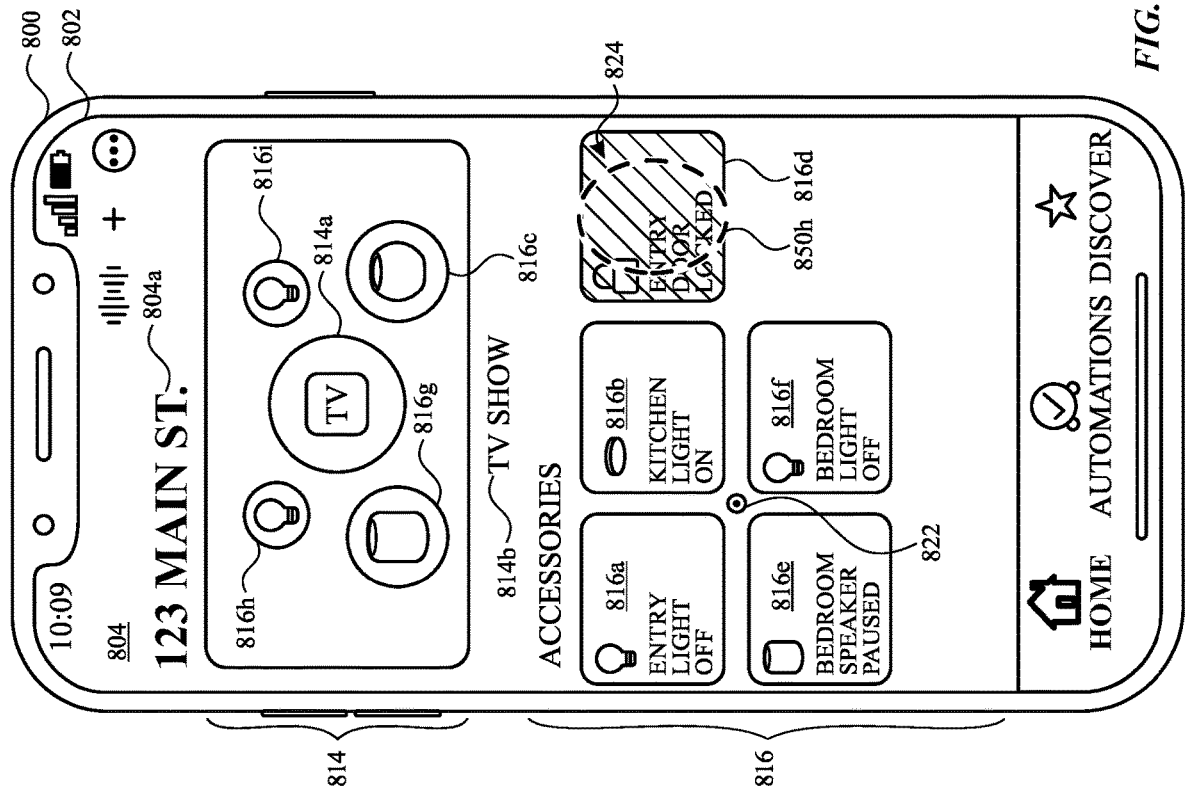
Figure 8L:
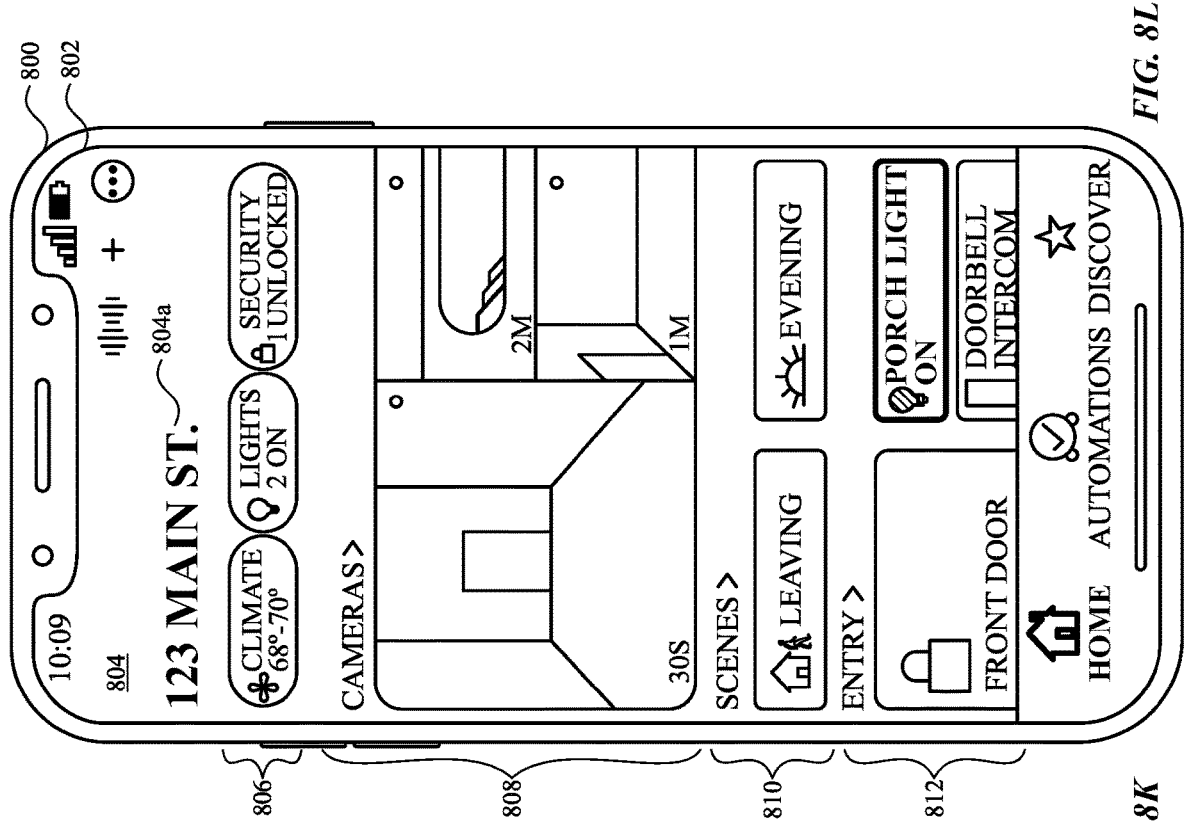

Based on the determination that the lock accessory device does not satisfy the set of one or more criteria (and after detecting user input 850h), electronic device 800 displays accessory user interface object 816d corresponding to the lock accessory device with appearance 824, as shown at FIG. 8I. At FIG. 8I, appearance 824 includes a darkened, blurred, and/or greyed out appearance indicating that the lock accessory device corresponding to accessory user interface object 816d cannot be associated with the content (and/or cannot be moved toward designated region 814). Therefore, when a user of electronic device 800 attempts to associate a non-compatible accessory device with the content, electronic device 800 provides a visual indication that the non-compatible accessory device cannot be associated with the content. As set forth below with reference to FIGS. 8T and 8V, in some embodiments, electronic device 800 can associate any accessory device with other accessory devices. In some embodiments, electronic device 800 determines whether a respective accessory device can be associated with the content using a different set of one or more criteria that is not based on a function of the respective accessory device.

Electronic device 800 is configured to arrange user interface objects within designated region 814 to provide an indication of a configuration of the corresponding accessory devices relative to one another. For instance, at FIG. 8J, electronic device 800 displays designated region 814 having first user interface object 814a at first position 826a, accessory user interface object 816c at second position 826b, accessory user interface object 816g at third position 826c, accessory user interface object 816h at fourth position 826d, and accessory user interface object 816i at fifth position 826e. As shown at FIG. 8J, accessory user interface object 816c is at second position 826b, which is to the right of first user interface object 814a, and accessory user interface object 816g is at third position 826c, which is to the left of first user interface object 814a. As set forth above, accessory user interface object 816c corresponds to the speaker accessory device and accessory user interface object 816g corresponds to the second speaker accessory device. In some embodiments, electronic device 800 causes the speaker accessory device to output a right channel of audio output corresponding to audio of the television show and causes the second speaker accessory device to output a left channel of audio output corresponding to audio of the television show. In some embodiments, electronic device 800 is configured to adjust a configuration (e.g., which of the speaker accessory devices outputs the left and right channels of audio output) of the speaker accessory device and the second speaker accessory device in response to user input.

For instance, at FIG. 8J, electronic device 800 detects user input 850i (e.g., a swipe gesture, a slide gesture, a drag gesture, or another selection/navigation input) corresponding to accessory user interface object 816g. In response to detecting user input 850i, electronic device 800 switches the respective positions of accessory user interface object 816g and accessory user interface object 816c in designated region 814, as shown at FIG. 8K.

Figure 8K:
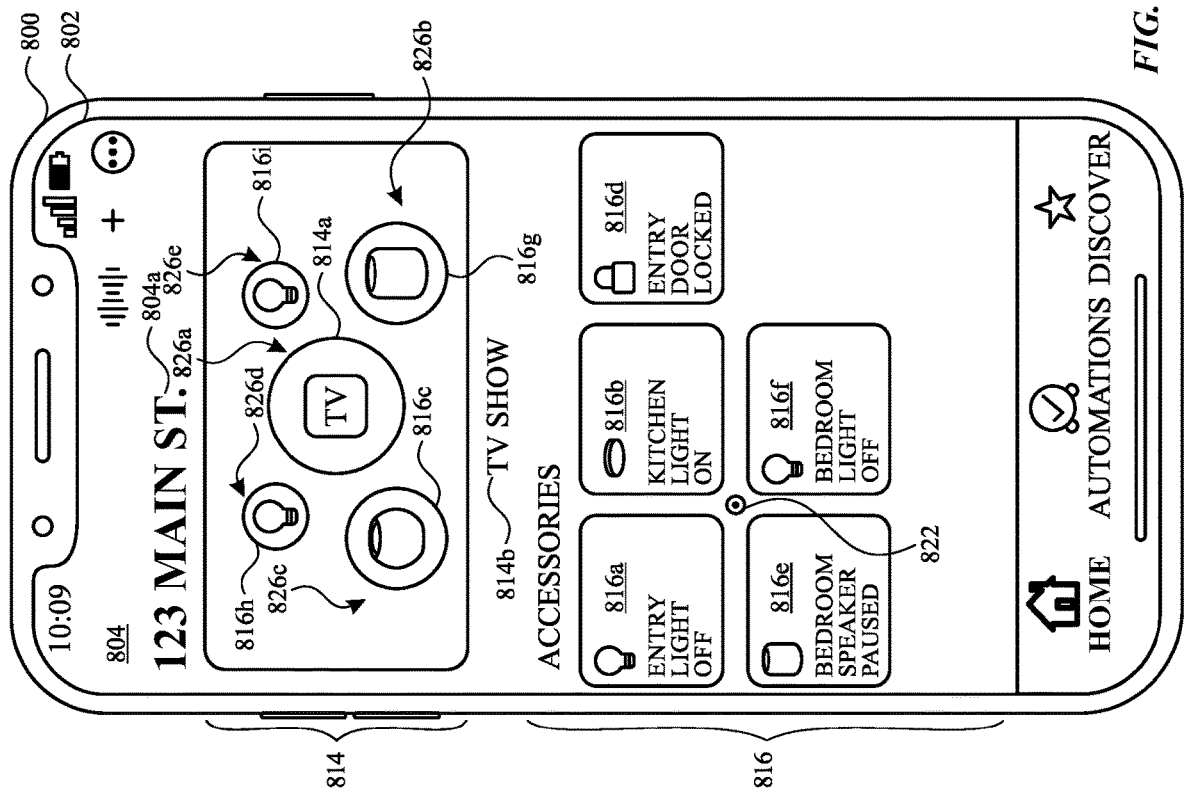

At FIG. 8K, electronic device 800 displays accessory user interface object 816c at third position 826c and accessory user interface object 816g at second position 826b within designated region 814. In some embodiments, when electronic device 800 displays accessory user interface object 816c at third position 826c, the speaker accessory device is configured to output the left channel of audio output associated with the television show. Similarly, in some embodiments, when electronic device 800 displays accessory user interface object 816g at second position 826b, the second speaker accessory device is configured to output the right channel of audio output associated with the television show. Thus, electronic device 800 can change and/or modify a configuration of the accessory devices associated with the content in response to detecting user input requesting to move the corresponding user interface objects within designated region 814. In some embodiments, electronic device 800 can cause first light accessory device and second light accessory device to output light having different properties based on the respective positions of accessory user interface object 816*h* and accessory user interface object 816*i* within designated region 814.

At FIG. 8K, electronic device 800 receives an indication that output of the content by the accessory devices that include corresponding user interface objects in designated region 614 has been stopped, paused, and/or ceased. For instance, in some embodiments, electronic device 800 receives the indication from the television accessory device. In some embodiments, electronic device 800 receives the indication from a different accessory device and/or an external device (e.g., a server). In response to receiving the indication that output of the content has stopped, paused, and/or ceased, electronic device 800 ceases display of designated region 814 and/or accessories region 816 and displays home user interface 804 as shown at FIG. 8L.

At FIG. 8L, electronic device 800 does not display designated region 814 on home user interface 804 to visually indicate that the output of content has stopped, paused, and/or ceased. Therefore, a user of electronic device 800 can quickly determine whether content is being output by one or more accessory devices of the home automation system based on whether home user interface 804 includes designated region 814. At FIG. 8L, electronic device 800 receives an indication that output of the content has resumed, initiated, and/or otherwise started. For instance, in some embodiments, electronic device 800 receives the indication from the television accessory device. In some embodiments, electronic device 800 receives the indication from a different accessory device and/or an external device (e.g., a server). In response to receiving the indication that the output of the content has resumed, initiated, and/or otherwise started, electronic device 800 displays home user interface 804 including designated region 814 and accessories region 816, as shown at FIG. 8M.

Figure 8M:
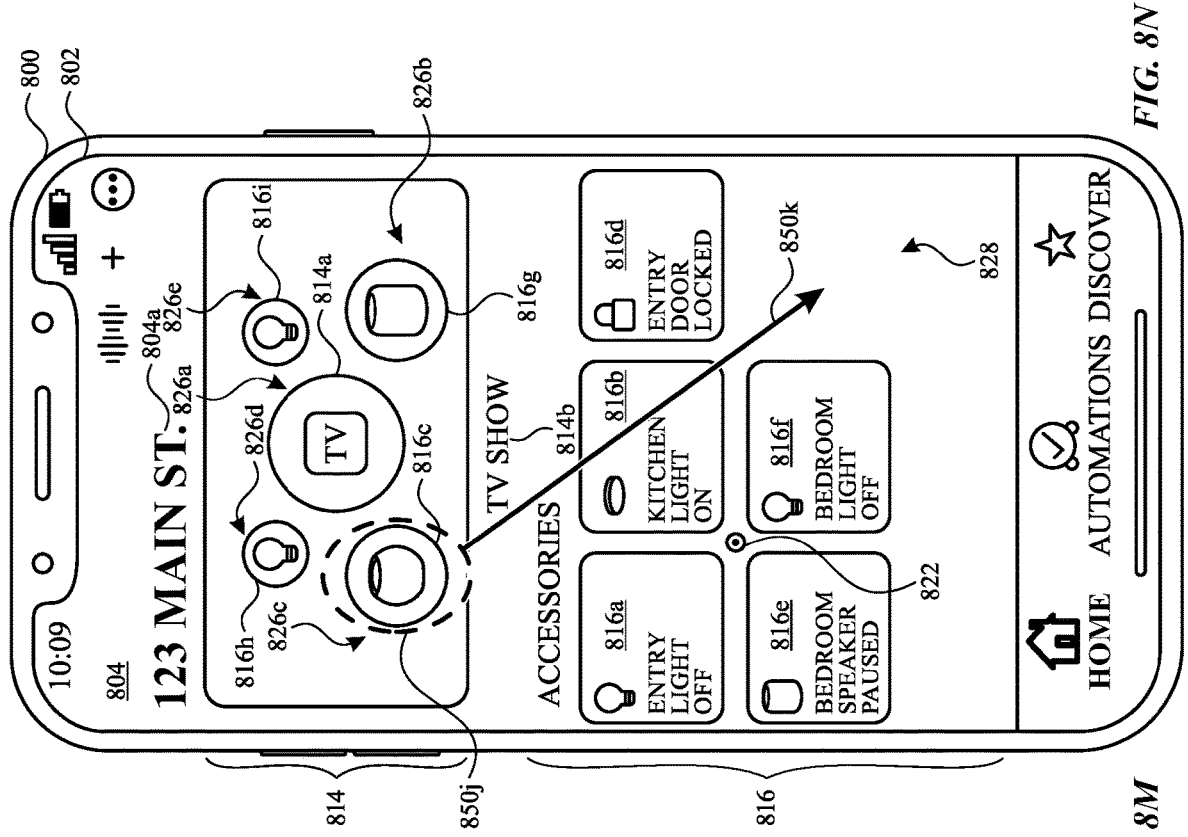

At FIG. 8M, designated region 814 includes first user interface object 814*a*, accessory user interface object 816*c*, and accessory user interface objects 816*g*-816*i*. Electronic device 800 displays first user interface object 814*a*, accessory user interface object 816*c*, and accessory user interface objects 816*g*-816*i* at the same respective positions within designated region 814 as shown at FIG. 8K. Thus, even though the content was stopped, paused, and/or ceased, electronic device 800 maintains the respective positions of first user interface object 814*a*, accessory user interface object 816*c*, and accessory user interface objects 816*g*-816*i* when electronic device 800 receives the indication that the output of the content has resumed, initiated, and/or otherwise started.

Figure 8N:
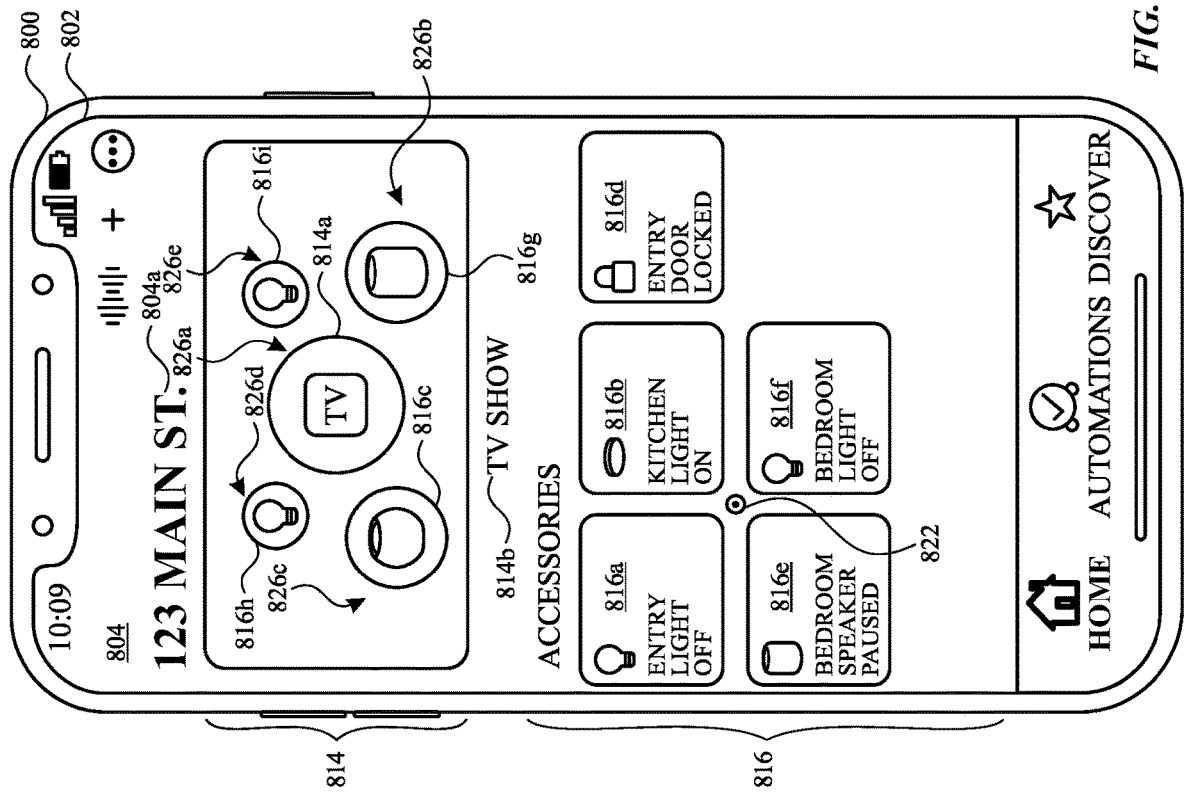

At FIG. 8N, electronic device 800 detects user input 850*j* (e.g., a tap and/or press gesture that includes a duration that exceeds a predefined duration or another selection/navigation input) corresponding to accessory user interface object 816*c* in designated region 814. User input 850*j* includes movement component 850*k* requesting to disassociate and/or remove an association of the speaker accessory device from the content. At FIG. 8N, accessory user interface object 816*c* is displayed at third position 826*c* in designated region. In response to detecting user input 850*j* including movement component 850*k*, electronic device 800 displays an animation of accessory user interface object 816*c* moving from third position 826*c* in designated region 814 toward position 828 in accessories region 816, as shown at FIG. 8O.

Figure 8O:
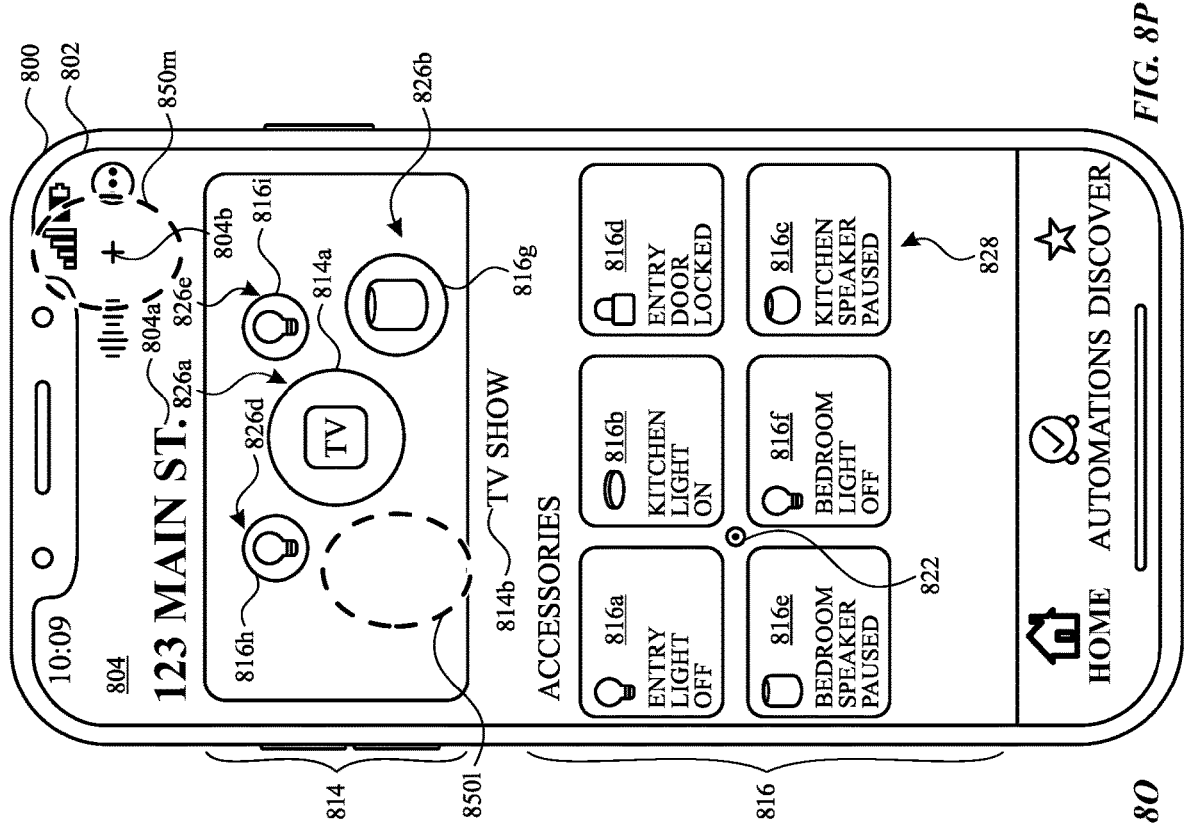

At FIG. 8O, electronic device 800 displays accessory user interface object 816*c* at position 830, which is between third position 826*c* and position 828. At FIG. 8O, while electronic device 800 continues to detect user input 850*j* including movement component 850*k*, electronic device 800 displays movement of accessory user interface object 816*c* toward position 828.

Figure 8P:
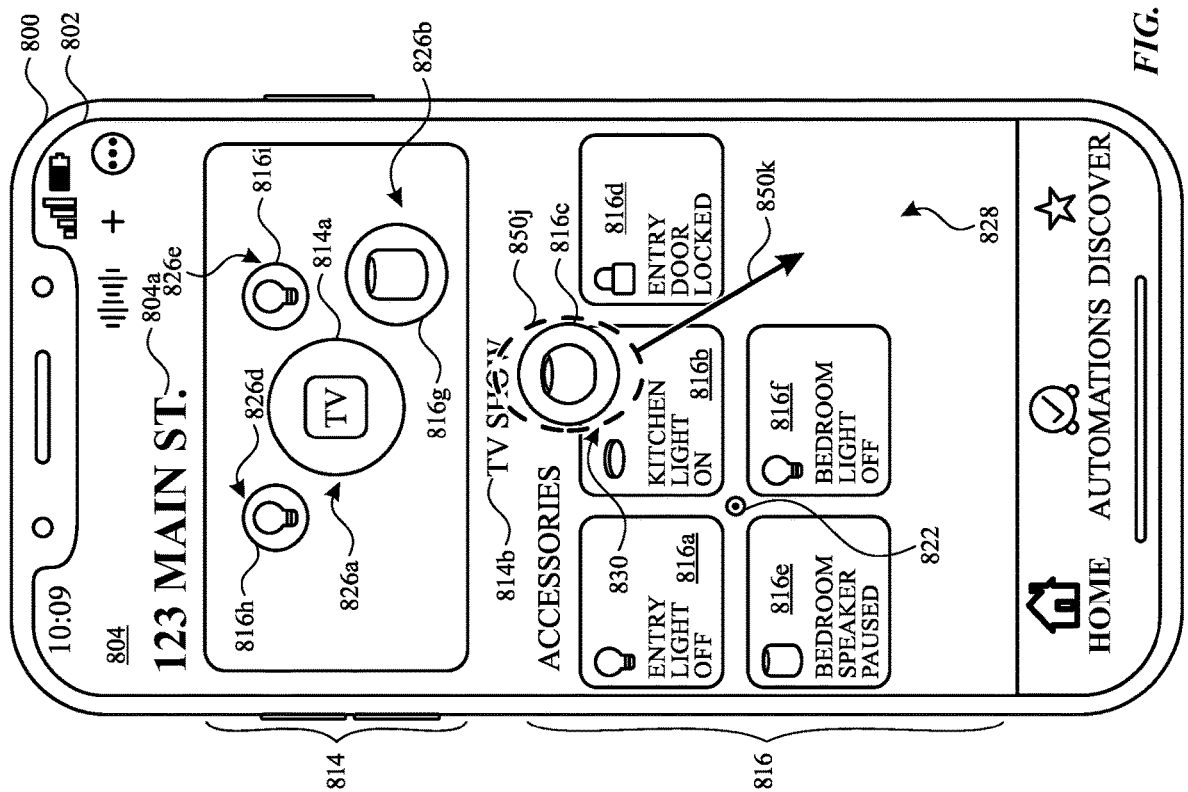

At FIG. 8P, electronic device 800 displays accessory user interface object 816*c* at position 828 in accessories region 816. When electronic device 800 displays accessory user interface object 816*c* in accessories region 816, electronic device 800 does not cause the speaker accessory device to output content (e.g., audio output) that is based on the content, such as the television show. In other words, at FIG. 8P, the speaker accessory device is no longer associated with the content, and therefore, does not output audio based on the content (e.g., audio associated with the television show). Therefore, electronic device 800 can quickly associate and/or disassociate respective accessory devices from the content via user input.

At FIG. 8P, electronic device 800 detects user input 850*l* (e.g., a tap gesture or other selection/navigation input) corresponding to designated region 814. In response to detecting user input 850*l*, electronic device 800 displays content user interface 832, as shown at FIG. 8Q. Additionally or alternatively, electronic device 800 detects user input 850*m* (e.g., a tap gesture or other selection/navigation input) corresponding to add user interface object 804*b* of home user interface 804. In response to detecting user input 850*m*, electronic device 800 displays menu 834, as shown at FIG. 8R.

At FIG. 8Q, content user interface 832 includes accessory user interface objects 832*a*-832*d* corresponding to the respective accessory devices that are associated with the content. At FIG. 8Q, electronic device 800 organizes and/or sorts accessory user interface objects 832*a*-832*d* based on a room and of the respective accessory devices. For instance, in some embodiments, the respective accessory devices are associated with (e.g., programmatically mapped to) different rooms of a location associated with the home automation system. Therefore, a user of electronic device 800 can quickly view and/or identify which accessory devices are associated with the content and/or where the accessory devices are positioned within the location.

In some embodiments, in response to detecting user input corresponding to one or more of accessory user interface objects 832*a*-832*d*, electronic device 800 displays an accessory user interface, such as a user interface similar to accessory user interface 818. The accessory user interface enables electronic device 800 to adjust and/or modify one or more settings and/or operation states of a respective accessory device. Therefore, a user can quickly access and/or control an accessory user interface for a respective accessory device that is associated with the content via content user interface 832.

At FIG. 8R, menu 834 includes selectable options 834*a*-834*f* that enable electronic device 800 to add accessory devices, scenes, automations, rooms, authorized user accounts, and/or additional home automation systems. At FIG. 8R, electronic device 800 detects user input 850*n* (e.g., a tap gesture or other selection/navigation input) corresponding to selectable option 834*b* of menu 834. In response to detecting user input 850*n*, electronic device 800 displays add scene user interface 836, as shown at FIG. 8S. Additionally or alternatively, electronic device 800 detects user input 850*o* (e.g., a tap gesture or other selection/navigation input) corresponding to selectable option 834*d* of menu 834.

Figure 8T:
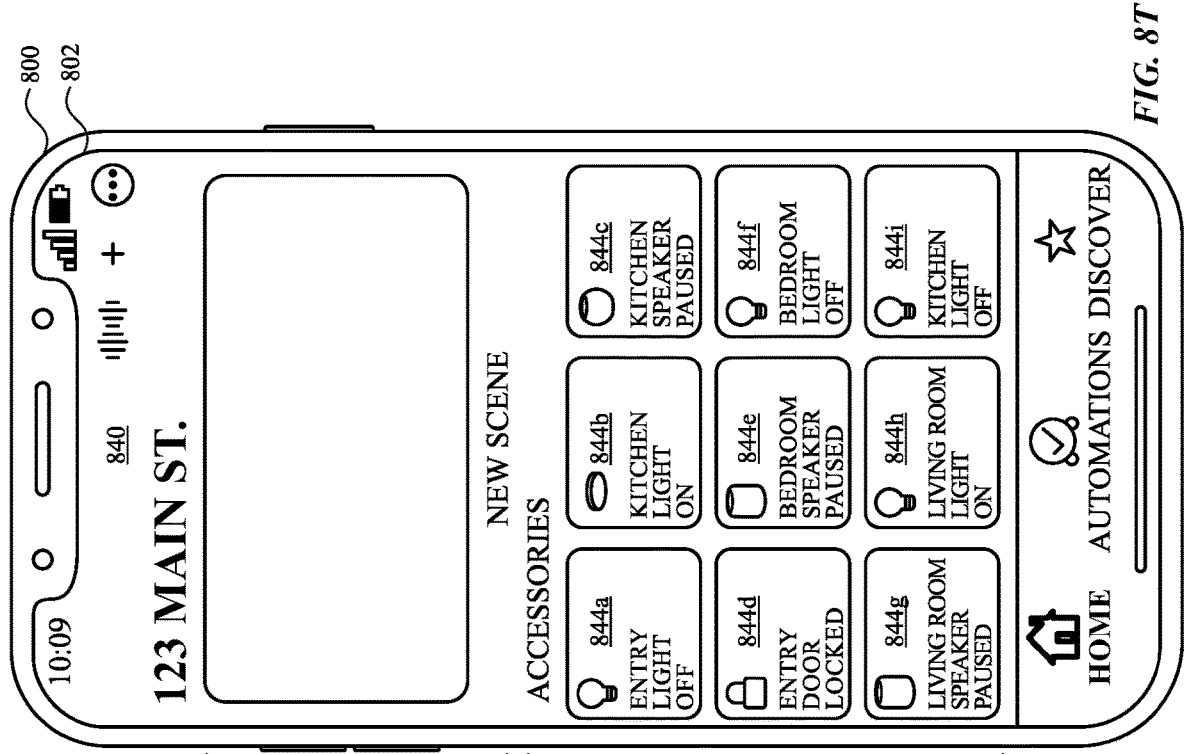
Figure 8S:
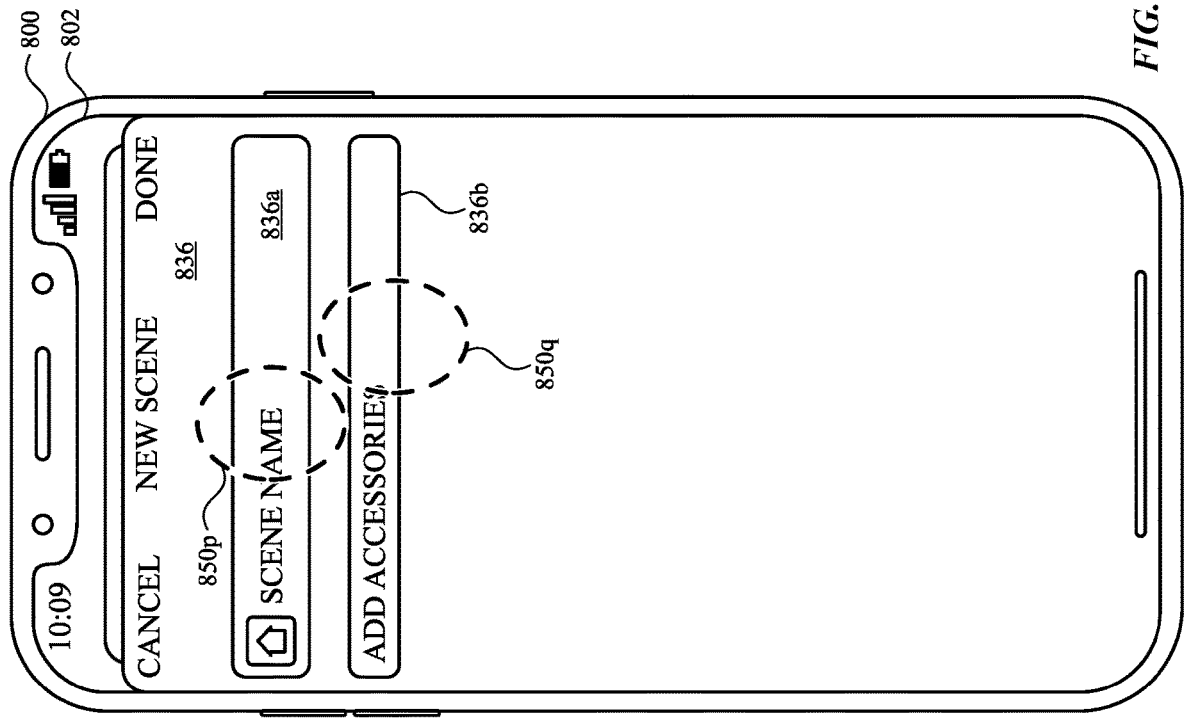
Figure 8V:
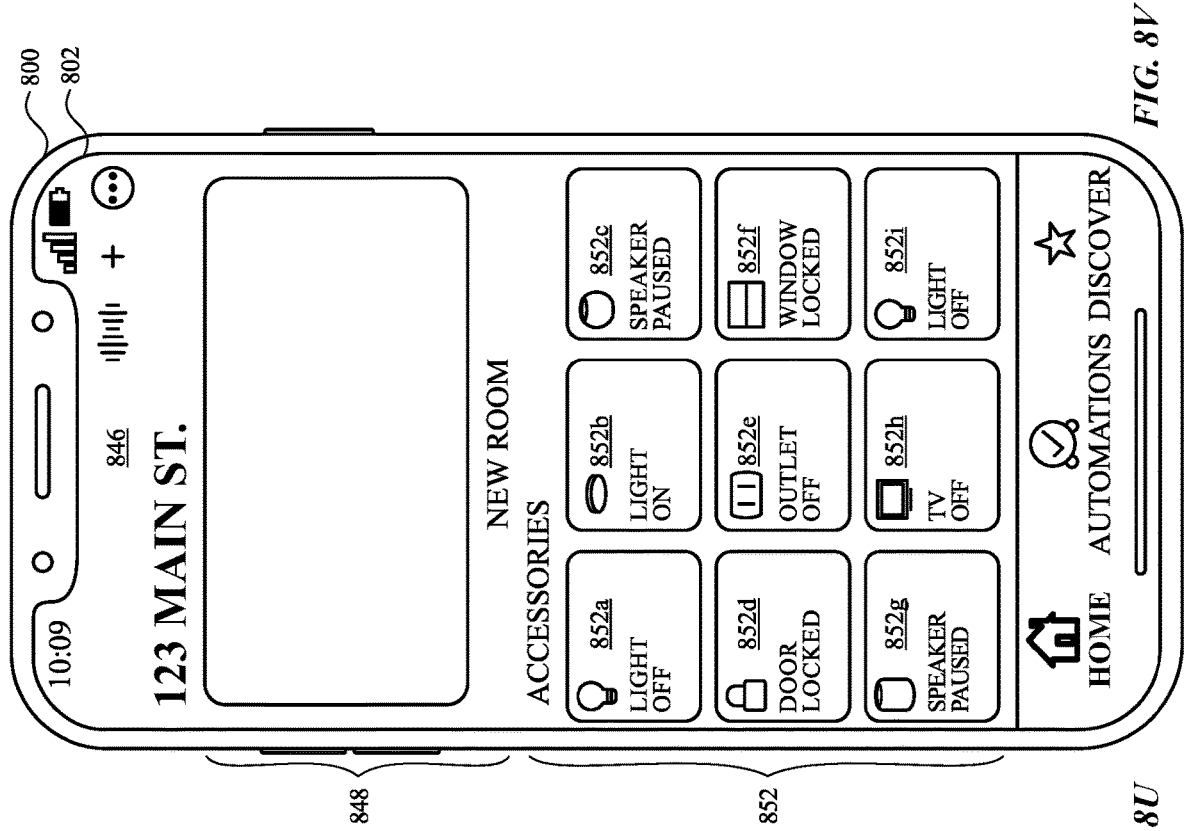
Figure 8U:
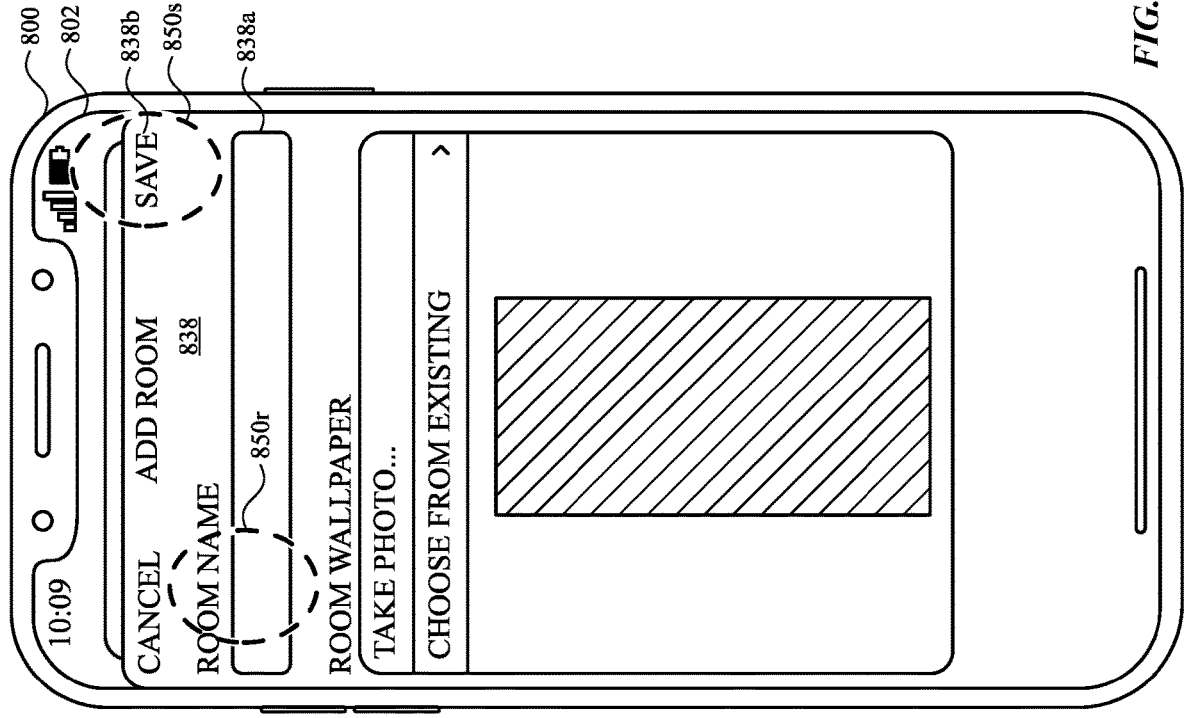
Figure 9D:
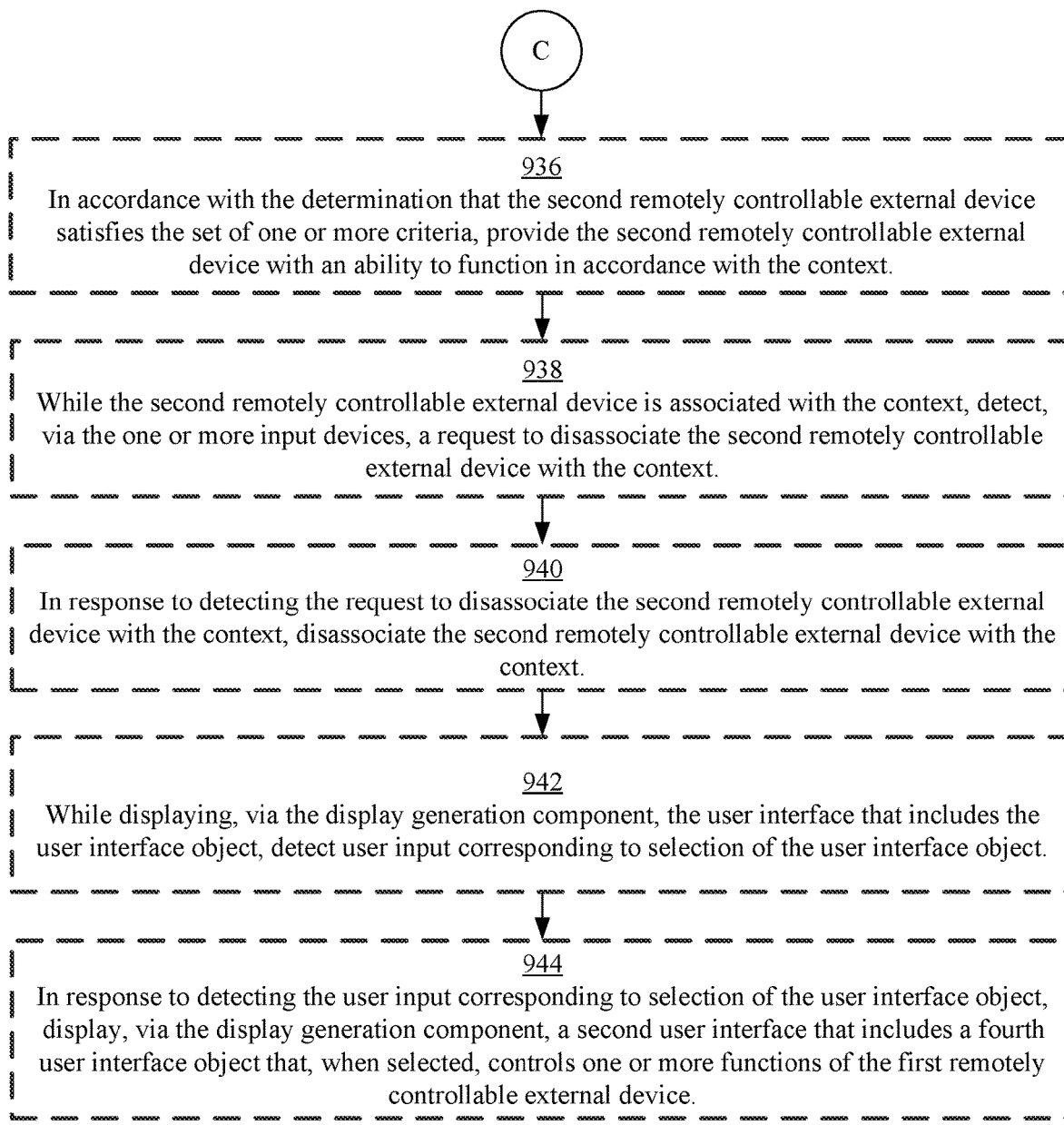

In response to detecting user input 850o, electronic device 800 displays add room user interface 838, as shown at FIG. 8U.

At FIG. 8S, add scene user interface 836 enables electronic device 800 to create a new scene for the home automation system. In some embodiments, a scene enables electronic device 800 to control and/or adjust a state of one or more accessory devices of the home automation system via user input, based on a location of electronic device 800, and/or based on a condition being satisfied (e.g., a current time of day is at a predetermined time associated with activating and/or deactivating a scene). In some embodiments, a scene is user-defined in that a user selects which accessory devices of the home automation system to include in a scene and how the selected accessory devices are controlled when the scene is activated. In some embodiments, a scene is predetermined and/or suggested by electronic device 800 based on user habits. In some embodiments, electronic device 800 controls and/or adjusts a state of multiple accessory devices of the home automation system in response to a single user input selecting a scene user interface object (e.g., user interface objects displayed in scenes region 810 of home user interface 804). Accordingly, scenes allow a user to easily control accessory devices and/or groups of accessory devices of the home automation system and reduces a number of user inputs needed to control and/or adjust the accessory devices and/or groups of accessory devices.

At FIG. 8S, add scene user interface 836 includes scene name user interface object 836a and add accessory user interface object 836b. At FIG. 8S, electronic device 800 detects user input 850p (e.g., a tap gesture or other selection/navigation input) corresponding to selection of scene name user interface object 836a. In some embodiments, in response to detecting user input 850p, electronic device 800 displays a keyboard (e.g., a virtual keyboard) that enables a user of electronic device 800 to provide and/or input a name of a new scene. In some embodiments, electronic device 800 detects one or more user inputs associated with naming the new scene. At FIG. 8S, electronic device 800 detects user input 850q (e.g., a tap gesture or other selection/navigation input) corresponding to add accessory user interface object 836b. In response to detecting user input 850q, electronic device 800 displays accessory user interface 840, as shown at FIG. 8T.

At FIG. 8T, accessory user interface 840 includes second designated region 842 and accessories region 844. Accessories region 844 includes accessory user interface objects 844a-844i corresponding to respective accessory devices of the home automation system. In some embodiments, accessory user interface 840 is scrollable, such that electronic device 800 is configured to display additional accessory user interface objects in accessories region 844 in response to detecting user input (e.g., a swipe gesture or other selection/navigation input). Second designated region 842 corresponds to accessory devices of the home automation system that are included in the new scene. At FIG. 8T, second designated region 842 is blank, and thus, no accessory devices have been added to the new scene. In some embodiments, electronic device 800 is configured to add respective accessory devices to the new scene in response to detecting user input corresponding to one or more of accessory user interface objects 844a-844i of accessories region 844.

Second designated region 842 and accessories region 844 are configured to operate and/or function similar to designated region 814 and accessories region 816 described above with reference to FIGS. 8A-8R. In some embodiments, electronic device 800 is configured to add any respective accessory device to the new scene. In some embodiments, electronic device 800 is configured to add a respective accessory device to the new scene when the respective accessory device satisfies a set of one or more second criteria. In some embodiments, the set of one or more second criteria include determining whether the respective accessory device corresponds to, is consistent with, and/or is configurable with an overall function, context, and/or theme of the new scene. For instance, in some embodiments, electronic device 800 determines that a garage door accessory device cannot be included in and/or associated with a new scene that is directed to entertainment.

At FIG. 8U, add room user interface 838 enables electronic device 800 to create a new room for the home automation system. As set forth above, in some embodiments, electronic device 800 associates (e.g., programmatically maps) respective accessory devices with rooms of a location of the home automation system. Associating accessory devices with particular rooms of the location enables a user to quickly find various accessory devices and/or to determine where a respective accessory device is positioned within the location of the home automation system.

At FIG. 8U, add room user interface 838 includes room name user interface object 838a and continue user interface object 838b. At FIG. 8U, electronic device 800 detects user input 850r (e.g., a tap gesture or other selection/navigation input) corresponding to selection of room name user interface object 838a. In some embodiments, in response to detecting user input 850r, electronic device 800 displays a keyboard (e.g., a virtual keyboard) that enables a user of electronic device 800 to provide and/or input a name of a new room. In some embodiments, electronic device 800 detects one or more user inputs associated with naming the new room. At FIG. 8U, electronic device 800 detects user input 850s (e.g., a tap gesture or other selection/navigation input) corresponding to continue user interface object 838b. In response to detecting user input 850s, electronic device 800 displays accessory user interface 846, as shown at FIG. 8V.

At FIG. 8V, accessory user interface 846 includes third designated region 848 and accessories region 852. Accessories region 852 includes accessory user interface objects 852a-852i corresponding to respective accessory devices of the home automation system. At FIG. 8V, accessory user interface objects 852a-852i correspond to respective accessory devices of the home automation system that have not yet been associated with a room of the location of the home automation system. Thus, at FIG. 8V, accessory user interface objects 852a-852i do not include room designations and/or indicators because the respective accessory devices have not been associated with a room of the location. In some embodiments, accessories region 852 includes accessory user interface objects corresponding to accessory devices that have been associated with a room of the location, thereby enabling a user of electronic device 800 to change the room designation of a respective accessory device. In some embodiments, accessory user interface 846 is scrollable, such that electronic device 800 is configured to display additional accessory user interface objects in accessories region 852 in response to detecting user input (e.g., a swipe gesture or other selection/navigation input). Third designated region 848 corresponds to accessory devices of the home automation system that are included in the new room. At FIG. 8V, third designated region 848 is blank, and thus, no accessory devices have been added to the new room. In some embodiments, electronic device 800 is configured to add respective accessory devices to the new room in response to detecting user input corresponding to one or more of accessory user interface objects 852a-852i of accessories region 852.

Third designated region 848 and accessories region 852 are configured to operate and/or function similar to designated region 814 and accessories region 816 described above with reference to FIGS. 8A-8R. In some embodiments, electronic device 800 is configured to add any respective accessory device to the new room that has not already been associated with a room of the location. In some embodiments, electronic device 800 is configured to add a respective accessory device to the new room when the respective accessory device satisfies a set of one or more third criteria. In some embodiments, the set of one or more third criteria include determining whether the respective accessory device corresponds to and/or is consistent with a description and/or room name of the new room. For instance, in some embodiments, electronic device 800 determines that a garage door accessory device cannot be included in and/or associated with a new room that is entitled and/or designated as an office.

FIGS. 9A-9D are a flow diagram illustrating a method for managing controllable devices using a computer system in accordance with some embodiments. Method 900 is performed at a computer system (e.g., 100, 300, 500, 604, 606, 608, 610, and/or 800) (e.g., an electronic device; a smart device, such as a smartphone or a smartwatch; a mobile device; and/or a wearable device) that is in communication with one or more input devices and a display generation component (e.g., 602 and/or 802) (e.g., a display controller, a touch-sensitive display system, a projector, a display screen, a display monitor, and/or a holographic display). Some operations in method 900 are, optionally, combined, the orders of some operations are, optionally, changed, and some operations are, optionally, omitted.

As described below, method 900 provides an intuitive way for managing controllable devices. The method reduces the cognitive burden on a user for managing controllable devices, thereby creating a more efficient human-machine interface. For battery-operated computing devices, enabling a user to manage controllable devices faster and more efficiently conserves power and increases the time between battery charges.

While displaying, via the display generation component (e.g., 602 and/or 802), a user interface (e.g., 804) (e.g., a user interface for a home automation system that is configured to enable control of the home automation system (e.g., one or more devices and/or accessories of the home automation system) via the computer system) that includes a user interface object (e.g., 814a) (e.g., an affordance displayed in a predefined region of the user interface) that, when selected, provides options for controlling a first remotely controllable external device (e.g., a remotely controllable external device associated with first user interface object 814a) (e.g., a first accessory of a home automation system, such as a television, a light, an outlet, and/or a speaker (e.g., a smart speaker)), wherein the first remotely controllable external device is associated with a context (e.g., currently playing content (e.g., music, a movie, a TV show, and/or media that includes an image, video, lighting data, and/or audio), recently played content, a scene (e.g., a set of defined settings for one or more remotely controllable accessories), one or more currently active (e.g., on and/or otherwise in an active state) accessories, and/or one or more recently controlled accessories), the computer system (e.g., 100, 300, 500, 604, 606, 608, 610, and/or 800) detects (902), via the one or more input devices, a request to associate a second remotely controllable external device (e.g., a remotely controllable external device associated with one of accessory user interface objects 816a-816i, 844a-844i, and/or 852a-852i) (e.g., a second accessory of the home automation system, such as a television, a light, an outlet, and/or a speaker (e.g., a smart speaker), that is different from the first remotely controllable external device) with the context (e.g., add the second remotely controllable external device to a group of devices that includes the first remotely controllable external device, such that the first remotely controllable external device and the second remotely controllable external device are configured to function based on the context and/or output content (e.g., images, video, lighting, and/or audio) that corresponds to the context (e.g., a media file, a video, a movie, a song, a television show, and/or a podcast));

In response to detecting the request to associate the second remotely controllable external device (e.g., a remotely controllable external device associated with one of accessory user interface objects 816a-816i, 844a-844i, and/or 852a-852i) with the context (904) and in accordance with a determination that the second remotely controllable external device (e.g., a remotely controllable external device associated with one of accessory user interface objects 816a-816i, 844a-844i, and/or 852a-852i) satisfies a set of one or more criteria (e.g., the second remotely controllable external device includes a function that is compatible with, consistent with, and/or configurable with the context, such that the second remotely controllable external device can function based on the context and/or perform an operation that is coordinated with (e.g., complements, enhances, and/or duplicates) operations being performed by other remotely controllable external devices that are associated with the context), the computer system (e.g., 100, 300, 500, 604, 606, 608, 610, and/or 800) associates (906) the second remotely controllable external device (e.g., a remotely controllable external device associated with one of accessory user interface objects 816a-816i, 844a-44i, and/or 852a-852i) with the context (e.g., associates a remotely controllable external device associated with accessory user interface object 816c with the context as shown at FIGS. 8D-8G) (e.g., grouping the second remotely controllable external device with the first remotely controllable external device, such that the first remotely controllable external device is configured to function based on the context and/or output first content based on the context and the second remotely controllable external device is configured to function based on the context and/or output second content that is based on the context). In some embodiments, the context includes a currently playing media file and associating the second remotely controllable external device with the context enables the second remotely controllable external device to output content (e.g., output audio, output visual elements via a display, and/or output lighting) based on the media file. In some embodiments, the second remotely controllable external device functions based on the context and/or outputs content that is based on the context after being associated with the context. In some embodiments, associating the second remotely controllable external device with the context includes displaying (e.g., updating and/or changing) the user interface to indicate (e.g., displaying a visual indication on the user interface) that the second remotely controllable external device is associated with the context.

In response to detecting the request to associate the second remotely controllable external device (e.g., a remotely controllable external device associated with one of accessory user interface objects 816a-816i, 844a-844i, and/ or 852a-852i) with the context (904) and in accordance with a determination that the second remotely controllable external device (e.g., a remotely controllable external device associated with one of accessory user interface objects 816a-816i, 844a-844i, and/or 852a-852i) does not satisfy the set of one or more criteria (e.g., the second remotely controllable external device does not include a function (e.g., a primary function) that is compatible with, consistent with, and/or configurable with the context, such that the second remotely controllable external device cannot function based on the context and/or perform an operation that complements, enhances, and/or duplicates operations being performed by other remotely controllable external devices that are associated with the context), wherein the set of one or more criteria are not met when the second remotely controllable external device (e.g., a remotely controllable external device associated with one of accessory user interface objects 816a-816i, 844a-844i, and/or 852a-852i) includes (e.g., is configured to perform) a first function (e.g., the second remotely controllable external device is configured to perform an action, an operation, and/or a task, such as display content, cause content to be displayed on a display generation component, output audio content, output light, and/or output another sensory experience) (in some embodiments, the function is a primary function of the second remotely controllable external device, such as a function that the second remotely controllable external device is primarily configured to perform) that does not correspond to (e.g., is not compatible with, is not consistent with, is not configurable with, and/or does not match) a second function of the first remotely controllable external device (e.g., a remotely controllable external device associated with one of first user interface object 814a) (e.g., the first function of the second remotely controllable external device is not compatible with, is not consistent with, and/or is not configurable with the second function of the first remotely controllable external device so that the second remotely controllable external device cannot operate in conjunction with and/or in coordination with the first remotely controllable external device (e.g., the first remotely controllable external device and the second remotely controllable external device cannot output content that is associated with the same media file)) (in some embodiments, the first function does not correspond to the second function when the first function is an action, such as locking a door, that is not related to an action of the second function, such as outputting audio and/or media content) (in some embodiments, the second remotely controllable external device is associated with the context when the second remotely controllable external device includes at least one function that corresponds to, is compatible with, is consistent, with and/or is configurable with at least one function of the first remotely controllable external device), the computer system (e.g., 100, 300, 500, 604, 606, 608, 610, and/or 800) forgoes (908) associating the second remotely controllable external device with the context (e.g., forgoes associating a remotely controllable external device associated with accessory user interface object 816d with the context as shown at FIGS. 8H and 8I) (e.g., not grouping the second remotely controllable external device with the first remotely controllable external device, such that the second remotely controllable external device does not function based on the context and/or output content that is based on the context).

Associating the second remotely controllable external device with the context when the second remotely controllable external device satisfies the set of one or more criteria and forgoing associating the second remotely controllable external device with the context when the second remotely controllable external device does not satisfy the set of one or more criteria allows a user to easily group devices that are compatible with one another without having to navigate to another user interface, thereby reducing the number of inputs needed to perform an operation.

In some embodiments, the context includes content (e.g., 614, 618, 620, 624, 626, 630, 634, 636, 638, and/or 640) (e.g., images, video, lighting, and/or audio) that is currently being outputted (e.g., the first remotely controllable external device is actively displaying an image, displaying a video, outputting light, and/or outputting audio) by the first remotely controllable external device (e.g., a remotely controllable external device associated with first user interface object 814a). The context including content that is currently being output by the first remotely controllable external device allows a user to quickly cause another remotely controllable external device to output content in coordination with the first remotely controllable external device without having to navigate to another user interface, thereby reducing the number of inputs needed to perform an operation.

In some embodiments, the user interface (e.g., 804) includes an indication (e.g., 814b) (e.g., text, a symbol, an icon, an image, and/or another visual element that provides information about the content, such as a title, a track title, an artist name, an episode number, a season number, an album title, a podcast title, and/or a playlist name) of the content that is currently being outputted by the first remotely controllable external device. The user interface including an indication of the content that is currently being output by the first remotely controllable external device allows a user to easily understand that associating the second remotely controllable device with the context causes the second remotely controllable external device to output the content in coordination with the first remotely controllable external device, thereby providing improved visual feedback.

In some embodiments, the context includes the first remotely controllable external device being associated with a location (e.g., as shown at FIGS. 8U and 8V) (e.g., the first remotely controllable external device is programmatically mapped to a location, area, and/or region (e.g., a physical location, area, and/or region)) (in some embodiments, the location is an area and/or region of a structure that is associated with an automation system (e.g., a home automation system) that is configured to be controlled by the computer system). The context including the first remotely controllable external device being associated with a location allows a user to quickly cause another remotely controllable external device to be associated with the location without having to navigate to another user interface, thereby reducing the number of inputs needed to perform an operation.

In some embodiments, the context includes the first remotely controllable external device being associated with a scene (e.g., as shown at FIGS. 8S and 8T) (e.g., a control option that enables adjustment (e.g., coordinated and/or concurrent adjustment) of multiple devices and/or accessories to a predefined state and/or operating mode). The context including the first remotely controllable external device being associated with a location allows a user to quickly cause another remotely controllable external device to be associated with the scene without having to navigate to another user interface, thereby reducing the number of inputs needed to perform an operation.

In some embodiments, the user interface (e.g., 804) includes a device region (e.g., 816, 844, and/or 852) (e.g., a region of the user interface that is separate from and/or visually distinct from a designated region that includes the user interface object). The device region (e.g., 816, 844, and/or 852) includes a first device user interface object (e.g., 816a-816i, 844a-844i, and/or 852a-852i) (e.g., a first selectable user interface object and/or affordance that enables control of and/or adjustment of settings of the third remotely controllable external device), different from the user interface object (e.g., 814a), that corresponds to a third remotely controllable external device (e.g., a remotely controllable external device associated with a respective accessory user interface object 816-816i, 844a-844i, and/or 852a-852i) (e.g., a third accessory of the home automation system, such as a television, a light, an outlet, and/or a speaker (e.g., a smart speaker), that is different from the first remotely controllable external device) of an automation system (e.g., a home automation system that includes one or more remotely controllable external devices that are configured to be controlled by the computer system) that includes the first remotely controllable external device. The device region (e.g., 816, 844, and/or 852) includes a second device user interface object (e.g., 816a-816i, 844a-844i, and/or 852a-852i) (e.g., a second selectable user interface object and/or affordance that enables control of and/or adjustment of settings of the fourth remotely controllable external device), different from the user interface object (e.g., 814a), that corresponds to a fourth remotely controllable external device (e.g., a remotely controllable external device associated with a respective accessory user interface object 816a-816i, 844a-844i, and/or 852a-852i) (e.g., a fourth accessory of the home automation system, such as a television, a light, an outlet, and/or a speaker (e.g., a smart speaker), that is different from the first remotely controllable external device) of the automation system that includes the first remotely controllable external device.

The user interface including a device region having a first device user interface object and a second device user interface object allows a user to easily select and/or choose which remotely controllable external devices to associate with the context without having to navigate to another user interface, thereby reducing the number of inputs needed to perform an operation.

In some embodiments, in response to detecting a request (e.g., 850c, 850d, 850e, 850f, 850g, and/or 850h) to associate the third remotely controllable external device (e.g., a remotely controllable external device associated with a respective accessory user interface object 816a-816i, 844a-844i, and/or 852a-852i) with the context (910) (e.g., add the third remotely controllable external device to a group of devices that includes the first remotely controllable external device, such that the first remotely controllable external device and the third remotely controllable external device are configured to function based on the context and/or output content (e.g., images, video, lighting, and/or audio) that corresponds to the context (e.g., a media file, a video, a movie, a song, a television show, and/or a podcast)) and in accordance with a determination that the third remotely controllable external device (e.g., a remotely controllable external device associated with a respective accessory user interface object 816a-816i, 844a-844i, and/or 852a-852i) satisfies the set of one or more criteria (e.g., the third remotely controllable external device includes a function that is compatible with, consistent with, and/or configurable with the context, such that the third remotely controllable external device can function based on the context and/or perform an operation that is coordinated with (e.g., complements, enhances, and/or duplicates) operations being performed by other remotely controllable external devices that are associated with the context), the computer system (e.g., 100, 300, 500, 604, 606, 608, 610, and/or 800) associates (912) the third remotely controllable external device (e.g., a remotely controllable external device associated with a respective accessory user interface object 816a-816i, 844a-844i, and/or 852a-852i) with the context (e.g., grouping the third remotely controllable external device with the first remotely controllable external device, such that the first remotely controllable external device is configured to function based on the context and/or output first content based on the context and the third remotely controllable external device is configured to function based on the context and/or output second content that is based on the context).

Associating the third remotely controllable external device with the context in response to detecting a request to associate the third remotely controllable external device with the context and in accordance with a determination that the third remotely controllable external device satisfies the set of one or more criteria allows a user to easily select and/or choose which remotely controllable external devices to associate with the context without having to navigate to another user interface, thereby reducing the number of inputs needed to perform an operation.

In some embodiments, the device region (e.g., 816, 844, and/or 852) includes, in accordance with a determination that the context is a first context, a first suggested device user interface object (e.g., 816a-816i, 844a-844i, and/or 852a-852i) (e.g., a selectable user interface object and/or affordance that enables control of and/or adjustment of settings of the fifth remotely controllable external device) corresponding to a fifth remotely controllable external device (e.g., a remotely controllable external device associated with a respective accessory user interface object 816a-816i, 844a-844i, and/or 852a-852i) (e.g., a fifth accessory of the home automation system, such as a television, a light, an outlet, and/or a speaker (e.g., a smart speaker), that is different from the first remotely controllable external device) for associating with the first context (e.g., the first suggested device user interface object includes an appearance and/or is displayed at a position that indicates to a user of the computer system that the fifth remotely controllable external device associated with the first suggested device user interface object satisfies the set of one or more criteria and/or is otherwise able to be associated with the first context). The device region (e.g., 816, 844, and/or 852) includes, in accordance with a determination that the context is a second context, different from the first context, a second suggested device user interface object (e.g., 816a-816i, 844a-844i, and/or 852a-852i) (e.g., a selectable user interface object and/or affordance that enables control of and/or adjustment of settings of the sixth remotely controllable external device) corresponding to a sixth remotely controllable external device (e.g., a remotely controllable external device associated with a respective accessory user interface object 816a-816i, 844a-844i, and/or 852a-852i) (e.g., a sixth accessory of the home automation system, such as a television, a light, an outlet, and/or a speaker (e.g., a smart speaker), that is different from the first remotely controllable external device), different from the fifth remotely controllable external device (e.g., a remotely controllable external device associated with a respective accessory user interface object 816a-816i, 844a-844i, and/or 852a-852i), for associating with the second context (e.g., the second suggested device user interface object includes an appearance and/or is displayed at a position that indicates to a user of the computer system that the sixth remotely controllable external device associated with the second suggested device user interface object satisfies the set of one or more criteria and/or is otherwise able to be associated with the second context).

The device region including a first suggested device user interface object in accordance with a determination that the context is a first context and the device region including a second suggested device user interface object in accordance with a determination that the context is a second context, different from the first context, allows a user to easily understand that the fifth remotely controllable external device can be associated with the context, thereby providing improved visual feedback.

In some embodiments, the first suggested device user interface object (e.g., 816a-816i, 844a-844i, and/or 852a-852i) includes a suggestion indicator (e.g., 822) (e.g., text, a symbol, an icon, and/or an image, such as a dot positioned next to and/or within the suggested device user interface object). In some embodiments, the device region (e.g., 816, 844, and/or 852) includes a device user interface object (e.g., 816a-816i, 844a-844i, and/or 852a-852i) that does not include a suggestion indicator (e.g., 822) when a remotely controllable external device corresponding to the device user interface object (e.g., 816a-816i, 844a-844i, and/or 852a-852i) is not a suggested device for associating with the context. Including a suggestion indicator with the first suggested device user interface object allows a user to easily understand that the fifth remotely controllable external device can be associated with the context, thereby providing improved visual feedback.

In some embodiments, the device region (e.g., 816, 844, and/or 852) includes a third device user interface object (e.g., 816a-816i, 844a-844i, and/or 852a-852i) (e.g., a selectable user interface object and/or affordance that enables control of and/or adjustment of settings of the second remotely controllable external device) corresponding to the second remotely controllable external device (e.g., a remotely controllable external device associated with a respective accessory user interface object 816a-816i, 844a-844i, and/or 852a-852i), and the request (e.g., 850c, 850d, 850e, 850f, 850g, and/or 850h) to associate the second remotely controllable external device (e.g., a remotely controllable external device associated with a respective accessory user interface object 816a-816i, 844a-844i, and/or 852a-852i) with the context includes user input (e.g., 850c, 850d, 850e, 850f, 850g, and/or 850h) (e.g., user input including a sustained contact component and a movement component of the sustained contact (e.g., movement of the sustained contact toward a designated region of the user interface that includes the user interface object), a swipe gesture, and/or a slide gesture) corresponding to selection of the third device user interface object (e.g., 816a-816i, 844a-844i, and/or 852a-852i). The request to associate the second remotely controllable external device with the context including user input corresponding to selection of the third device user interface object allows a user to request to associate the second remotely controllable external device with the context without having to navigate to another user interface, thereby reducing the number of inputs needed to perform an operation.

In some embodiments, the user input (e.g., 850c, 850d, 850e, 850f, 850g, and/or 850h) corresponding to selection of the third device user interface object (e.g., 816a-816i, 844a-844i, and/or 852a-852i) includes a sustained contact component (e.g., 850c) (e.g., a tap gesture, a touch gesture, and/or a press gesture that is detected and/or held for at least a predetermined amount of time (e.g., one second, two seconds, three seconds, or five seconds)) and a movement component (e.g., 850d) (e.g., movement of the sustained contact component), where the movement component (e.g., 850) includes movement (e.g., detected movement from a first position and/or location on the display generation component toward a second position and/or location on the display generation component) from the device region (e.g., 816, 844, and/or 852) toward a designated region (e.g., 814, 842, and/or 848) (e.g., a region of the user interface that is separate from (e.g., does not overlap with) and/or visually distinct from the device region) of the user interface (e.g., 804) that includes the user interface object (e.g., 814a) (e.g., the user interface object is displayed in the designated region of the user interface). The user input corresponding to the third device user interface object including a sustained contact component and a movement component allows a user to request to associate the second remotely controllable external device with the context without having to navigate to another user interface, thereby reducing the number of inputs needed to perform an operation.

In some embodiments, in accordance with the determination that the second remotely controllable external device (e.g., a remotely controllable external device associated with a respective accessory user interface object 816a-816i, 844a-844i, and/or 852a-852i) satisfies the set of one or more criteria, the computer system (e.g., 100, 300, 500, 604, 606, 608, 610, and/or 800) displays (914), via the display generation component (e.g., 602 and/or 802), an animation (e.g., displaying movement and/or changes in an appearance of the third device user interface object over time) of the third device user interface object (e.g., 816a-816i, 844a-844i, and/or 852a-852i) moving from the device region (e.g., 816, 844, and/or 852) toward a designated region (e.g., 814, 842, and/or 848) (e.g., a region of the user interface that is separate from (e.g., does not overlap with) and/or visually distinct from the device region) of the user interface (e.g., 804) that includes the user interface object (e.g., 814a) (e.g., the user interface object is displayed in the designated region of the user interface). Displaying an animation of the third device user interface object moving from the device region toward a designated region of the user interface that includes the user interface object provides visual confirmation to a user of the computer system that the second remotely controllable external device can be associated with the context, thereby providing improved visual feedback.

In some embodiments, in accordance with the determination that the second remotely controllable external device (e.g., a remotely controllable external device associated with a respective accessory user interface object 816a-816i, 844a-844i, and/or 852a-852i) satisfies the set of one or more criteria (916), the computer system (e.g., 100, 300, 500, 604, 606, 608, 610, and/or 800) forgoes (918) display (e.g., no longer displaying, ceasing to display, and/or not displaying) of the third device user interface object (e.g., 816a-816i, 844a-844i, and/or 852a-852i) in the device region (e.g., 816, 844, and/or 852) (e.g., the third device user interface object is not displayed in the device region). In accordance with the determination that the second remotely controllable external device (e.g., a remotely controllable external device associated with a respective accessory user interface object 816a-816i, 844a-844i, and/or 852a-852i) satisfies the set of one or more criteria (916), the computer system (e.g., 100, 300, 500, 604, 606, 608, 610, and/or 800) displays (920), via the display generation component (e.g., 602 and/or 802), a second user interface object (e.g., 816a-816i, 844a-844i, and/or 852a-852i) (e.g., a selectable user interface object and/or affordance) in a second designated region (e.g., 814, 842, and/or 848) (e.g., a region of the user interface that is separate from (e.g., does not overlap with) and/or visually distinct from the device region) of the user interface (e.g., 804) that includes the user interface object (e.g., 814*a*) (e.g., the user interface object is displayed in the designated region of the user interface), where the second user interface object (e.g., 816*a*-816*i*, 844*a*-844*i*, and/or 852*a*-852*i*) corresponds to the second remotely controllable external device (e.g., a remotely controllable external device associated with a respective accessory user interface object 816*a*-816*i*, 844*a*-844*i*, and/or 852*a*-852*i*) (e.g., the second user interface object provides visual confirmation that the second remotely controllable external device has been associated with the context). Displaying a second user interface object in a second designated region of the user interface that includes the user interface object provides visual confirmation to a user of the computer system that the second remotely controllable external device is associated with the context, thereby providing improved visual feedback.

In some embodiments, the device region (e.g., 816, 844, and/or 852) and the second designated region (e.g., 814, 842, and/or 848) of the user interface (e.g., 804) do not overlap with one another (e.g., the device region and the designated region are visually distinct regions, portions, and/or sections of the user interface). The device region and the designated region of the user interface not overlapping with one another allows a user to easily distinguish which devices are associated with the context and which devices are not associated with the context, thereby providing improved visual feedback.

In some embodiments, in accordance with the determination that the second remotely controllable external device (e.g., a remotely controllable external device associated with a respective accessory user interface object 816*a*-816*i*, 844*a*-844*i*, and/or 852*a*-852*i*) does not satisfy the set of one or more criteria, the computer system (e.g., 100, 300, 500, 604, 606, 608, 610, and/or 800) displays (922), via the display generation component (e.g., 602 and/or 802), an animation (e.g., an animation changing an appearance of accessory user interface object 816*d* to appearance 824 as shown at FIGS. 8H and 8I) (e.g., displaying movement and/or a change in appearance over time of the third device user interface object, such as darkening, shaking, blurring, and/or jiggling the third device user interface object over time) of the third device user interface object (e.g., 816*a*-816*i*, 844*a*-844*i*, and/or 852*a*-852*i*) indicating that the second remotely controllable external device (e.g., a remotely controllable external device associated with a respective accessory user interface object 816*a*-816*i*, 844*a*-844*i*, and/or 852*a*-852*i*) does not satisfy the set of one or more criteria (ISE, that the second remotely controllable external device is not configured to be associated with the context) (e.g., the animation visually indicates that the second remotely controllable external device is not compatible with and/or does not correspond to the context and/or the animation visually indicates that the third device user interface object cannot be moved from the device region toward a designated region of the user interface that includes the user interface object). In some embodiments, the computer system does not display movement of the third device user interface object in response to detecting user input corresponding to the third device user interface object to further indicate that the second remotely controllable external device is not configured to be associated with the context when the second remotely controllable external device does not satisfy the set of one or more criteria.

Displaying the animation of the third device user interface object indicating that the second remotely controllable external device is not configured to be associated with the context in accordance with the determination that the second remotely controllable external device does not satisfy the set of one or more criteria allows a user to quickly understand that the second remotely controllable external device cannot be associated with the context, thereby providing improved visual feedback.

In some embodiments, the set of one or more criteria includes a first criterion that is met when the second remotely controllable external device (e.g., a remotely controllable external device associated with a respective accessory user interface object 816*a*-816*i*, 844*a*-844*i*, and/or 852*a*-852*i*) includes a primary function (e.g., an action, an operation, and/or a task that the second remotely controllable external device is primarily configured to perform, such as display content, cause content to be displayed on a display generation component, output audio content, output light, and/or output another sensory experience) that corresponds to the context (e.g., the primary function of the second remotely controllable external device is compatible with, is consistent with, and/or is configurable with the context so that the second remotely controllable external device cannot operate in conjunction with and/or in coordination with the first remotely controllable external device (e.g., the first remotely controllable external device and the second remotely controllable external device output content that is associated with the same media file)). Associating the second remotely controllable external device with the context when the second remotely controllable external device includes a primary function that corresponds to the context allows a user to quickly group remotely controllable external devices that are compatible with one another without having to navigate to another user interface, thereby reducing the number of inputs needed to perform an operation.

In some embodiments, the set of one or more criteria includes a second criterion that is met when the second remotely controllable external device (e.g., a remotely controllable external device associated with a respective accessory user interface object 816*a*-816*i*, 844*a*-844*i*, and/or 852*a*-852*i*) has a first configuration and the first remotely controllable external device (e.g., a remotely controllable external device associated with first user interface object 814*a*) has the first configuration (e.g., the first remotely controllable external device and the second remotely controllable external device are both associated with (e.g., programmatically mapped to) a particular area, region, and/or portion of a location, such as the same room of a home). Associating the second remotely controllable external device with the context when the second remotely controllable external device and the first remotely controllable external device include a first configuration allows a user to quickly group remotely controllable external devices that are associated with one another without having to navigate to another user interface, thereby reducing the number of inputs needed to perform an operation.

In some embodiments, in accordance with the determination that the second remotely controllable external device (e.g., a remotely controllable external device associated with a respective accessory user interface object 816*a*-816*i*, 844*a*-844*i*, and/or 852*a*-852*i*) satisfies the set of one or more criteria, the computer system (e.g., 100, 300, 500, 604, 606, 608, 610, and/or 800) displays (924), via the display generation component (e.g., 602 and/or 802), a third user interface object (e.g., 816*a*-816*i*, 844*a*-844*i*, and/or 852*a*-852*i*) (e.g., a selectable user interface object and/or affordance) corresponding to the second remotely controllable external device (e.g., a remotely controllable external device associated with a respective accessory user interface object 816*a*-816*i*, 844*a*-844*i*, and/or 852*a*-852*i*) in a third designated region (e.g., 814, 842, and/or 848) (e.g., the third user interface object provides visual confirmation that the second remotely controllable external device has been associated with the context). The third designated region (e.g., 814, 842, and/or 848) includes the user interface object (926) (e.g., 814*a*), the first remotely controllable external device (e.g., a remotely controllable external device associated with first user interface object 814*a*) is a primary device associated with the context (928) (e.g., the first remotely controllable external device is configured to control, cause, and/or initiate output of content (e.g., a multimedia file), the first remotely controllable external device is in communication with one or more additional remotely controllable external devices that are associated with the context and/or provides information about the content to the one or more additional remotely controllable external devices, and/or the first remotely controllable external device was the first device to be associated with the context), and the user interface object (e.g., 814*a*) corresponding to the first remotely controllable external device (e.g., a remotely controllable external device associated with first user interface object 814*a*) is displayed at a first size (e.g., a size of first user interface object 814*a* shown at FIG. 8G) (e.g., a first portion of a display area of the display generation component) that is greater than a second size (e.g., a size of accessory user interface object 816*c* shown at FIG. 8G) (e.g., a second portion of the display area of the display generation component that is less than the first portion) of the third user interface object (e.g., 816*a*-816*i*, 844*a*-844*i*, and/or 852*a*-852*i*) corresponding to the second remotely controllable external device (930) (e.g., a remotely controllable external device associated with a respective accessory user interface object 816*a*-816*i*, 844*a*-844*i*, and/or 852*a*-852*i*).

Displaying the user interface object corresponding to the first remotely controllable external device at a larger size than the third user interface object corresponding to the second remotely controllable external device provides visual feedback to a user of the computer system about which device is the primary device associated with the context, thereby providing improved visual feedback.

In some embodiments, in accordance with a determination that the first remotely controllable external device (e.g., a remotely controllable external device associated with first user interface object 814*a*) and the second remotely controllable external device (e.g., a remotely controllable external device associated with a respective accessory user interface object 816*a*-816*i*, 844*a*-844*i*, and/or 852*a*-852*i*) include a first configuration (e.g., a first output configuration (e.g., a first speaker configured to output a left channel of audio output and a second speaker configured to output a right channel of audio output), a first physical configuration, and/or a first primary/secondary device configuration), the computer system (e.g., 100, 300, 500, 604, 606, 608, 610, and/or 800) displays (932) the third user interface object (e.g., 816*a*-816*i*, 844*a*-844*i*, and/or 852*a*-852*i*) at a first location (e.g., 826*b*) within the designated region (e.g., 814, 842, and/or 848) relative to the user interface object (e.g., 814*a*). In accordance with a determination that the first remotely controllable external device (e.g., a remotely controllable external device associated with first user interface object 814*a*) and the second remotely controllable external device (e.g., a remotely controllable external device associated with a respective accessory user interface object 816*a*-816*i*, 844*a*-844*i*, and/or 852*a*-852*i*) include a second configuration (e.g., a second output configuration (e.g., a first speaker configured to output a left channel of audio output and a second speaker configured to output a right channel of audio output), a second physical configuration, and/or a second primary/secondary device configuration), different from the first configuration, the computer system (e.g., 100, 300, 500, 604, 606, 608, 610, and/or 800) displays (934) the third user interface object (e.g., 816*a*-816*i*, 844*a*-844*i*, and/or 852*a*-852*i*) at a second location (e.g., 826*c*), different from the first location (e.g., 826*b*), within the designated region (e.g., 814, 842, and/or 848) relative to the user interface object (e.g., 814*a*).

Displaying the third user interface object at a first location within the designated region in accordance with a determination that the first remotely controllable external device and the second remotely controllable external device include a first configuration and displaying the third user interface object at a second location, different from the first location, within the designated region in accordance with a determination that the first remotely controllable external device and the second remotely controllable external device include a second configuration, different from the first configuration, provides visual feedback to a user of the computer system about how the devices are configured to operate with one another, thereby providing improved visual feedback.

In some embodiments, in accordance with the determination that the second remotely controllable external device (e.g., a remotely controllable external device associated with a respective accessory user interface object 816*a*-816*i*, 844*a*-844*i*, and/or 852*a*-852*i*) satisfies the set of one or more criteria, the computer system (e.g., 100, 300, 500, 604, 606, 608, 610, and/or 800) provides (936) the second remotely controllable external device (e.g., a remotely controllable external device associated with a respective accessory user interface object 816*a*-816*i*, 844*a*-844*i*, and/or 852*a*-852*i*) with an ability to function in accordance with the context (e.g., the second remotely controllable external device is configured to function based on the context and/or output second content that is based on the context). In some embodiments, the context includes a currently playing media file and associating the second remotely controllable external device with the context enables the second remotely controllable external device to output content (e.g., output audio, output visual elements via a display, and/or output lighting) based on the media file. In some embodiments, the second remotely controllable external device functions based on the context and/or outputs content that is based on the context after being associated with the context. Providing the second remotely controllable external device with an ability to function in accordance with the context in accordance with the determination that the second remotely controllable external device satisfies the set of one or more criteria allows a user to quickly group devices together without having to navigate to an additional user interface, thereby reducing the number of inputs needed to perform an operation.

In some embodiments, while (or, optionally, after) the second remotely controllable external device (e.g., a remotely controllable external device associated with a respective accessory user interface object 816*a*-816*i*, 844*a*-844*i*, and/or 852*a*-852*i*) is associated with the context, the computer system (e.g., 100, 300, 500, 604, 606, 608, 610, and/or 800) detects (938), via the one or more input devices, a request (e.g., 850*j* and/or 850*k*) to disassociate the second remotely controllable external device (e.g., a remotely controllable external device associated with a respective accessory user interface object 816*a*-816*i*, 844*a*-844*i*, and/or 852*a*-852*i*) with the context (e.g., remove the second remotely controllable external device from a group of devices that includes the first remotely controllable external device, such that the first remotely controllable external device and the second remotely controllable external device are not (e.g., no longer) configured to function based on the context and/or output content (e.g., images, video, lighting, and/or audio) that corresponds to the context (e.g., a media file, a video, a movie, a song, a television show, and/or a podcast)). In response to detecting the request (e.g., 850*j* and/or 850*k*) to disassociate the second remotely controllable external device (e.g., a remotely controllable external device associated with a respective accessory user interface object 816*a*-816*i*, 844*a*-844*i*, and/or 852*a*-852*i*) with the context, the computer system (e.g., 100, 300, 500, 604, 606, 608, 610, and/or 800) disassociates (940) the second remotely controllable external device (e.g., a remotely controllable external device associated with a respective accessory user interface object 816*a*-816*i*, 844*a*-844*i*, and/or 852*a*-852*i*) with the context (e.g., ungrouping the second remotely controllable external device from the first remotely controllable external device, such that the first remotely controllable external device is configured to function based on the context and/or output first content based on the context, but the second remotely controllable external device is not configured to function based on the context and/or output second content that is based on the context). Disassociating the second remotely controllable external device with the context in response to the request to disassociate the second remotely controllable external device with the context allows a user to easily remove devices from a group of devices without having to navigate to another user interface, thereby reducing the number of inputs needed to perform an operation.

In some embodiments, the request (e.g., 850*j* and/or 850*k*) to disassociate the second remotely controllable external device (e.g., a remotely controllable external device associated with a respective accessory user interface object 816*a*-816*i*, 844*a*-844*i*, and/or 852*a*-852*i*) with the context includes user input (e.g., 850*j* and/or 850*k*) (e.g., user input including a sustained contact component and a movement component of the sustained contact (e.g., movement of the sustained contact toward a designated region of the user interface that includes the user interface object), a swipe gesture, and/or a slide gesture) corresponding to selection of a fourth user interface object (e.g., 816*a*-816*i*, 844*a*-844*i*, and/or 852*a*-852*i*) in a designated region (e.g., 814, 842, and/or 848) of the user interface (e.g., 804) that includes the user interface object (e.g., 814*a*), wherein the user input (e.g., 850*j* and/or 850*k*) includes a sustained contact component (e.g., 850*j*) (e.g., a tap gesture, a touch gesture, and/or a press gesture that is detected and/or held for at least a predetermined amount of time (e.g., one second, two seconds, three seconds, or five seconds)) and a movement component (e.g., 850*k*) (e.g., movement of the sustained contact component), and wherein the movement component (e.g., 850*k*) includes movement (e.g., detected movement from a first position and/or location on the display generation component toward a second position and/or location on the display generation component) away from the designated region (e.g., 814, 842, and/or 848) (e.g., toward the device region and/or another portion of the user interface that is not the designated region). The request to disassociate the second remotely controllable external device with the context including user input having a sustained contact component and a movement component allows a user to request to disassociate the second remotely controllable external device with the context without having to navigate to another user interface, thereby reducing the number of inputs needed to perform an operation.

In some embodiments, while displaying, via the display generation component (e.g., 602 and/or 802), the user interface (e.g., 804) that includes the user interface object (e.g., 814*a*), the computer system (e.g., 100, 300, 500, 604, 606, 608, 610, and/or 800) detects (942) user input (e.g., 850*a* and/or 850*l*) (e.g., a tap gesture, a tap gesture that includes a duration exceeding a predefined duration, a press gesture, and/or a touch gesture) corresponding to selection of the user interface object (e.g., 814*a*). In response to detecting the user input (e.g., 850*a* and/or 850*l*) corresponding to selection of the user interface object (e.g., 814*a*), the computer system (e.g., 100, 300, 500, 604, 606, 608, 610, and/or 800) displays (944), via the display generation component (e.g., 602 and/or 802), a second user interface (e.g., 818 and/or 832) (e.g., a user interface that is different from the user interface) that includes a fourth user interface object (e.g., 818*a*-818*g* and/or 832*a*-832*d*) (e.g., a selectable user interface object and/or an affordance) that, when selected, controls one or more functions of the first remotely controllable external device (e.g., a remotely controllable external device associated with first user interface object 814*a*) (e.g., in response to detecting user input corresponding to the fourth user interface object, the computer system is configured to adjust an operating state and/or a setting of the first remotely controllable external device). Displaying the second user interface that includes a fourth user interface object for controlling the first remotely controllable external device in response to detecting user input corresponding to selection of the user interface object allows a user to individually control the first remotely controllable external device without having to provide additional user inputs to search for the first remotely controllable external device, thereby reducing the number of inputs needed to perform an operation.

Note that details of the processes described above with respect to method 900 (e.g., FIGS. 9A-9D) are also applicable in an analogous manner to the methods described above. For example, method 700 optionally includes one or more of the characteristics of the various methods described above with reference to method 900. For example, a computer system performing method 700 can be grouped by a computer system performing method 900 with other accessory devices. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to output content that enhances an experience of a user. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine content to output and/or to suggest accessory devices for grouping. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be output by inferring preferences based on non-personal information data or a bare minimum amount of personal information, such as the content being requested by the device associated with a user, other non-personal information, or publicly available information.

What is claimed is:

1. A computer system configured to communicate with one or more input devices and a display generation component, comprising:
   one or more processors; and
   memory storing one or more programs configured to be executed by the one or more processors, the one or more programs including instructions for:
   while displaying, via the display generation component, a user interface, detecting, via the one or more input devices, a request to associate a first remotely controllable external device with a context, wherein the user interface includes:
   a first designated region within a visually distinct boundary that includes a first user interface object, wherein the first user interface object, when selected, provides options for controlling a second remotely controllable external device, wherein the second remotely controllable external device is associated with the context, wherein the context includes content that is currently being outputted by the second remotely controllable external device, and wherein the second remotely controllable external device is a primary device associated with the context; and
   a second designated region outside the visually distinct boundary that includes a first device user interface object, different from the first user interface object, and a second device user interface object, different from the first user interface object, wherein the first device user interface object corresponds to the first remotely controllable external device, and wherein the second device user interface object corresponds to a third remotely controllable external device of an automation system that includes the second remotely controllable external device; and
   in response to detecting the request to associate the first remotely controllable external device with the context:

in accordance with a determination that the first remotely controllable external device satisfies a set of one or more criteria:
    associating the first remotely controllable external device with the context, wherein associating the first remotely controllable external device with the context includes causing the second remotely controllable external device to output a first portion of the content and causing the first remotely controllable external device to output a second portion of the content that is different from the first portion of the content;
    displaying, via the display generation component, a second user interface object corresponding to the first remotely controllable external device in the first designated region, wherein the first user interface object corresponding to the second remotely controllable external device is displayed at a first size that is greater than a second size of the second user interface object corresponding to the first remotely controllable external device; and
    forgoing display of the first device user interface object in the second designated region and displaying, via the display generation component, the second device user interface object in the second designated region; and
in accordance with a determination that the first remotely controllable external device does not satisfy the set of one or more criteria, wherein the set of one or more criteria are not met when the first remotely controllable external device includes a first function that does not correspond to a second function of the second remotely controllable external device:
    forgoing associating the first remotely controllable external device with the context;
    displaying, via the display generation component, the first user interface object in the first designated region; and
    displaying, via the display generation component, the first device user interface object and the second device user interface object in the second designated region.

2. The computer system of claim 1, wherein the user interface includes an indication of the content that is currently being outputted by the second remotely controllable external device.

3. The computer system of claim 1, wherein the context includes the second remotely controllable external device being associated with a location.

4. The computer system of claim 1, wherein the context includes the second remotely controllable external device being associated with a scene.

5. The computer system of claim 1, wherein the second designated region includes:
in accordance with a determination that the context is a first context, a first suggested device user interface object corresponding to a fifth remotely controllable external device for associating with the first context; and
in accordance with a determination that the context is a second context, different from the first context, a second suggested device user interface object corresponding to a sixth remotely controllable external device, different from the fifth remotely controllable external device, for associating with the second context.

6. The computer system of claim 1, wherein:
the request to associate the first remotely controllable external device with the context includes user input corresponding to selection of the first device user interface object.

7. The computer system of claim 6, wherein the user input corresponding to selection of the first device user interface object includes a sustained contact component and a movement component, wherein the movement component includes movement from the second designated region toward the first designated region of the user interface that includes the first user interface object.

8. The computer system of claim 6, wherein the one or more programs further include instructions for:
in accordance with the determination that the first remotely controllable external device satisfies the set of one or more criteria, displaying, via the display generation component, an animation of the first device user interface object moving from the second designated region toward the first designated region of the user interface that includes the first user interface object.

9. The computer system of claim 6, wherein the one or more programs further include instructions for:
in accordance with the determination that the first remotely controllable external device does not satisfy the set of one or more criteria, displaying, via the display generation component, an animation of the first device user interface object indicating that the first remotely controllable external device does not satisfy the set of one or more criteria.

10. The computer system of claim 1, wherein the set of one or more criteria includes a first criterion that is met when the first remotely controllable external device includes a primary function that corresponds to the context.

11. The computer system of claim 1, wherein the set of one or more criteria includes a second criterion that is met when the first remotely controllable external device has a first configuration and the second remotely controllable external device has the first configuration.

12. The computer system of claim 1, wherein the one or more programs further include instructions for:
while the first remotely controllable external device is associated with the context, detecting, via the one or more input devices, a request to disassociate the first remotely controllable external device with the context; and
in response to detecting the request to disassociate the first remotely controllable external device with the context, disassociating the first remotely controllable external device with the context.

13. The computer system of claim 1, wherein the one or more programs further include instructions for:
in accordance with the determination that the first remotely controllable external device satisfies the set of one or more criteria, displaying, via the display generation component, movement of the first device user interface object corresponding to the first remotely controllable external device from the second designated region of the user interface toward the first designated region of the user interface, wherein the first device user interface object includes a first appearance that is based on the first remotely controllable external device satisfying the set of one or more criteria; and
in accordance with the determination that the first remotely controllable external device does not satisfy the set of one or more criteria, displaying, via the display generation component, the first device user interface object in the second designated region of the user interface, wherein the first device user interface object includes a second appearance that is based on the first remotely controllable external device not satisfying the set of one or more criteria, and wherein the second appearance is different from the first appearance.

14. The computer system of claim 1, wherein the first portion of the content or the second portion of the content includes visual content.

15. A non-transitory computer-readable storage medium storing one or more programs configured to be executed by one or more processors of a computer system that is in communication with one or more input devices and a display generation component, the one or more programs including instructions for:
   while displaying, via the display generation component, a user interface, detecting, via the one or more input devices, a request to associate a first remotely controllable external device with a context, wherein the user interface includes:
   a first designated region within a visually distinct boundary that includes a first user interface object, wherein the first user interface object, when selected, provides options for controlling a second remotely controllable external device, wherein the second remotely controllable external device is associated with the context, wherein the context includes content that is currently being outputted by the second remotely controllable external device, and wherein the second remotely controllable external device is a primary device associated with the context; and
   a second designated region outside the visually distinct boundary that includes a first device user interface object, different from the first user interface object, and a second device user interface object, different from the first user interface object, wherein the first device user interface object corresponds to the first remotely controllable external device, and wherein the second device user interface object corresponds to a third remotely controllable external device of an automation system that includes the second remotely controllable external device; and
   in response to detecting the request to associate the first remotely controllable external device with the context:
   in accordance with a determination that the first remotely controllable external device satisfies a set of one or more criteria:
   associating the first remotely controllable external device with the context, wherein associating the first remotely controllable external device with the context includes causing the second remotely controllable external device to output a first portion of the content and causing the first remotely controllable external device to output a second portion of the content that is different from the first portion of the content;
   displaying, via the display generation component, a second user interface object corresponding to the first remotely controllable external device in the first designated region, wherein the first user interface object corresponding to the second remotely controllable external device is displayed at a first size that is greater than a second size of the second user interface object corresponding to the first remotely controllable external device; and
   forgoing display of the first device user interface object in the second designated region and displaying, via the display generation component, the second device user interface object in the second designated region; and
   in accordance with a determination that the first remotely controllable external device does not satisfy the set of one or more criteria, wherein the set of one or more criteria are not met when the first remotely controllable external device includes a first function that does not correspond to a second function of the second remotely controllable external device:
   forgoing associating the first remotely controllable external device with the context;
   displaying, via the display generation component, the first user interface object in the first designated region; and
   displaying, via the display generation component, the first device user interface object and the second device user interface object in the second designated region.

16. The non-transitory computer-readable storage medium of claim 15, wherein the user interface includes an indication of the content that is currently being outputted by the second remotely controllable external device.

17. The non-transitory computer-readable storage medium of claim 15, wherein the context includes the second remotely controllable external device being associated with a location.

18. The non-transitory computer-readable storage medium of claim 15, wherein the context includes the second remotely controllable external device being associated with a scene.

19. The non-transitory computer-readable storage medium of claim 15, wherein the second designated region includes:
   in accordance with a determination that the context is a first context, a first suggested device user interface object corresponding to a fifth remotely controllable external device for associating with the first context; and
   in accordance with a determination that the context is a second context, different from the first context, a second suggested device user interface object corresponding to a sixth remotely controllable external device, different from the fifth remotely controllable external device, for associating with the second context.

20. The non-transitory computer-readable storage medium of claim 15, wherein:
   the request to associate the first remotely controllable external device with the context includes user input corresponding to selection of the first device user interface object.

21. The non-transitory computer-readable storage medium of claim 20, wherein the one or more programs further include instructions for:
   in accordance with the determination that the first remotely controllable external device satisfies the set of one or more criteria, displaying, via the display generation component, an animation of the first device user interface object moving from the second designated region toward the first designated region of the user interface that includes the first user interface object.

22. The non-transitory computer-readable storage medium of claim 20, wherein the one or more programs further include instructions for:
   in accordance with the determination that the first remotely controllable external device does not satisfy the set of one or more criteria, displaying, via the display generation component, an animation of the first device user interface object indicating that the first remotely controllable external device does not satisfy the set of one or more criteria.

23. The non-transitory computer-readable storage medium of claim 20, wherein the user input corresponding to selection of the first device user interface object includes a sustained contact component and a movement component, wherein the movement component includes movement from the second designated region toward the first designated region of the user interface that includes the first user interface object.

24. The non-transitory computer-readable storage medium of claim 15, wherein the set of one or more criteria includes a first criterion that is met when the first remotely controllable external device includes a primary function that corresponds to the context.

25. The non-transitory computer-readable storage medium of claim 15, wherein the set of one or more criteria includes a second criterion that is met when the first remotely controllable external device has a first configuration and the second remotely controllable external device has the first configuration.

26. The non-transitory computer-readable storage medium of claim 15, wherein the one or more programs further include instructions for:
while the first remotely controllable external device is associated with the context, detecting, via the one or more input devices, a request to disassociate the first remotely controllable external device with the context; and
in response to detecting the request to disassociate the first remotely controllable external device with the context, disassociating the first remotely controllable external device with the context.

27. The non-transitory computer-readable storage medium of claim 15, wherein the one or more programs further include instructions for:
in accordance with the determination that the first remotely controllable external device satisfies the set of one or more criteria, displaying, via the display generation component, movement of the first device user interface object corresponding to the first remotely controllable external device from the second designated region of the user interface toward the first designated region of the user interface, wherein the first device user interface object includes a first appearance that is based on the first remotely controllable external device satisfying the set of one or more criteria; and
in accordance with the determination that the first remotely controllable external device does not satisfy the set of one or more criteria, displaying, via the display generation component, the first device user interface object in the second designated region of the user interface, wherein the first device user interface object includes a second appearance that is based on the first remotely controllable external device not satisfying the set of one or more criteria, and wherein the second appearance is different from the first appearance.

28. The non-transitory computer-readable storage medium of claim 15, wherein the first portion of the content or the second portion of the content includes visual content.

29. A method, comprising:
at a computer system that is in communication with one or more input devices and a display generation component:
while displaying, via the display generation component, a user interface, detecting, via the one or more input devices, a request to associate a first remotely controllable external device with a context, wherein the user interface includes:
a first designated region within a visually distinct boundary that includes a first user interface object, wherein the first user interface object, when selected, provides options for controlling a second remotely controllable external device, wherein the second remotely controllable external device is associated with the context, wherein the context includes content that is currently being outputted by the second remotely controllable external device, and wherein the second remotely controllable external device is a primary device associated with the context; and
a second designated region outside the visually distinct boundary that includes a first device user interface object, different from the first user interface object, and a second device user interface object, different from the first user interface object, wherein the first device user interface object corresponds to the first remotely controllable external device, and wherein the second device user interface object corresponds to a third remotely controllable external device of an automation system that includes the second remotely controllable external device; and
in response to detecting the request to associate the first remotely controllable external device with the context:
in accordance with a determination that the first remotely controllable external device satisfies a set of one or more criteria:
associating the first remotely controllable external device with the context, wherein associating the first remotely controllable external device with the context includes causing the second remotely controllable external device to output a first portion of the content and causing the first remotely controllable external device to output a second portion of the content that is different from the first portion of the content;
displaying, via the display generation component, a second user interface object corresponding to the first remotely controllable external device in the first designated region, wherein the first user interface object corresponding to the second remotely controllable external device is displayed at a first size that is greater than a second size of the second user interface object corresponding to the first remotely controllable external device; and
forgoing display of the first device user interface object in the second designated region and displaying, via the display generation component, the second device user interface object in the second designated region; and
in accordance with a determination that the first remotely controllable external device does not satisfy the set of one or more criteria, wherein the set of one or more criteria are not met when the first remotely controllable external device includes a first function that does not correspond to a second function of the second remotely controllable external device:
forgoing associating the first remotely controllable external device with the context;
displaying, via the display generation component, the first user interface object in the first designated region; and
displaying, via the display generation component, the first device user interface object and the second device user interface object in the second designated region.

30. The method of claim 29, wherein the user interface includes an indication of the content that is currently being outputted by the second remotely controllable external device.

31. The method of claim 29, wherein the context includes the second remotely controllable external device being associated with a location.

32. The method of claim 29, wherein the context includes the second remotely controllable external device being associated with a scene.

33. The method of claim 29, wherein the second designated region includes:
    in accordance with a determination that the context is a first context, a first suggested device user interface object corresponding to a fifth remotely controllable external device for associating with the first context; and
    in accordance with a determination that the context is a second context, different from the first context, a second suggested device user interface object corresponding to a sixth remotely controllable external device, different from the fifth remotely controllable external device, for associating with the second context.

34. The method of claim 29, wherein:
    the request to associate the first remotely controllable external device with the context includes user input corresponding to selection of the first device user interface object.

35. The method of claim 34, wherein the user input corresponding to selection of the first device user interface object includes a sustained contact component and a movement component, wherein the movement component includes movement from the second designated region toward the first designated region of the user interface that includes the first user interface object.

36. The method of claim 34, further comprising:
    in accordance with the determination that the first remotely controllable external device satisfies the set of one or more criteria, displaying, via the display generation component, an animation of the first device user interface object moving from the second designated region toward the first designated region of the user interface that includes the first user interface object.

37. The method of claim 34, further comprising:
    in accordance with the determination that the first remotely controllable external device does not satisfy the set of one or more criteria, displaying, via the display generation component, an animation of the first device user interface object indicating that the first remotely controllable external device does not satisfy the set of one or more criteria.

38. The method of claim 29, wherein the set of one or more criteria includes a first criterion that is met when the first remotely controllable external device includes a primary function that corresponds to the context.

39. The method of claim 29, wherein the set of one or more criteria includes a second criterion that is met when the first remotely controllable external device has a first configuration and the second remotely controllable external device has the first configuration.

40. The method of claim 29, further comprising:
    while the first remotely controllable external device is associated with the context, detecting, via the one or more input devices, a request to disassociate the first remotely controllable external device with the context; and
    in response to detecting the request to disassociate the first remotely controllable external device with the context, disassociating the first remotely controllable external device with the context.

41. The method of claim 29, further comprising:
    in accordance with the determination that the first remotely controllable external device satisfies the set of one or more criteria, displaying, via the display generation component, movement of the first device user interface object corresponding to the first remotely controllable external device from the second designated region of the user interface toward the first designated region of the user interface, wherein the first device user interface object includes a first appearance that is based on the first remotely controllable external device satisfying the set of one or more criteria; and
    in accordance with the determination that the first remotely controllable external device does not satisfy the set of one or more criteria, displaying, via the display generation component, the first device user interface object in the second designated region of the user interface, wherein the first device user interface object includes a second appearance that is based on the first remotely controllable external device not satisfying the set of one or more criteria, and wherein the second appearance is different from the first appearance.

42. The method of claim 29, wherein the first portion of the content or the second portion of the content includes visual content.

\* \* \* \* \*